(12) United States Patent
Minato

(10) Patent No.: US 7,663,773 B2
(45) Date of Patent: Feb. 16, 2010

(54) INFORMATION PROCESSING APPARATUS, INFORMATION PROCESSING METHOD, INFORMATION PROCESSING PROGRAM AND COMPUTER READABLE RECORDING MEDIUM

(75) Inventor: Junichi Minato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 811 days.

(21) Appl. No.: 11/133,356

(22) Filed: May 20, 2005

(65) Prior Publication Data

US 2005/0259288 A1 Nov. 24, 2005

(30) Foreign Application Priority Data

May 21, 2004 (JP) .............................. 2004-151534
Jun. 3, 2004 (JP) .............................. 2004-165979

(51) Int. Cl.
*G06F 15/00* (2006.01)
*G03G 15/00* (2006.01)
(52) U.S. Cl. ........................................ 358/1.15; 399/15
(58) Field of Classification Search ................ 358/1.15, 358/1.16, 1.18, 1.14, 1.13; 399/15, 81, 366; 340/5.6, 5.81; 380/201; 348/E7.061; 715/716; 709/200, 217, 223, 246; 713/186; 705/2, 705/7, 59

See application file for complete search history.

(56) References Cited

U.S. PATENT DOCUMENTS

| 5,610,688 | A | * | 3/1997 | Inamoto et al. | ............. | 399/366 |
| 7,298,505 | B2 | | 11/2007 | Ueda | | |
| 2002/0027675 | A1 | | 3/2002 | Minato | | |
| 2003/0152231 | A1 | * | 8/2003 | Tomita et al. | ............... | 380/258 |
| 2004/0111462 | A1 | | 6/2004 | Minato | | |

FOREIGN PATENT DOCUMENTS

| JP | 7-129049 | 5/1995 |
| JP | 10-240687 | 9/1998 |
| JP | 10-271270 | 10/1998 |
| JP | 11-146173 | 5/1999 |
| JP | 11-331472 | 11/1999 |
| JP | 2000-32184 | 1/2000 |
| JP | 2000-232566 | 8/2000 |
| JP | 2000-261585 | 9/2000 |
| JP | 2001-28657 | 1/2001 |
| JP | 2001-216123 | 8/2001 |
| JP | 2001-243699 | 9/2001 |
| JP | 2002-27189 | 1/2002 |
| JP | 2002-84383 | 3/2002 |
| JP | 2002-240398 | 8/2002 |
| JP | 3356573 | 10/2002 |
| JP | 3383725 | 12/2002 |
| JP | 2003-228262 | 8/2003 |

(Continued)

*Primary Examiner*—Saeid Ebrahimi Dehkordy
(74) *Attorney, Agent, or Firm*—Oblon, Spivak, McClelland, Maier & Neustadt, L.L.P.

(57) ABSTRACT

In an information processing apparatus having a service mode for a service person to carry out maintenance of the apparatus enters for carrying out the maintenance, a registration page is provided for registering the service person as a service person in charge of the maintenance of the apparatus, and an input page is provided for inputting authentication information required for the service person that is registered in the registration page as a person in charge of the maintenance of the apparatus to enter the service mode.

16 Claims, 42 Drawing Sheets

FOREIGN PATENT DOCUMENTS

| | | |
|---|---|---|
| JP | 2003-229979 | 8/2003 |
| JP | 2003-274125 | 9/2003 |
| JP | 2003-288323 | 10/2003 |
| JP | 2003-345928 | 12/2003 |
| JP | 2004-56715 | 2/2004 |
| JP | 2004-112303 | 4/2004 |
| JP | 2004-135300 | 4/2004 |

* cited by examiner

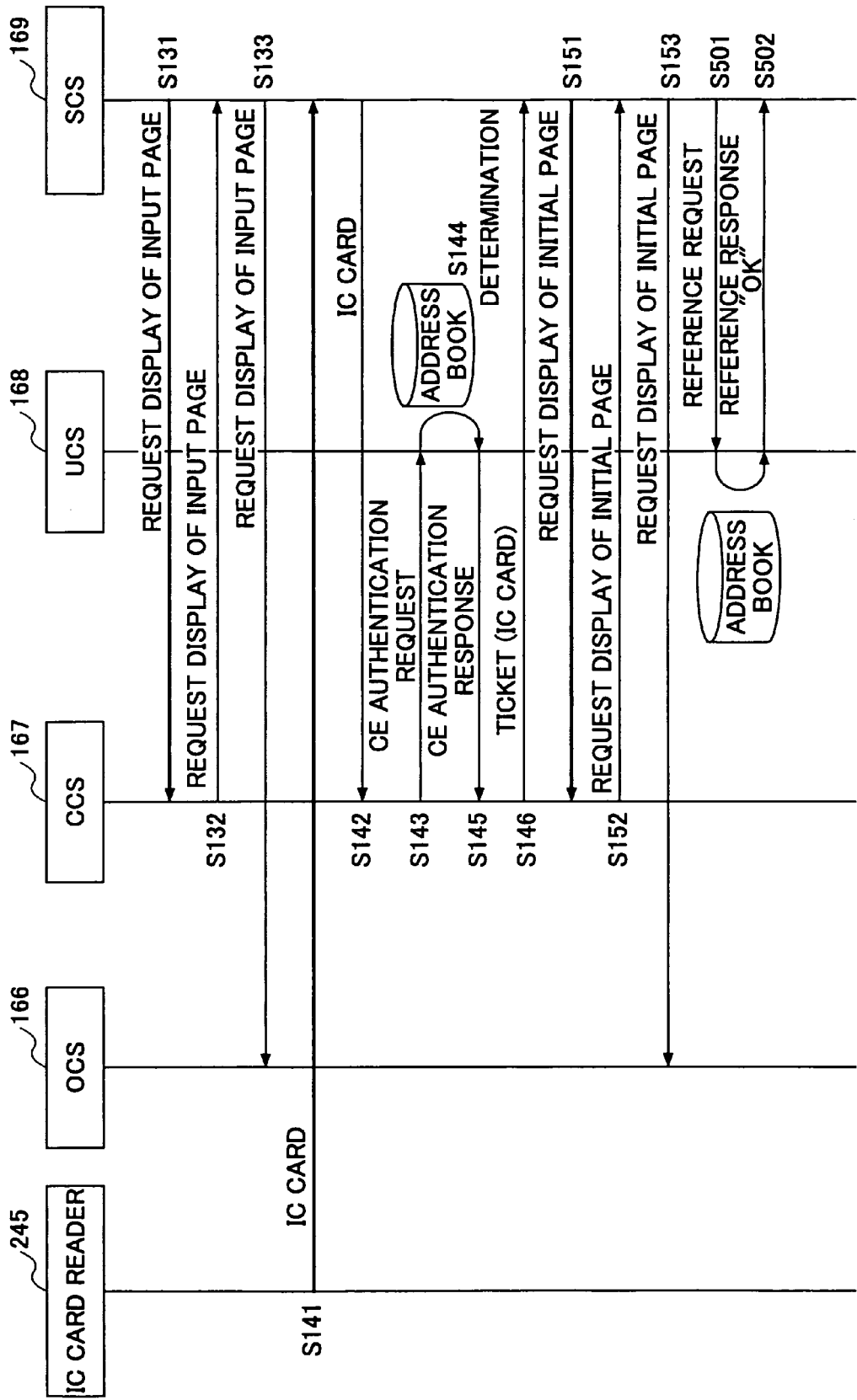

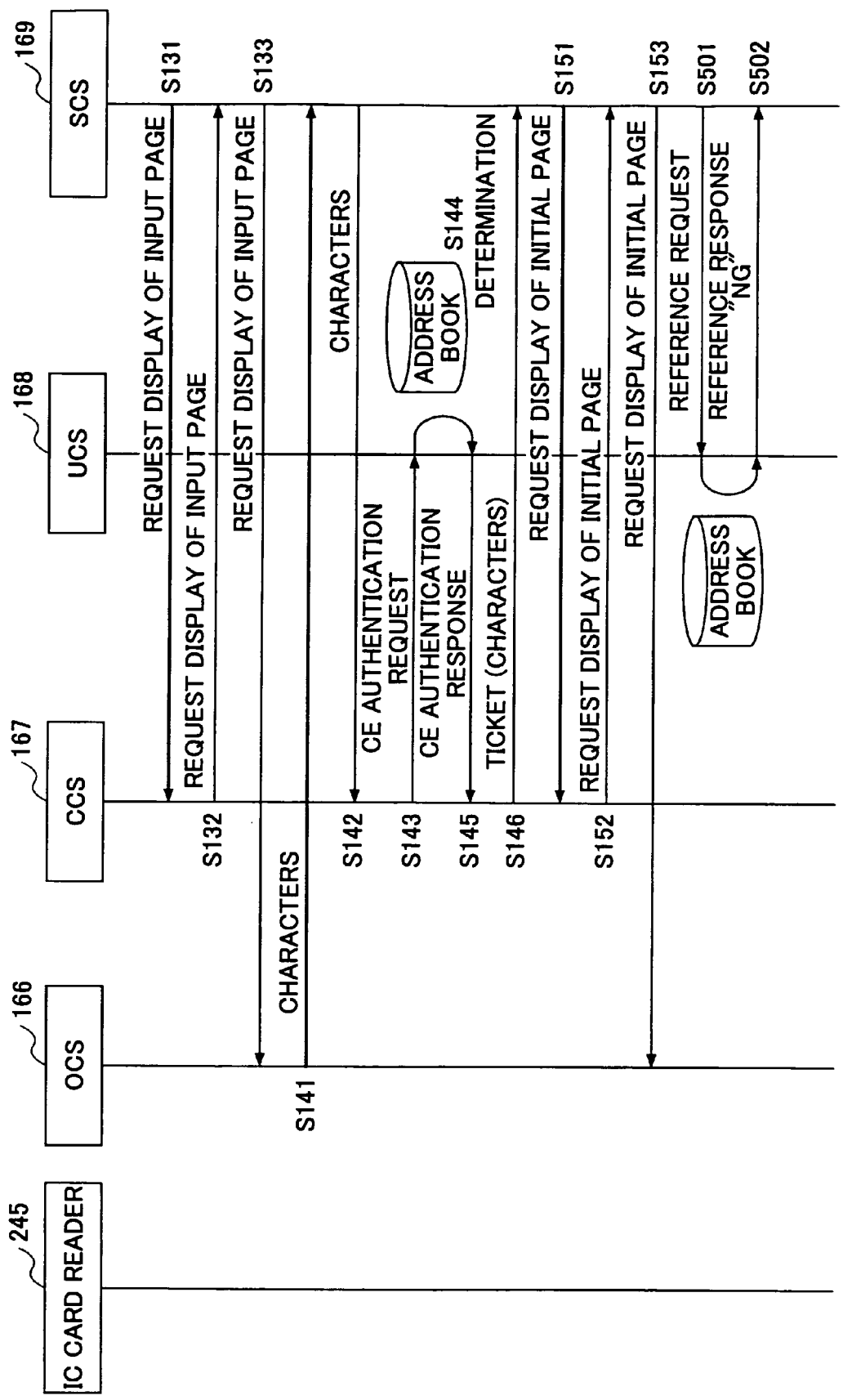

LOG-IN USER: MACHINE MANAGER

SYSTEM INITIAL SETTING

SELECT ITEM TO SET

| BASIC SETTING | PAPER SETTING | CLOCK TIMER SETTING | INT S |

- BASIC SETTING
- BASIC SETTING
- BASIC SETTING
- BASIC SETTING

CE LOG-IN DURATION LIMITATION SETTING

INPUT SET TIME BY TEN-KEY, AND PRESS SET

90 SECS       CLEAR

<60~900>

CANCEL    SET

(B)

LOG-ON IN imagioNeoXXXXX

INPUT USER NAME AND PASSWORD, AND PRESS EXECUTE, OR PASS IC CARD THROUGH

▶ USER NAME   customerengineer   INPUT   CLEAR

▶ PASSWORD   ********   INPUT   CLEAR

EXECUTE

(C)

LOG-IN USER: CE

CE MODE                                    END

SYSTEM       COPY
             PRINTER
             SCANNER

(D)

LOG-ON IN imagioNeoXXXXX

INPUT USER NAME AND PASSWORD, AND PRESS EXECUTE, OR PASS IC CARD THROUGH

▶ USER NAME   [          ]   INPUT   CLEAR

▶ PASSWORD   [          ]   INPUT   CLEAR

EXECUTE

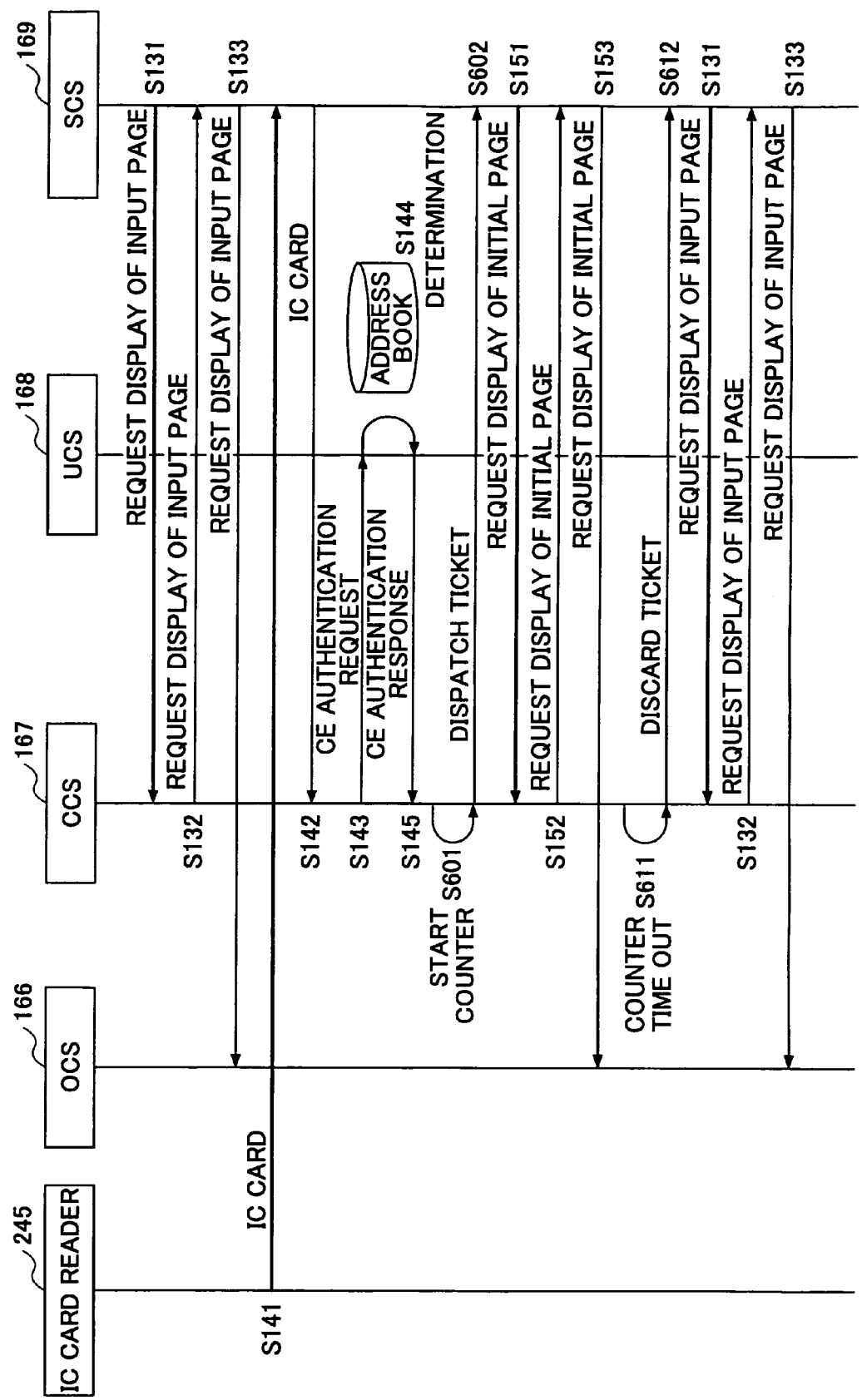

FIG.25

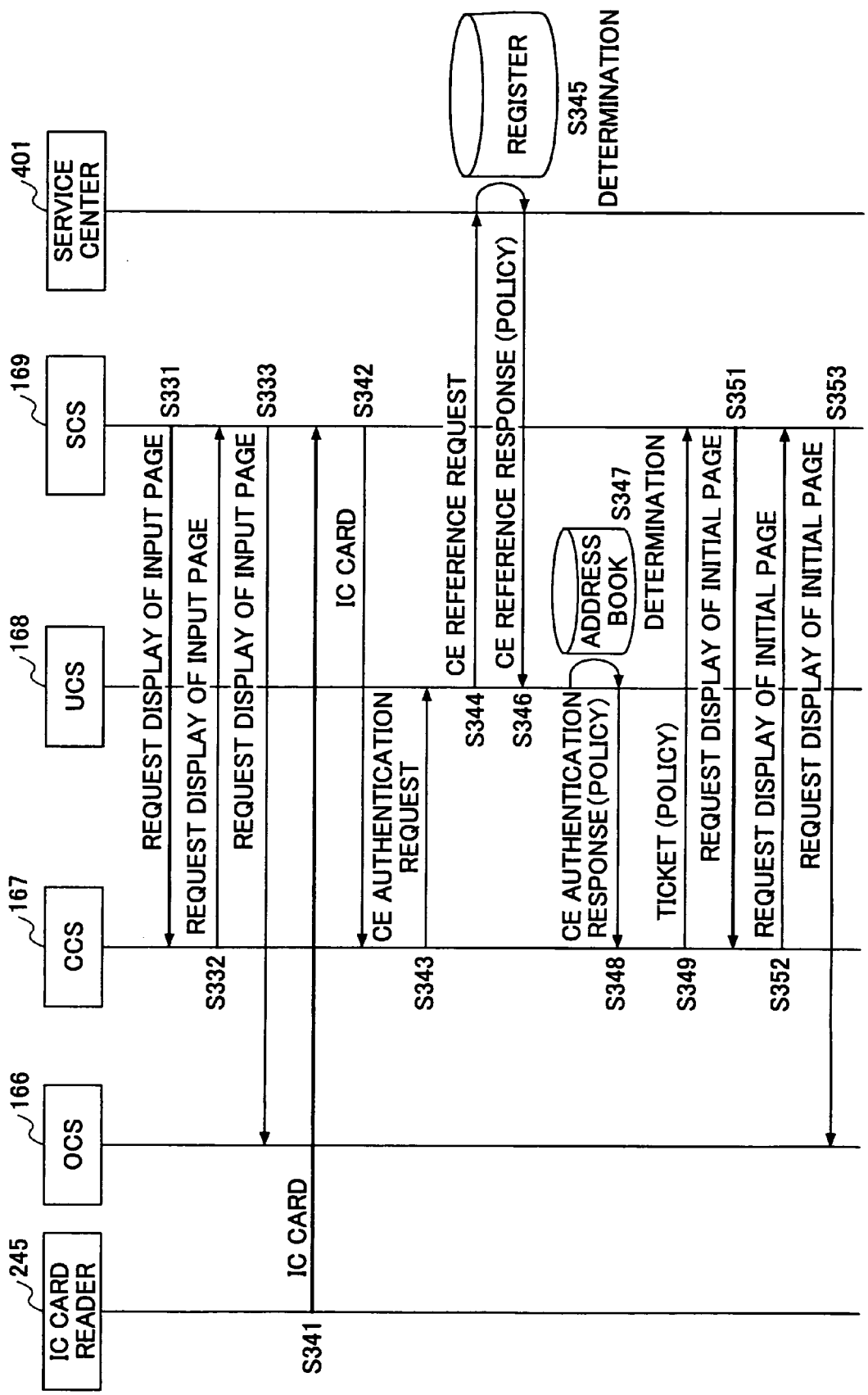

FIG.33

| LOG-IN USER: MACHINE MANAGER | | | | |
|---|---|---|---|---|
| SYSTEM INITIAL SETTING | | | CE POLICY SETTING | |
| SELECT ITEM TO SET | | | DESIGNATE RIGHT GIVEN TO CE AND PRESS EXECUTE | |
| BASIC SETTING | PAPER SETTING | CLOCK TIMER SETTING | INT S | |
| ADDRESS BOOK REGISTER/CHANGE/DELETE | | | MAINTENANCE OPERATION | |
| GROUP REGISTER/CHANGE/DELETE | | | ADDRESS BOOK OPERATION | |
| RELAY GROUP REGISTER/CHANGE/DELETE | | | INITIAL SETTING OPERATION | |
| CHANGE ORDER | | | GENERAL OPERATION | |
| INDEX EDIT | | | CANCEL | SET |

| CE | RANK |
|---|---|
| A | 2 |
| B | 3 |
| C | 1 |

(B)

| RANK | MAINTENANCE OPERATION | ADDRESS BOOK OPERATION | INITIAL SETTING OPERATION | COPY OPERATION | FACSIMILE OPERATION | STORED DOCUMENT OPERATION |
|---|---|---|---|---|---|---|
| 3 | ○ | ○ | ○ | ○ | ○ | ○ |
| 2 | ○ | | ○ | ○ | ○ | |
| 1 | ○ | | | | | |

(C)

| RANK | SECURITY HIGH | SECURITY LOW | SECURITY NONE |
|---|---|---|---|
| 3 | ○ | ○ | ○ |
| 2 | | ○ | ○ |
| 1 | | | ○ |

(D)

| RANK | EDUCATIONAL INSTITUTION | PUBLIC AGENCY | PRIVATE COMPANY | IN THE SHOP |
|---|---|---|---|---|
| 3 | ○ | ○ | ○ | ○ |
| 2 | ○ | | ○ | |
| 1 | ○ | | | |

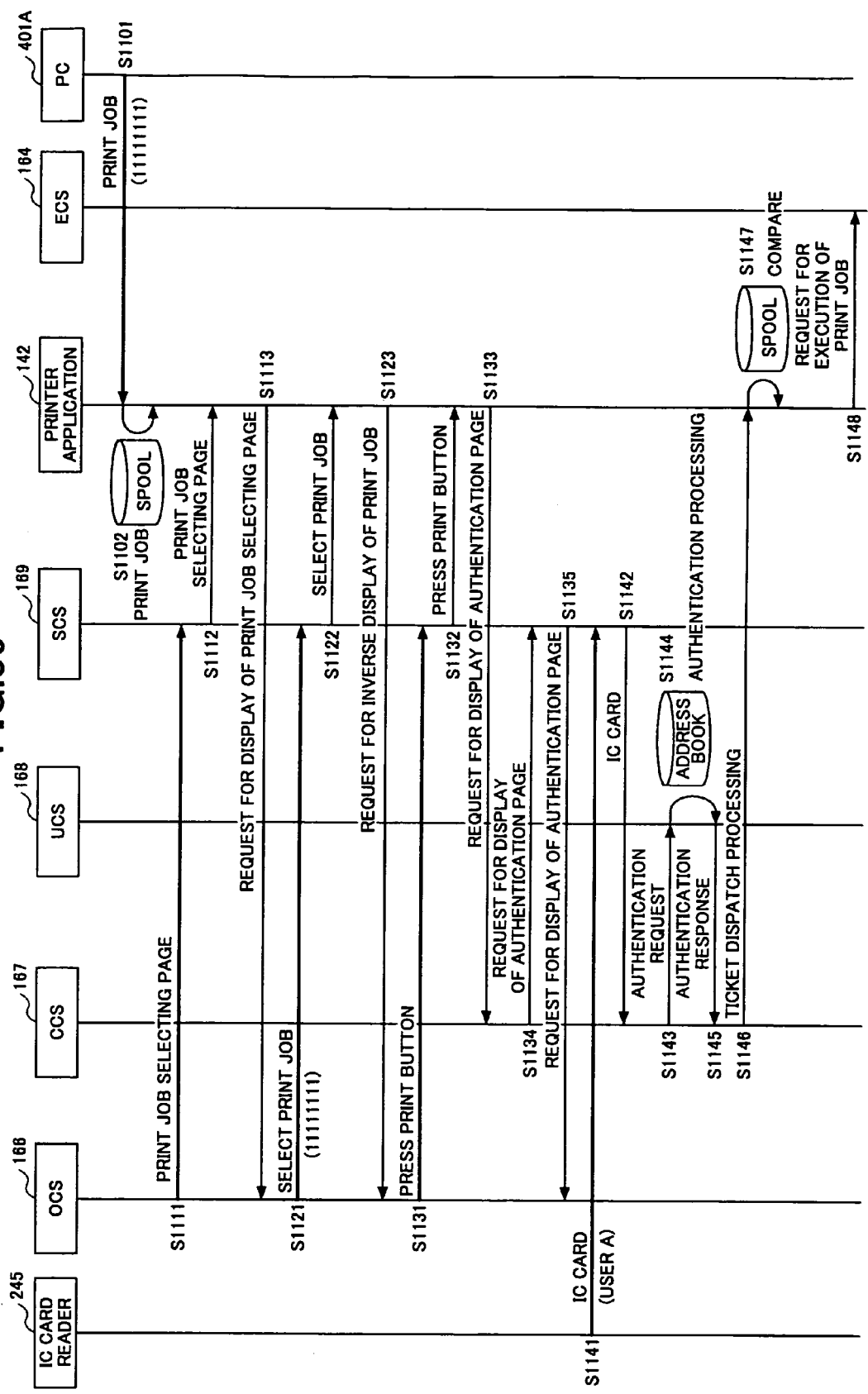

| DOCUMENT PRINTING | | | | END |
|---|---|---|---|---|
| SELECT DOCUMENT TO PRINT | | | | |
| | USER ID | DATE/TIME | NUMBER OF COPIES | |
| ALL PRINT JOB LIST | 11111111 | 12/22 15:20 | 10 | PRINT |
| | 22222222 | 12/22 15:20 | 1 | |
| | 11111111 | 12/22 15:20 | 2 | |
| | 33333333 | 12/22 15:20 | 5 | ▲PREVIOUS |
| | 11111111 | 12/22 15:20 | 1 | ▼NEXT |

(B)

| DOCUMENT PRINTING | | | | END |
|---|---|---|---|---|
| SELECT DOCUMENT TO PRINT | | | | |
| | USER ID | DATE/TIME | NUMBER OF COPIES | |
| ALL PRINT JOB LIST | 11111111 | 12/22 15:20 | 10 | PRINT |
| | 22222222 | 12/22 15:20 | 1 | |
| | 11111111 | 12/22 15:20 | 2 | |
| | 33333333 | 12/22 15:20 | 5 | ▲PREVIOUS |
| | 11111111 | 12/22 15:20 | 1 | ▼NEXT |

(C)

| DOCUMENT PRINTING | | | | END |
|---|---|---|---|---|
| SELECT DOCUMENT TO PRINT | | | | |
| | USER ID | DATE/TIME | NUMBER OF COPIES | |
| ALL PRINT JOB LIST | 11111111 | 12/22 15:20 | 10 | PRINT |
| | 22222222 | 12/22 15:20 | 1 | |
| | 11111111 | 12/22 15:20 | 2 | |
| | 33333333 | 12/22 15:20 | 5 | ▲PREVIOUS |
| | 11111111 | 12/22 15:20 | 1 | ▼NEXT |

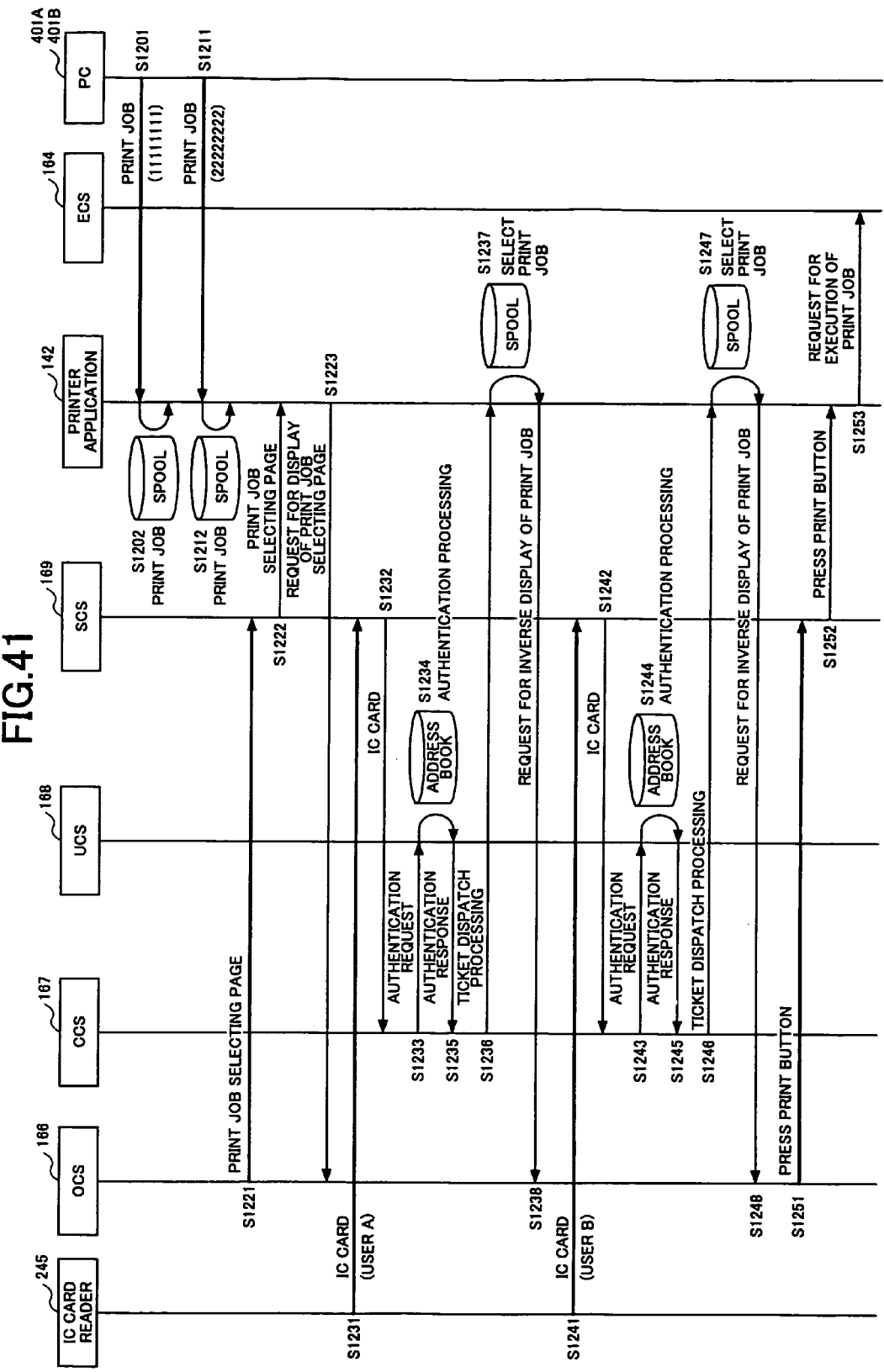

| | USER ID | DATE/TIME | NUMBER OF COPIES | |
|---|---|---|---|---|
| ALL PRINT JOB LIST | | | | PRINT |
| | | | | |
| | | | | |
| | | | | ▲PREVIOUS |
| | | | | ▼NEXT |

DOCUMENT PRINTING — END
SELECT DOCUMENT TO PRINT (B)

| | USER ID | DATE/TIME | NUMBER OF COPIES | |
|---|---|---|---|---|
| ALL PRINT JOB LIST | 11111111 | 12/22 15:20 | 10 | PRINT |
| | | | | |
| | 11111111 | 12/22 15:20 | 2 | |
| | | | | ▲PREVIOUS |
| | 11111111 | 12/22 15:20 | 1 | ▼NEXT |

DOCUMENT PRINTING — END
SELECT DOCUMENT TO PRINT (C)

| | USER ID | DATE/TIME | NUMBER OF COPIES | |
|---|---|---|---|---|
| ALL PRINT JOB LIST | 11111111 | 12/22 15:20 | 10 | PRINT |
| | 22222222 | 12/22 15:20 | 1 | |
| | 11111111 | 12/22 15:20 | 2 | |
| | | | | ▲PREVIOUS |
| | 11111111 | 12/22 15:20 | 1 | ▼NEXT |

DOCUMENT PRINTING — END
SELECT DOCUMENT TO PRINT

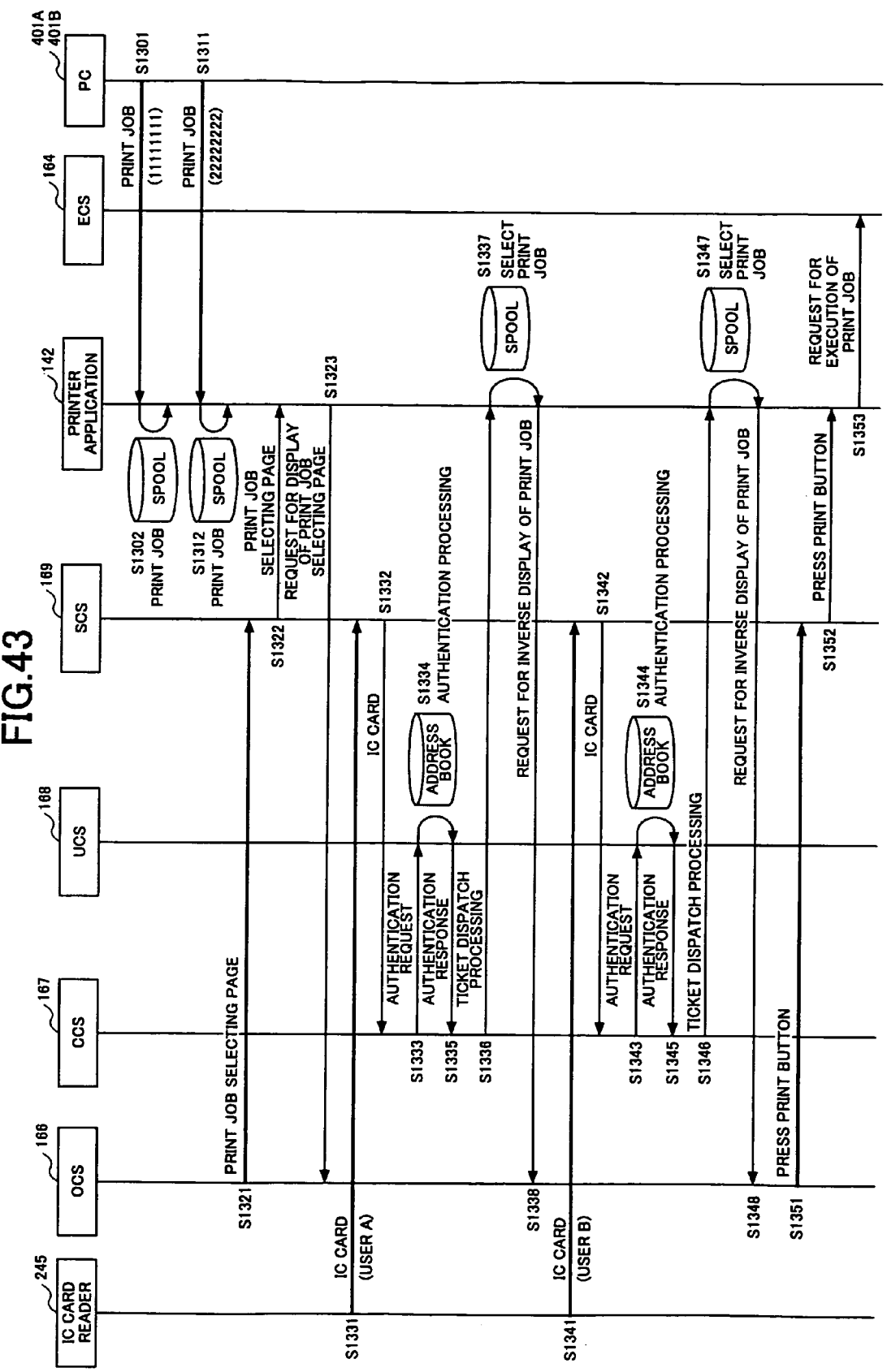

INFORMATION PROCESSING APPARATUS, INFORMATION PROCESSING METHOD, INFORMATION PROCESSING PROGRAM AND COMPUTER READABLE RECORDING MEDIUM

BACKGROUND OF THE INVENTION

1. Field of the Invention

The present invention relates to an information processing apparatus, such as an information device having an information processing function as a main function, an electric device having an information processing function as an auxiliary function, or such; an information processing method, a computer readable information processing program and an information recording medium such as a CD-ROM. As a specific example of the information device having the information processing function as a main function, a personal computer may be cited. As a specific example of the electric device having the information processing function as an auxiliary function, an image forming apparatus such as a copier, a printer, a scanner, a facsimile machine, a composite machine, a fusion machine or such for which, recently, an information processing function is highly developed, may be cited.

Recently, a composite machine, a fusion machine or such acting as a copier, a printer, a scanner and a facsimile machine by a single machine is available commercially. The composite machine or the fusion machine has hardware such as an image pick-up part, a printing part, a communication part, an operation and display part, and also, four types of software corresponding to a copying function, a printing function, a scanning function and a facsimile function, respectively. Then, as a result of switching thereamong, the machine functions as any one of the copier, the printer, the scanner and the facsimile machine. When acting as the copier or the printer, the machine prints out an image on a printing paper sheet or such, while, when acting as the scanner or the facsimile machine, the machine reads an image from an original. When the composite machine or the fusion machine acts as the facsimile machine, it transmits or receives image information to or from anther apparatus via a telephone communication line or such.

Japanese Laid-open Patent Application No. 2002-84383 discloses such an art for example.

SUMMARY OF THE INVENTION

When a composite machine or a fusion machine is installed in an office, a service person who carries out maintenance of the composite machine or the fusion machine visits in the office. Such a type of service system is extremely common in a technical field of such a composite machine or a fusion machine.

In late years, with advancement of an information processing function of a composite machine or a fusion machine, interest to security of the composite machine or the fusion machine increases. The reason is that a function is required whereby, in a viewpoint of avoiding information leakage, reference to some sorts of information by an unspecified person is avoided, or, in a viewpoint of avoiding illegal usage of some types of functions of the machine, usage of these functions by an unspecified person is avoided, in the composite machine or the fusion machine. For this purpose, composite machines or fusion machines each of which implements an authentication function and/or a usage restriction function have been increasing.

When security of the composite machine or the fusion machine is improved, there may occur a concern to information leakage or illegal usage of information/function by a service person. However, in the prior art, the machine may be configured such that a service person can deactivate authentication setting or usage restriction setting if any, or, can delete his or her operation history. Therefore, a sufficient countermeasure may be required for a possible information leakage or illegal usage by a service person.

One object of the present invention is to avoid information leakage or illegal usage of machine function by a service person performing maintenance of an information processing apparatus itself, and to improve security of the information processing apparatus.

There is usually a spool function for a printing job in a composite machine or a fusion machine. When a printing job to be executed by the machine can be selected from among printing jobs spooled in the machine, it is convenient for a user. However, it may not be easy to protect security of the printing job, and/or, it is desired to improve operability of such job selection operation.

Another object of the present invention is to provide a novel information processing apparatus by which a job to be executed by the information processing apparatus can be selected from those spooled in the information processing apparatus.

According to a first aspect of the present invention, an information processing apparatus having a service mode which the apparatus enters for a service person who carries out maintenance of the apparatus for carrying out the maintenance, includes: a registration page providing part providing a registration page for registering the service person as a service person in charge of the maintenance of the apparatus; and an input page providing part providing an input page for inputting authentication information required for the service person that is registered in the registration page as a person in charge of the maintenance of the apparatus to cause the apparatus to enter the service mode.

According to a second aspect of the present invention, in the information processing apparatus according to the first aspect of the present invention: in response to registration operation carried out on the registration page, the service person to be registered may be registered in the apparatus.

According to a third aspect of the present invention, in the information processing apparatus according to the first aspect of the present invention: in response to registration operation carried out on the registration page, the service person to be registered may be registered in a server which is connected with the apparatus.

According to a fourth aspect of the present invention, in the information processing apparatus according to the first aspect of the present invention: in response to registration operation carried out on the registration page, the service person to be registered may be registered in the apparatus after making reference to a server connected to the apparatus for the service person.

According to a fifth aspect of the present invention, in the information processing apparatus according to any one of the first through fourth aspects of the present invention: an indication may be provided that a service person that is being registered is an illegal service person, when it has been determined that the illegal service person is being registered on the registration page.

According to a sixth aspect of the present invention, in the information processing apparatus in any one of the first through fourth aspects of the present invention: a report may be provided that a service person that is being registered is an illegal service person, when it has been determined that the illegal service person is being registered on the registration page.

According to a seventh aspect of the present invention, in the information processing apparatus in any one of the first through fourth aspects of the present invention: the apparatus may be shut down when it has been determined that an illegal service person is being registered on the registration page.

According to an eighth aspect of the present invention, in the information processing apparatus in any one of the first through seventh aspects of the present invention: registration of a service person on the registration page may be achieved on said registration page by setting a recording medium in which the authentication information is recorded, in the information processing apparatus.

According to a ninth aspect of the present invention, in the information processing apparatus in any one of the first through eighth aspects of the present invention: inputting of the authentication information on the input page may be achieved on the input page by setting a recording medium in which the authentication information is recorded, in the information processing apparatus.

According to a tenth aspect of the present invention, in the information processing apparatus in any one of the first through ninth aspects of the present invention: a type of operation which the service person can carry out in the service mode may depend on a type of input operation in which the authentication information is input on the input page.

According to an eleventh aspect of the present invention, the information processing apparatus in any one of the first through tenth aspects of the present invention may further include a setting page providing part providing a setting page for setting a time limit or a limit of the number of times for log-in operation carried out with the use of the authentication information input on the input page.

According to a twelfth aspect of the present invention, the information processing apparatus in any one of the first through eleventh aspects of the present invention may further include a generating page providing part providing a generating page for automatically generating the authentication information to be input on the input page.

According to a thirteenth aspect of the present invention, in an information processing apparatus having a service mode which the apparatus enters for a service person who carries out maintenance of the apparatus for carrying out the maintenance, a type of operation which the service person is allowed to carry out in the service mode is limited according to a service person classification.

According to a fourteenth aspect of the present invention, in an information processing apparatus having a service mode which the apparatus enters for a service person who carries out maintenance of the apparatus for carrying out the maintenance, a type of operation which the service person is allowed to carry out in the service mode is limited according to a policy for limiting the type of operation which the service person is allowed to carry out.

According to a fifteenth aspect of the present invention, in the information processing apparatus in the fourteenth aspect of the present invention, information of limitation contents applied when a type of operation which the service person is allowed to carry out in the service mode is limited according to the policy may be stored in the information processing apparatus when the service person is registered in the information processing apparatus.

According to a sixteenth aspect of the present invention, in the information processing apparatus in the fourteenth aspect of the present invention, information of limitation contents applied when a type of operation which the service person is allowed to carry out in the service mode is limited according to the policy may be stored in a server connected with the information processing apparatus when the service person is registered in the server.

According to a seventeenth aspect of the present invention, in the information processing apparatus in the fourteenth aspect of the present invention, limitation contents applied when a type of operation which the service person is allowed to carry out in the service mode is limited according to the policy is stored in the information processing apparatus when the service person is registered in the information processing apparatus after reference is made to a server connected with the information processing apparatus for the service person.

According to an eighteenth aspect of the present invention, the information processing apparatus in any one of the fourteenth through the seventeenth aspects of the present invention may further include a designating page producing part providing a designating page for designating contents of the policy.

According to a nineteenth aspect of the present invention, an information processing apparatus having a service mode which the apparatus enters for a service person who carries out maintenance of the apparatus for carrying out the maintenance, includes a selecting page providing part providing a selecting page for selecting a type of operation which the service person is allowed to carry out in the service mode from among those which a general user is allowed to carry out in a general mode.

According to a twentieth aspect of the present invention, the information processing apparatus in any one of the first through nineteenth aspects of the present invention may be an image forming apparatus.

According to a twenty-first aspect of the present invention, an information processing method executed by an information processing apparatus having a service mode which the apparatus enters for a service person who carries out maintenance of the apparatus for carrying out the maintenance, includes the steps of: a) providing a registration page for registering the service person as a service person in charge of the maintenance of the apparatus; and b) providing an input page for inputting authentication information required for the service person that is registered in the registration page as a person in charge of the maintenance of the apparatus to cause the apparatus to enter the service mode.

According to a twenty-second aspect of the present invention, in an information processing method executed by an information processing apparatus having a service mode which the apparatus enters for a service person who carries out maintenance of the apparatus for carrying out the maintenance, a type of operation which the service person is allowed to carry out in the service mode is limited according to a service person's classification.

According to a twenty-third aspect of the present invention, in an information processing method executed by an information processing apparatus having a service mode which the apparatus enters for a service person who carries out maintenance of the apparatus for carrying out the maintenance, a type of operation which the service person is allowed to carry out in the service mode is limited according to a policy for limiting the type of operation which the service person is allowed to carry out.

According to a twenty-fourth aspect of the present invention, an information processing method executed by an information processing apparatus having a service mode which the apparatus enters for a service person who carries out maintenance of the apparatus for carrying out the maintenance, includes the step of: a) providing a selecting page for selecting a type of operation which the service person is allowed to carry out in the service mode from among those which a general user is allowed to carry out in a general mode.

According to a twenty-fifth aspect of the present invention, in the information processing method according to any one of the twenty-first through twenty-fourth aspects of the present invention, the information processing apparatus may be an image forming apparatus.

According to a twenty-sixth aspect of the present invention, a program includes instructions for causing a computer to execute the information processing method in any one of the twenty-first through twenty-fifth aspects of the present invention.

According to a twenty-seventh aspect of the present invention, a computer readable recording medium storing therein the program in the twenty-sixth aspect of the present invention.

By the above-described present invention, information leakage or illegal usage by a service person performing maintenance of an information processing apparatus can be well controlled, and thus, it is possible to improve security of the information processing apparatus.

According to a twenty-eighth aspect of the present invention, an information processing apparatus includes: a job selecting page providing part providing a job selecting page for selecting a job which the apparatus is made to execute, from among those spooled in the apparatus; and an authentication page providing part providing an authentication page for inputting authentication information required for causing the thus-selected job to be actually executed by the apparatus, wherein: inputting of the authentication information for a user on the authentication page is required for causing the job for the user selected on the job selecting page to be actually executed by the apparatus.

According to a twenty-ninth aspect of the present invention, in the information processing apparatus according to the twenty-eighth aspect of the present invention, on the authentication page, operation of inputting the authentication information for a user may be achieved by operation of setting a recording medium in which the authentication information of the user is recorded, in the apparatus.

According to a thirtieth aspect of the present invention, an information processing apparatus includes: a job selecting page providing part providing a job selecting page for selecting a job which the apparatus is made to execute, from among those spooled in the apparatus, wherein: when the authentication information for a user is input on the job selecting page, a job of the user is selected, from among those spooled in the apparatus, to be actually executed by the apparatus.

According to a thirty-first aspect of the present invention, in the information processing apparatus according to the thirtieth aspect of the present invention, on the job selecting page, operation of inputting the authentication information for a user may be achieved by operation of setting a recording medium in which the authentication information of the user is recorded, in the apparatus.

According to a thirty-second aspect of the present invention, an information processing apparatus includes: a job selecting page providing part providing a job selecting page for selecting a job which the apparatus is made to execute, from among those spooled in the apparatus, wherein: when the authentication information for a plurality of users is input on the job selecting page, jobs of the plurality of users are selected, from among those spooled in the apparatus, to be actually executed by the apparatus.

According to a thirty-third aspect of the present invention, in the information processing apparatus according to the thirty-second aspect of the present invention, on the authentication page, operation of inputting the authentication information for a plurality of users may be achieved by operation of setting a plurality of recording media in which the authentication information of each of the plurality of users is recorded, in the apparatus.

According to a thirty-fourth aspect of the present invention, in the information processing apparatus in any one of the twenty-eighth through thirty-third aspects of the present invention, on the job selecting page, a list of the jobs spooled in the apparatus may be displayed.

According to a thirty-fifth aspect of the present invention, in the information processing apparatus in any one of the thirtieth through thirty-third aspects of the present invention, on the job selecting page, a list of jobs, selected from among those spooled in the apparatus on the job selecting page to be actually executed by the apparatus, may be displayed.

According to a thirty-sixth aspect of the present invention, in the information processing apparatus in any one of the twenty-eighth through thirty-fifth aspects of the present invention, the information processing apparatus may be an image forming apparatus.

According to a thirty-seventh aspect of the present invention, in the information processing apparatus in any one of the twenty-eighth through thirty-sixth aspects of the present invention, the jobs may be those given by a client terminal of the information processing apparatus.

According to a thirty-eighth aspect of the present invention, in the information processing apparatus in the thirty-sixth aspect of the present invention, the jobs may be printing jobs given by the client terminal of the information processing apparatus.

According to a thirty-ninth aspect of the present invention, an information processing method executed by an information processing apparatus includes the steps of: a) providing a job selecting page for selecting a job which the apparatus is made to execute, from among those spooled in the apparatus; and b) providing an authentication page for inputting authentication information required for causing the thus-selected job to be actually executed by the apparatus, wherein: inputting of the authentication information for a user on the authentication page is required for causing the job for the user selected on the job selecting page to be actually executed by the apparatus.

According to a fortieth aspect of the present invention, in the information processing method in the thirty-ninth aspect of the present invention, on the authentication page, operation of inputting the authentication information for a user may be achieved by operation of setting a recording medium in which the authentication information of the user is recorded, in the apparatus.

According to a forty-first aspect of the present invention, an information processing method executed by an information processing apparatus includes the step of: a) providing a job selecting page for selecting a job which the apparatus is made to execute, from among those spooled in the apparatus, wherein: when the authentication information for a user is input on the job selecting page, a job of the user is selected, from among those spooled in the apparatus, to be actually executed by the apparatus.

According to a forty-second aspect of the present invention, in the information processing method in the forty-first aspect of the present invention, on the job selecting page, operation of inputting the authentication information for a user may be achieved by operation of setting a recording medium in which the authentication information of the user is recorded, in the apparatus.

According to a forty-third aspect of the present invention, an information processing method executed by an information processing apparatus includes the step of:

a) providing a job selecting page for selecting a job which the apparatus is made to execute, from among those spooled in the apparatus, wherein: when the authentication information for a plurality of users is input on the job selecting page, jobs of the plurality of users are selected, from among those spooled in the apparatus, to be actually executed by the apparatus.

According to a forty-fourth aspect of the present invention, in the information processing method in the forty-third aspect of the present invention, on the authentication page, operation of inputting the authentication information for a plurality of users may be achieved by operation of setting a plurality of recording media in which the authentication information of the plurality of users is recorded, respectively, in the apparatus.

According to a forty-fifth aspect of the present invention, in the information processing method in any of the thirty-ninth through forty-fourth aspect of the present invention, on the job selecting page, a list of the jobs spooled in the apparatus may be displayed.

According to a forty-sixth aspect of the present invention, in the information processing method in any of the forty-first through forty-fourth aspects of the present invention, on the job selecting page, a list of jobs, selected from among those spooled in the apparatus on the job selecting page to be actually executed by the apparatus, is displayed, According to a forty-seventh aspect of the present invention, in the information processing method in the thirty-ninth through the forty-sixth aspect of the present invention, the information processing apparatus may be an image forming apparatus.

According to a forty-eighth aspect of the present invention, in the information processing method in any one of the thirty-ninth through forty-seventh aspects of the present invention, the jobs may be those given by a client terminal of the information processing apparatus.

According to a forty-ninth aspect of the present invention, in the information processing method in the forty-seventh aspect of the present invention, the jobs may be printing jobs given by the client terminal of the information processing apparatus.

According to a fiftieth aspect of the present invention, a program includes instructions for causing a computer to execute the information processing method in any one of the thirty-ninth through forty-ninth aspects of the present invention.

According to a fifty-first aspect of the present invention, a computer readable recording medium stores therein the program in the fiftieth aspect of the present invention.

In the configuration in any of the twenty-eighth through fifty-first aspects of the present invention, a novel information processing apparatus may be provided in which a job to be executed by the information processing apparatus can be selected from those spooled in the information processing apparatus.

Other objects and further features of the present invention will become more apparent from the following detailed description when read in conjunction with the accompanying drawings:

BRIEF DESCRIPTION OF THE DRAWINGS

FIG. 21 shows an operation sequence of CE authentication (in the case of card setting operation);

FIG. 22 shows an operation sequence of CE authentication (in the case of character inputting operation);

FIG. 23 shows pages in a first application example;

FIG. 24 shows an operation sequence of the first application example;

FIG. 25 shows pages in a second application example;

FIG. 32 shows an operation-sequence of the third embodiment (the third application example) of CE authentication;

FIG. 33 shows a page in the third application example;

FIG. 34 shows tables in a fourth application example;

FIG. 39 shows an operation sequence in the first embodiment of the printing job spool function according to the present invention;

FIG. 40 shows page transition in a second embodiment of the printing job spool function according to the present invention;

FIG. 41 shows an operation sequence in the second embodiment of the printing job spool function according to the present invention;

FIG. 42 shows page transition in a third embodiment of the printing job spool function according to the present invention; and FIG. 43 shows an operation sequence in the third embodiment of the printing job spool function according to the present invention.

DETAILED DESCRIPTION OF THE PREFERRED EMBODIMENTS

Figure 36:
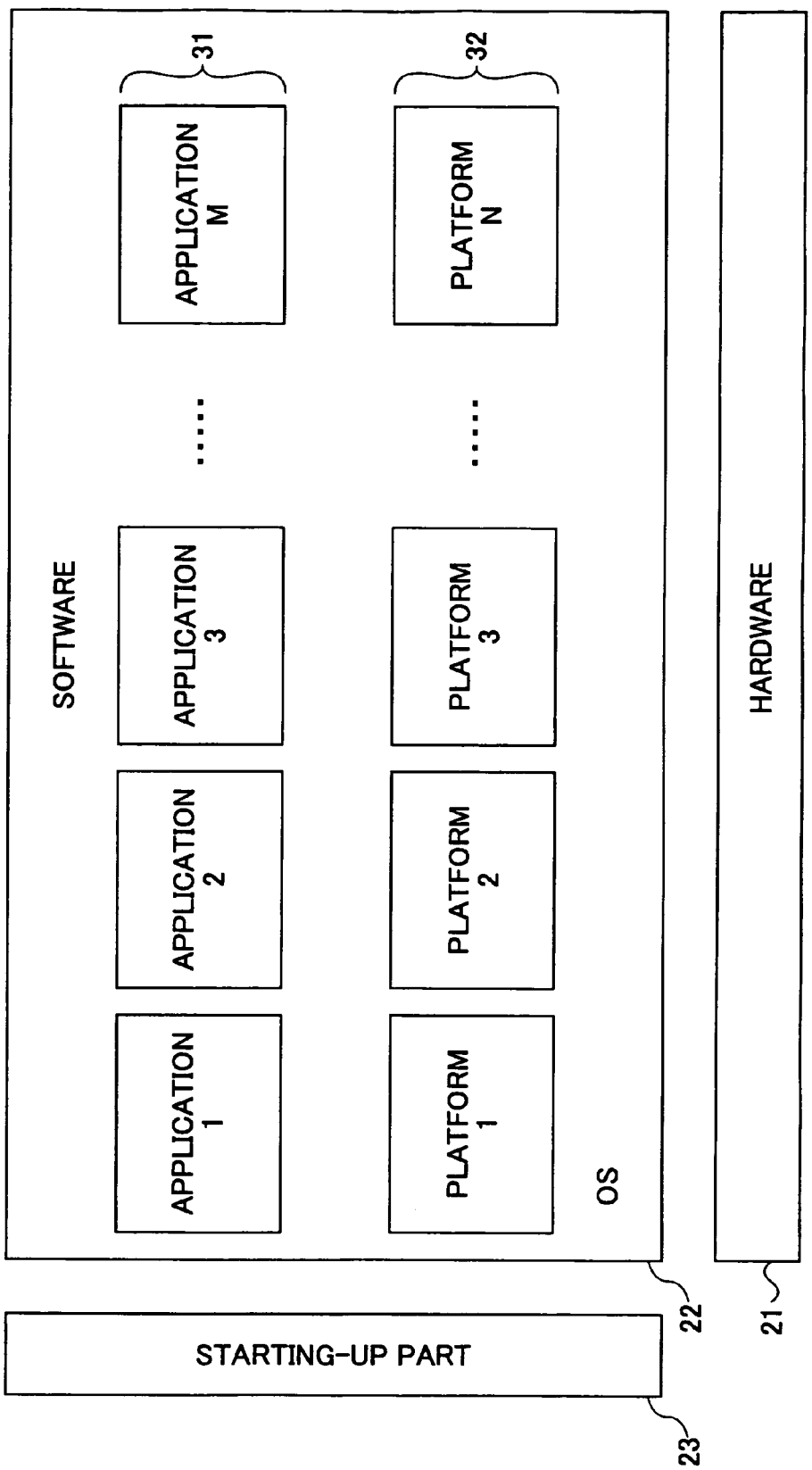
FIG. 36 shows an information processing apparatus according to an embodiment of the present invention.

FIG. 36 shows information processing apparatus 11 in one embodiment of the present invention. The information processing apparatus 11 shown includes a various types of hardware 21, various types of software 22 and a starting-up part 23.

The hardware 21 includes an information processing part such as a CPU, a ROM, a RAM, an HDD, and so forth; a communication part such as a MODEM, a NIC, and so forth; and an operation and display part such as a mouse, a display device and so forth.

The software 22 includes various applications 31 and various platforms 32. The platforms include a module carrying out control concerning the information processing part, a module carrying out an agent function concerning the communication part, a module carrying out control concerning the operation and display part, a module concerning management of user information, and a module carrying out control concerning system management. These programs are parallelly executable for process units under control of an OS (operating system) such as UNIX (registered trademark).

The starting-up part 23 is first executed when power is turned on in the information processing apparatus 11. Thereby, the OS such as UNIX is started up, and the applications 31 and platforms 32 are started up. These programs are stored in the HDD or a memory card, are read therefrom, and are started up in the RAM.

As an example of the information processing apparatus 11, an information device having an information processing function as a main function, or an electric device having an information processing function as an auxiliary function. As the information device, a personal computer may be cited. As the electric device, an image forming apparatus such as a copier, a printer, a scanner, a facsimile machine, a composite machine, a fusion machine or such, for which the information processing function is highly improved recently, may be cited. Next, a fusion machine 101 as a specific example of the information processing apparatus 11 is described.

Figure 1:
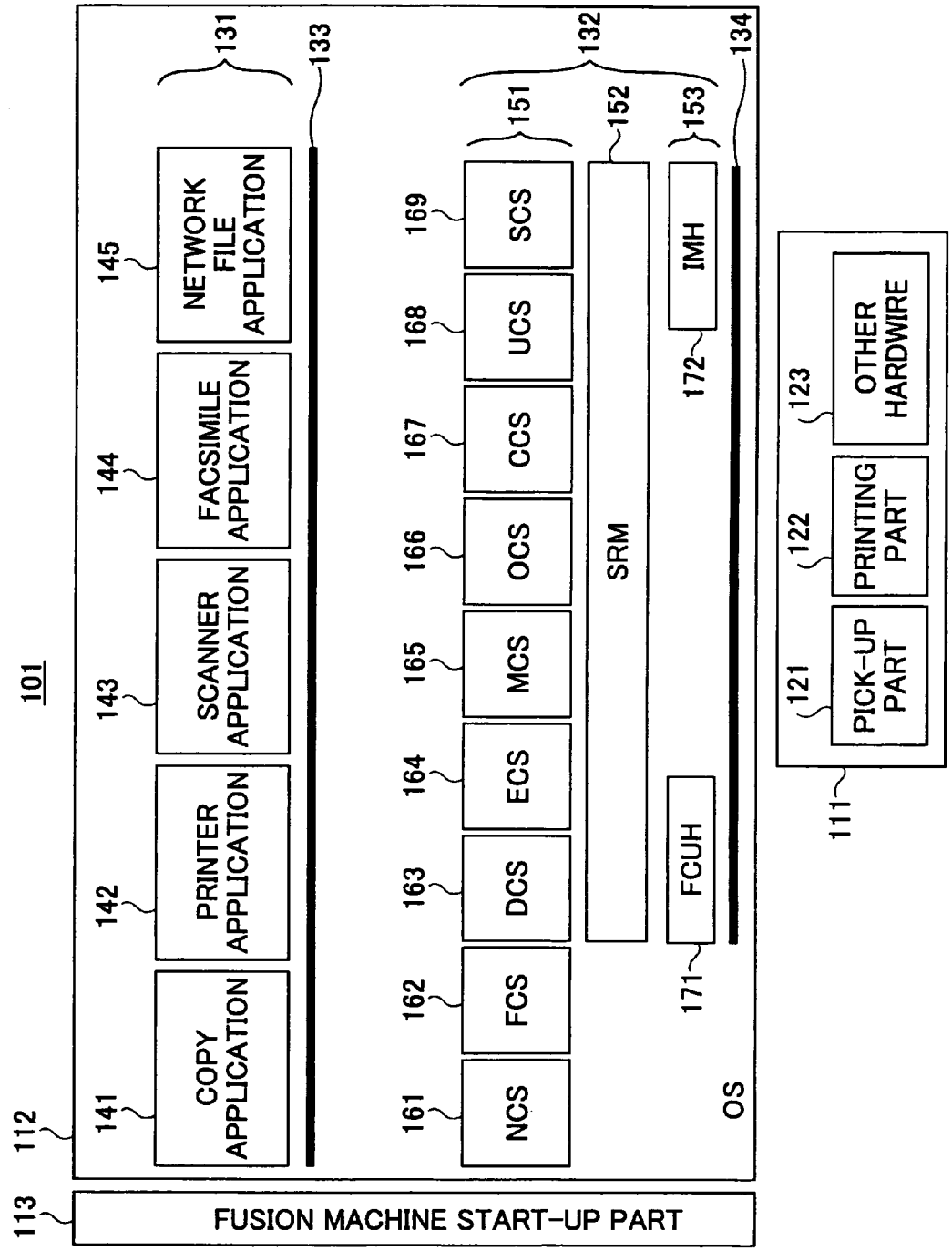
FIG. 1 shows a fusion machine according to an embodiment of the present invention.

FIG. 1 shows the fusion machine 101 according to any one of first and second embodiments of the present invention. The fusion machine 101 shown includes various types of hardware 111, various types of software 112 and a fusion machine starting-up part 113. The fusion machine 101 can function as any one of a copier, a printer, a scanner and a facsimile machine, as mentioned above.

The hardware 111 includes, as shown, an image pick-up part 121, a printing part 122 and others 123.

The image pick-up part 121 functions to read an image (image data) from an original, and is applied when the fusion machine 101 acts as a copier or a facsimile machine. The image pick-up part 121 may be of a type for a monochrome image or a type for a color image. The image pick-up part includes an original setting part or such as a mechanism for handling a draft or an original.

The printing part 122 functions to print an image (image data) onto a printing medium such as a printing paper sheet, and is applied when the fusion machine 101 acts as a copier, a printer or a facsimile machine. The printing part 122 may be of a type for a monochrome image or a type for a color image. The printing part 122 is of an electrophotographic type, and includes a photosensitive body, an electric charger, an exposing device, a developing device, a transfer device, a fixing device and so forth. The printing part 122 also includes, as a mechanism for handling printing paper sheets and so forth, a paper feeding part, a paper ejecting part, a printing paper conveying mechanism, and so forth.

The other hardware 123 is described with reference to FIG. 2 later.

The software 112 includes various applications 131 and various platforms 132. These programs are executed in parallel for process units by an OS (operating system) such as a UNIX (registered trademark).

The applications 131 are software for executing information processing unique to functions of each of a function for acting as the copier, printer, scanner, and facsimile machine and so forth. The applications 131 include a copy application 141 for a copying operation, a printer application 142 for a printing function, a scanner application 143 for a scanning function, a facsimile application 144 for a facsimile function and a network file application 145 for handling a network file. The network file application 145 includes a Web browser for browsing HTML documents or such, a Web server software for dispatching HTML documents, and so forth.

The platforms 132 are software for executing information processing concerning processing requests given by the applications 131. An application program interface (API) 133 which receives processing requests by functions previously defined is applied for receiving the processing requests from the applications 131. An engine interface 134 is applied for actually executing the contents of the requests. The platforms 132 include various control services 151, a system resource manger 152 and various handlers 153.

The control services 151 interpret the processing requests from the applications 131, and create acquisition requests for the hardware 111 according to the interpreted results. The control services 151 include a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 166, a user directory control service (UCS) 168, and a system control service (SCS) 169.

A process of the NCS 161 executes an agent function for carrying out data communication through a communication network or such. A process of the FCS 162 provides an API for carrying out image data communication, image data reading, and image data printing or such as facsimile functions. A process of the DCS 163 carries out control concerning dispatch of document data stored in the fusion machine 101. A process of the ECS 164 carries out control concerning an engine part such as the image pick-up part 121, the printing part 122 and so forth. A process of the MCS 165 carries out control concerning memories for image data storage, image data processing or such, and a hard disk drive. A process of the OCS carries out control concerning the operation panel. A process of the CCS 167 carries out authentication processing and accounting processing. A process of the UCS 168 carries out control concerning user information management. A process of the SCS 169 carries out control concerning system management.

The system resource manager (SRM) 152 carries out control for carrying out arbitration of the acquisition requests, and, carrying out the request contents according to the arbitration result. In details, a process of the SRM 152 determines whether or not the hardware 111 concerning the acquisition request is available (whether or not any collision occurs with another acquisition request), and, when available, this matter is notified of to each process of the control service 151. Further the process of the SRM creates a schedule for using the hardware 111 concerning the acquisition requests, and carries out control of executing the request contents according to the schedule.

The handlers 153 manage the hardware 111 according to the arbitration results. The handlers 153 include a facsimile control handler (FCUH) 171 and an image memory handler (IMH) 172. The FCUH 171 manages a facsimile control unit. The IMH 172 designates memories for respective processes, and manages the thus-designated memories.

The fusion machine starting-up part 113 is executed when power supply is started in the fusion machine 101. Thereby, the OS such as UNIX is started up, and the applications 131 and the platforms 132 are started up. These programs are stored in the hard disk drive or a memory card, are read out therefrom, and are started up in the memories.

Figure 2:
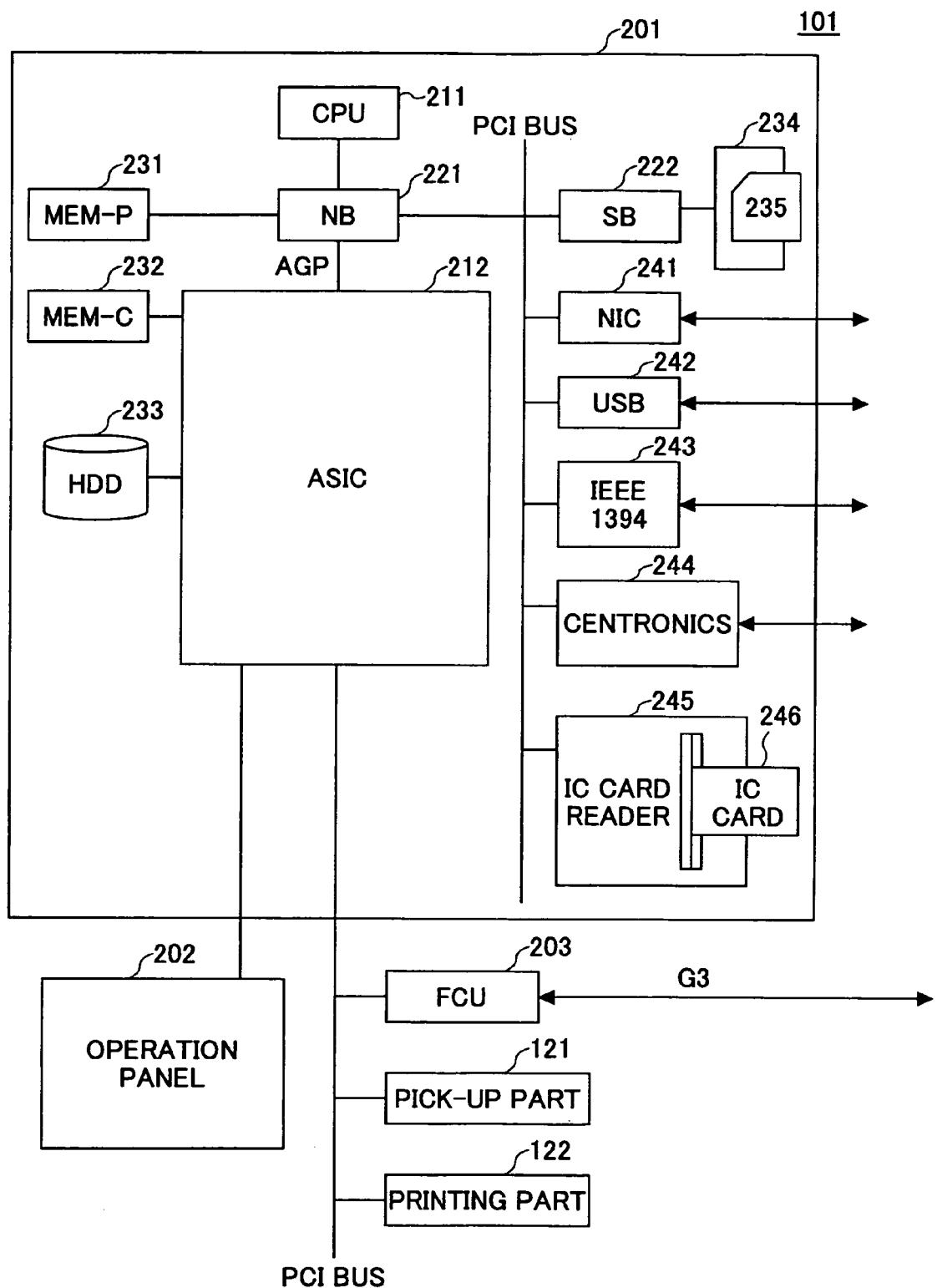
FIG. 2 shows a hardware configuration of the fusion machine of FIG. 1.

FIG. 2 shows a hardware configuration diagram of the fusion machine 101 shown in FIG. 1. The hardware 111 of the fusion machine 101 includes a controller 201, the operation panel 202, the facsimile control unit (FCU) 203, the image pick-up part 121 and the printing part 122. The respective parts other than the image pick-up part 121 and the printing part 122 correspond to the other hardware 123.

The controller 201 includes a CPU 211, an ASIC 212, an NB (north bridge) 221, a SB (south bridge) 222, an MEM-P (system memory) 231, a MEM-C (local memory) 232, the HDD (hard disk drive) 233, a memory card slot 234, the NIC (network interface controller) 241, a USB device 242, an IEEE 1394 device 243, a centronics device 244 and an IC card reader 245.

The CPU 211 is an IC for executing various types of information processing, and executes the applications 131 or the platforms 132 in parallel for process units with the use of the OS such as UNIX. The ASIC 212 is an IC for image processing. The NB 221 is a bridge for connecting the CPU 211 with the ASIC 212. The SB 222 is a bridge for connecting with peripheral devices. The ASIC 212 and the NB 221 are connected together via an AGP (accelerated graphics port).

The MEM-P 231 is a memory connected with the NB 221. The MEM-C 232 is a memory connected with the ASIC 212. The HDD 233 is a storage connected with the ASIC 212, and is applied for image data storage, document data storage, program storage, font data storage, form data storage, or such. The memory card slot 234 is a slot connected to the SB 222, and is applied to set (insert) a memory card 235 therein.

The NIC 241 is a controller for carrying out data communication with the use of a MAC address or such via the communication network or such. The USB device 242 is a device providing a serial port conforming to the USB standard. The IEEE 1394 device is a device providing a serial port conforming to the IEEE 1394 standard. The centronics device 244 is a device providing a parallel port conforming to the centronics standard. The NIC device 241, the USB device 242, the IEEE 1394 device 243, the centronics device 244 and the IC card reader 245 are connected to the NB 221 and SB 222 via a PCI (peripheral component interconnect) bus.

The operation panel 202 is hardware (operation part) for an operator to input information/instructions to the fusion machine 101 and also, is hardware (display part) for the operator to obtain an output from the fusion machine 101. The operation panel 202 is connected to the ASIC 212. The FCU 203, the image pick-up part 121 and the printing part 122 are connected to the ASIC 212 via the PCI bus.

Figure 3:
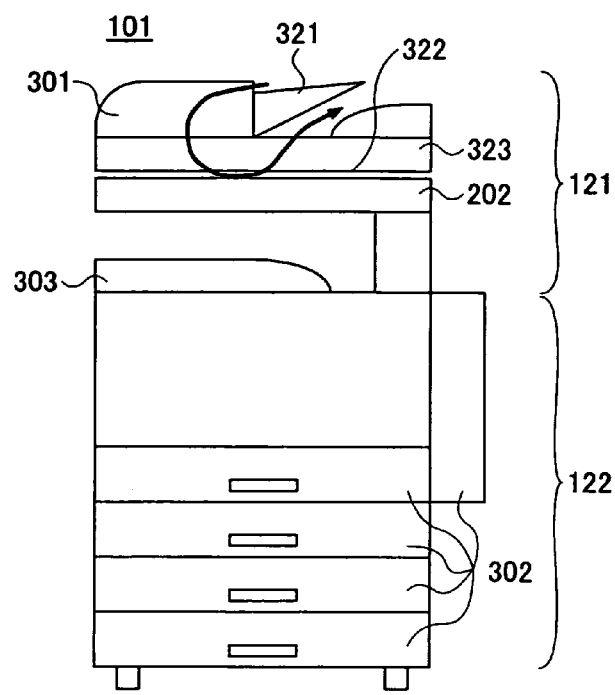
FIG. 3 shows an outline of the fusion machine of FIG. 1.

FIG. 3 shows an exterior appearance of the fusion machine 101. In FIG. 3, an actual position of the image pick-up part 121, an actual position of the printing part 122 and an actual position of the operation panel 202 are shown. Further, in FIG. 3, an original setting part 301 on which an original is set, a paper feeding part 302 used for feeding printing paper sheets or such, and a paper ejecting part 303 to which printing paper sheets or such are ejected are shown. The original setting part 301 is included in the image pick-up part 121, and the paper feeding part 302 and the paper ejecting part 303 are included in the printing part 122.

Figure 4:
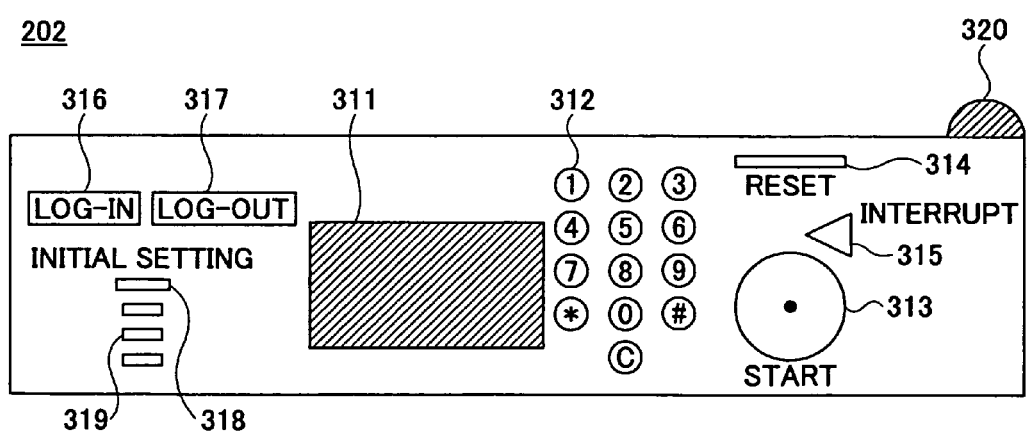
FIG. 4 shows an operation panel.

As shown in FIG. 4, the operation panel 202 includes a touch panel 311, ten keys 312, a start button 313, a reset button 314, an interrupt button 315, a log-in button 316, a log-out button 317, an initial setting button 318, a function key 319 and a patrol lamp 320.

The touch panel 311 is hardware for a user to input information/instructions with finger touch operation (touch operation part), and also, is hardware from which a visual output is obtained by a user in a form of page display (image display part). The ten keys 312 are hardware with which numerical input is carried out with key operation. The start button 313 is hardware with which start operation is carried out with button pressing operation. The reset button 314 is hardware with which resetting operation is carried out with button pressing operation. The interrupt button 315 is hardware with which interrupt operation is carried out with button pressing operation. The log-in button 316 is hardware with which log-in operation is carried out with button pressing operation. The log-out button 317 is hardware with which log-out operation is carried out with button pressing operation. The initial setting button 318 is hardware with which an initial setting page is displayed with button pressing operation. The function key 319 is hardware with which a copy operation page, a printer operation page, a scanner operation page, or a facsimile operation page is displayed with key operation. The patrol lamp 320 is hardware with which alarm output is carried out by the lighten lamp.

When an original is set in the original setting part 301, the fusion machine 101 reads an image from the original with the use of the image pick-up part 121 in response to the start button 133 being pressed. When acting as a copier, the fusion machine 101 prints the image onto a printing paper sheet or such with the use of the printing part 122. On the other hand, when the fusion machine 101 acts as a facsimile machine, the image is transmitted to another apparatus via a telephone line, a communication network or such, with the use of the FCU 203 and the NIC 241. As mentioned above, the printing paper sheets or such are fed to the paper feeding part 302, while, to the paper ejecting part 303, the printing paper sheets or such are ejected after images are produced thereon by the printing function.

The original setting part 301 includes an ADF (automatic draft feeder) 321, a flat bed 322, and a flat bed cover 323. The paper feeding part 302 includes four paper feeding trays and one manual paper feeding tray. The paper ejecting part 303 includes one paper ejecting tray.

The ADF 321 is configured to allow a plurality of original paper sheets to be set therein. When the original is set in the ADF 321, the fusion machine 101 reads an image of the original with the use of the image pick-up part 121 when the start button 313 is pressed. In detail, when a plurality of paper sheets of original are set in the ADF 321, the plurality of paper sheets are conveyed, sheet by sheet, as indicated by an arrow shown, when the start button 313 is pressed, and the image pick-up part 121 reads images, one by one, from the original thus conveyed thereto, sheet by sheet.

On the flat bed 322, the original is set in a manner in which the obverse side thereof faces downward. When the original is set in the flat bed 322, the fusion machine 101 reads an image of the original with the use of the image pick-up part 121 when the start button 313 is pressed. In detail, when the original is set in the flat bed 322 in the manner in which the obverse side thereof faces downward, the image pick-up part 121 reads an image from the original, which the image pick-up part 121 faces through the transparent flat bed 322, when the start button 313 is pressed.

A CE and a CE mode of the fusion machine 101 of FIG. 1 is described now.

A purpose of the present invention is to limit a range of operation of the fusion machine 101 which a CE (an abbreviation of a customer engineer, also the same hereinafter) is allowed to carry out, for the purpose of avoiding possible leakage of user's confidential information to the CE or illegal usage of confidential information by the CE. Generally, various sorts of jobs concerning the applications 141 through 145 shown in FIG. 1 which the user expects the fusion machine 101 to execute are not allowed for the CE, while operation directly carried out on the hardware 111 is allowed for the CE for the purpose of repair, maintenance or such. Specific examples of the maintenance operation allowed for the CE are as follows:

cleaning of remaining toner;

test printing (for the purpose of checking for toner stains, skew printing, printing position shift or such;

immutable toner control;

white reference adjustment;

time-out duration adjustment;

data compression method change; and facsimile address book editing.

Figure 5:
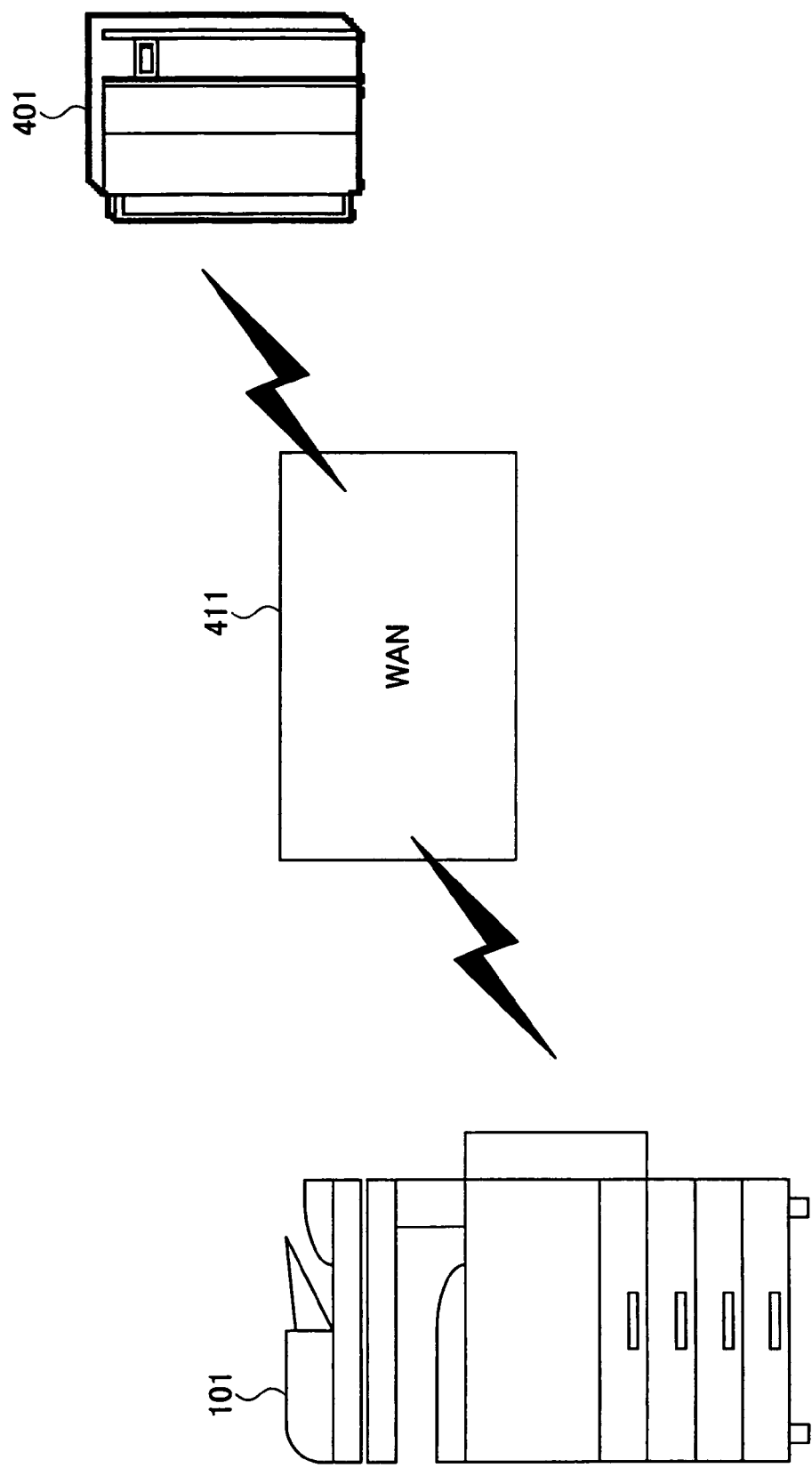
FIG. 5 shows a network configuration concerning the fusion machine of FIG. 1.

A service mode "CE mode" is prepared for the purpose that, on the fusion machine 101 of FIG. 1, a service person "CE" carrying out maintenance service of the fusion machine 101 carries out predetermined maintenance service. For example, the CE performs a software maintenance service such as cancellation of a password of an accumulation document, or a hardware maintenance service such as adjustment of a print position of an image or such. For example, the fusion machine 101 of FIG. 1 is connected to a service center (service base station) 401 by a server computer and a WAN 411 such as a telephone communication line as shown in FIG. 5.

Next, the CE and the CE mode of the fusion machine 101 of FIG. 1 are described with reference to figures of pages (figures of page transition). These pages are displayed on the touch panel 311, and operation on these pages are carried out by touching operation made on the touch panel 311. The SCS169 takes a role to provide these pages.

Figure 6:
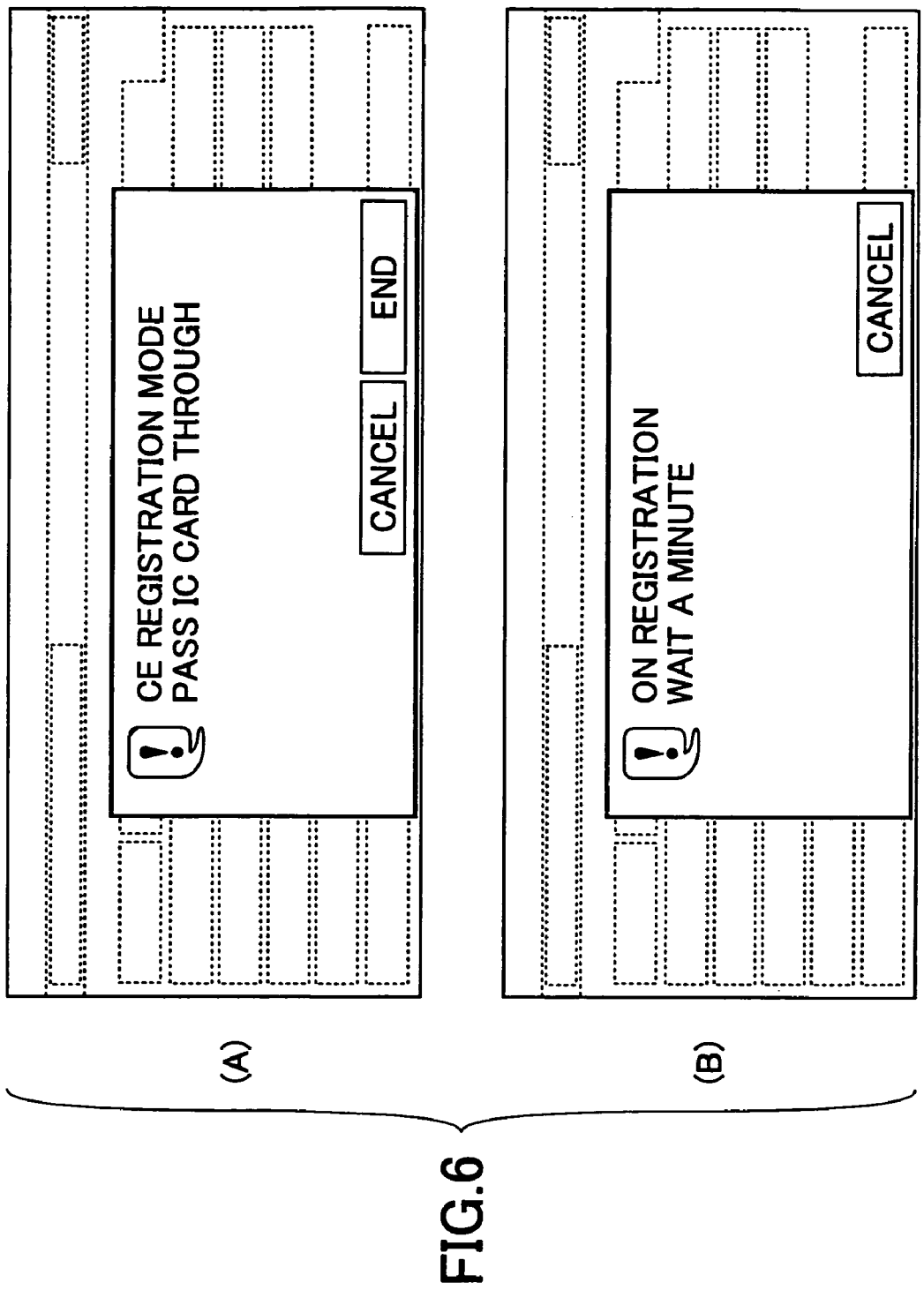
FIG. 6 shows page transition in a first embodiment of CE registration.

FIG. 6 shows page transition according to a first embodiment of CE registration in the fusion machine 101 of FIG. 1.

FIG. 6, (A) shows a registration page to register a CE as a CE carrying out maintenance service of the fusion machine 101. In the page of FIG. 6, (A), registration operation to register a CE as a CE carrying out maintenance service of the fusion machine 101 can be performed. In response to registration operation on the registration page of FIG. 6, (A), a CE of a registration target is registered in the fusion machine 101. The registration operation on the registration page of FIG. 6, (A) is, for example, actually carried out by a manager of the fusion machine 101.

Setting can be made such that, operation to set an IC card 246 (cf. FIG. 2), in which authentication information (for example, a name and a password) of the CE of the registration target is recorded, to the IC card reader 245 (cf. FIG. 2), while the registration page of FIG. 6, (A) is displayed on the touch panel, may have an effect as registration operation to register the CE, for example. Therefore, the registration operation on the registration page of FIG. 6, (A) is carried out under the attendance of the CE himself or herself who has brought the IC card 246 in which his or her authentication information is recorded. When the IC card 246 is set to the IC card reader 245, the registration page of FIG. 6, (A), changes to a registration wait page of FIG. 6, (B) while registration processing starts, and the registration page of FIG. 6, (A) is displayed again when the registration processing ends. Thus, the CE, the registration target, is registered in the fusion machine 101.

Figure 7:
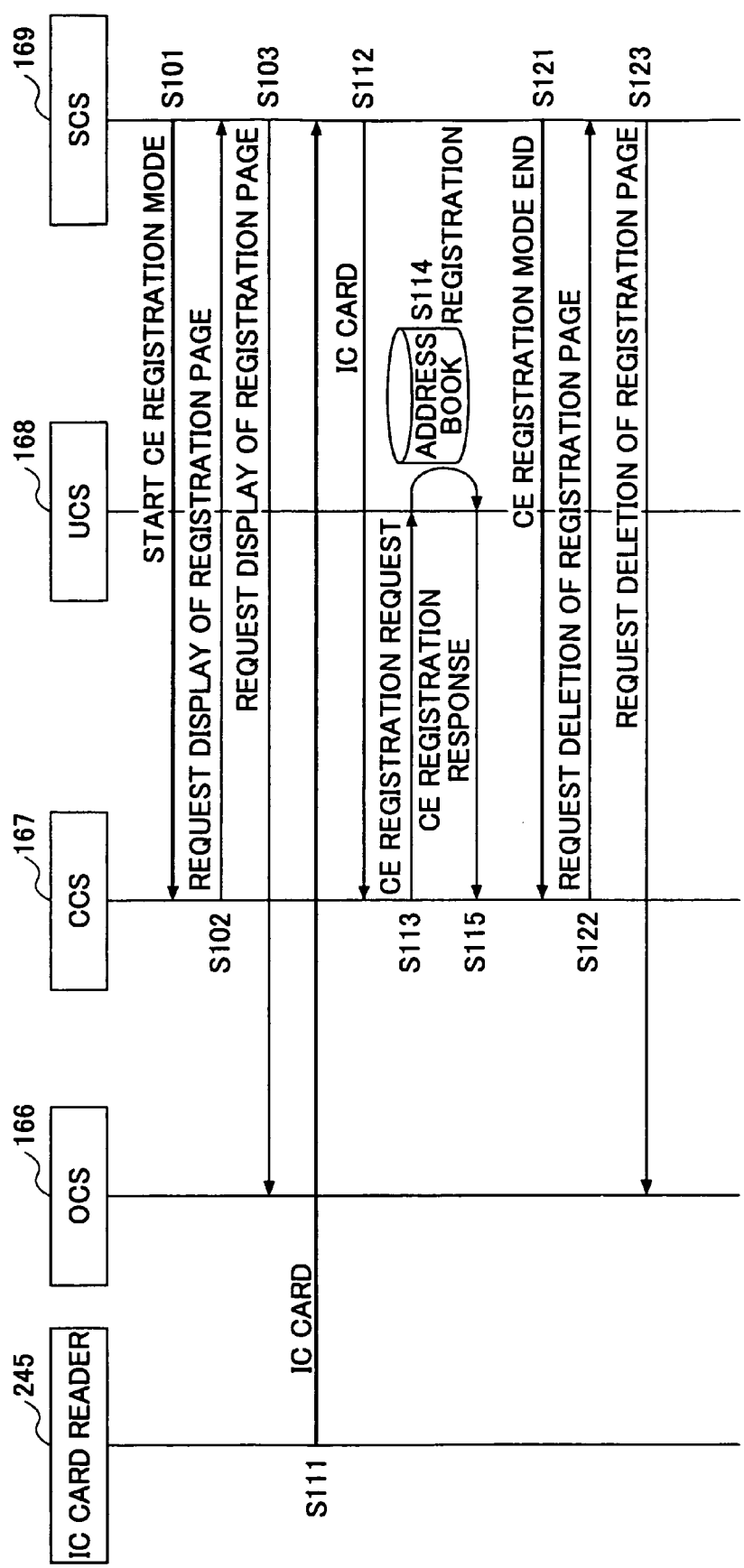
FIG. 7 shows an operation sequence of the first embodiment of CE registration.

FIG. 7 shows an operation sequence of the first embodiment of CE registration in the fusion machine 101 of FIG. 1.

When the manager of the fusion machine 101 operates the fusion machine 101 to cause it to enter the CE registration mode, the matter that the CE registration mode starts is notified of to the CCS167 by the SCS169 (S101). A display request for the registration page of FIG. 6, (A) is transmitted to the SCS169, in response thereto, from the CCS167 (S102). The display request for the registration page of FIG. 6, (A) is then transmitted to the OCS166 in response thereto, from the SCS169 (S103). When this is thus received by the OCS166, the registration page of FIG. 6, (A) is actually displayed on the touch panel 311.

Then, when the IC card 246 is set in the IC card reader 245 while the registration page of FIG. 6, (A) is thus displayed, this matter that the IC card 246 is set is notified of from the IC card reader 245 to the SCS169 (S111). The matter that the IC card 246 is set is then notified of to the CCS167 in response thereto, from the SCS169 (S112). A registration request for the CE is then transmitted to the UCS168 with the authentication information of the CE of the registration target (read out from the IC card 246), in response thereto, from the CCS167 (S113). In response thereto, the UCS168 stores the authentication information of the CE of the registration target in the fusion machine 101, and thus, the registration of the CE in the fusion machine 101 is achieved (S114). Subsequent thereto, a registration response for the CE is then transmitted to the CCS167 from the UCS168 (S115). Furthermore, the registration processing in Steps S111 through S115 is carried out on the registration page of FIG. 6, (A) again to register another CE, if any, in the fusion machine 101 when the IC card 246 is set to the IC card reader 245 again.

When the manager operates the fusion machine 101 so that the machine exits the CE registration mode, the matter that the CE registration mode has finished is notified of to the CCS167 of by the SCS169 (S121). A deletion request for the registration page of FIG. 6, (A) is transmitted to the SCS169 in response thereto, from CCS167 (S122). The deletion request for the registration page of FIG. 6, (A) is then transmitted to the OCS166 in response thereto, from the SCS169 (S123). When this is received by the OCS166, the registration page of FIG. 6, (A) is deleted from the touch panel 311.

Figure 8:
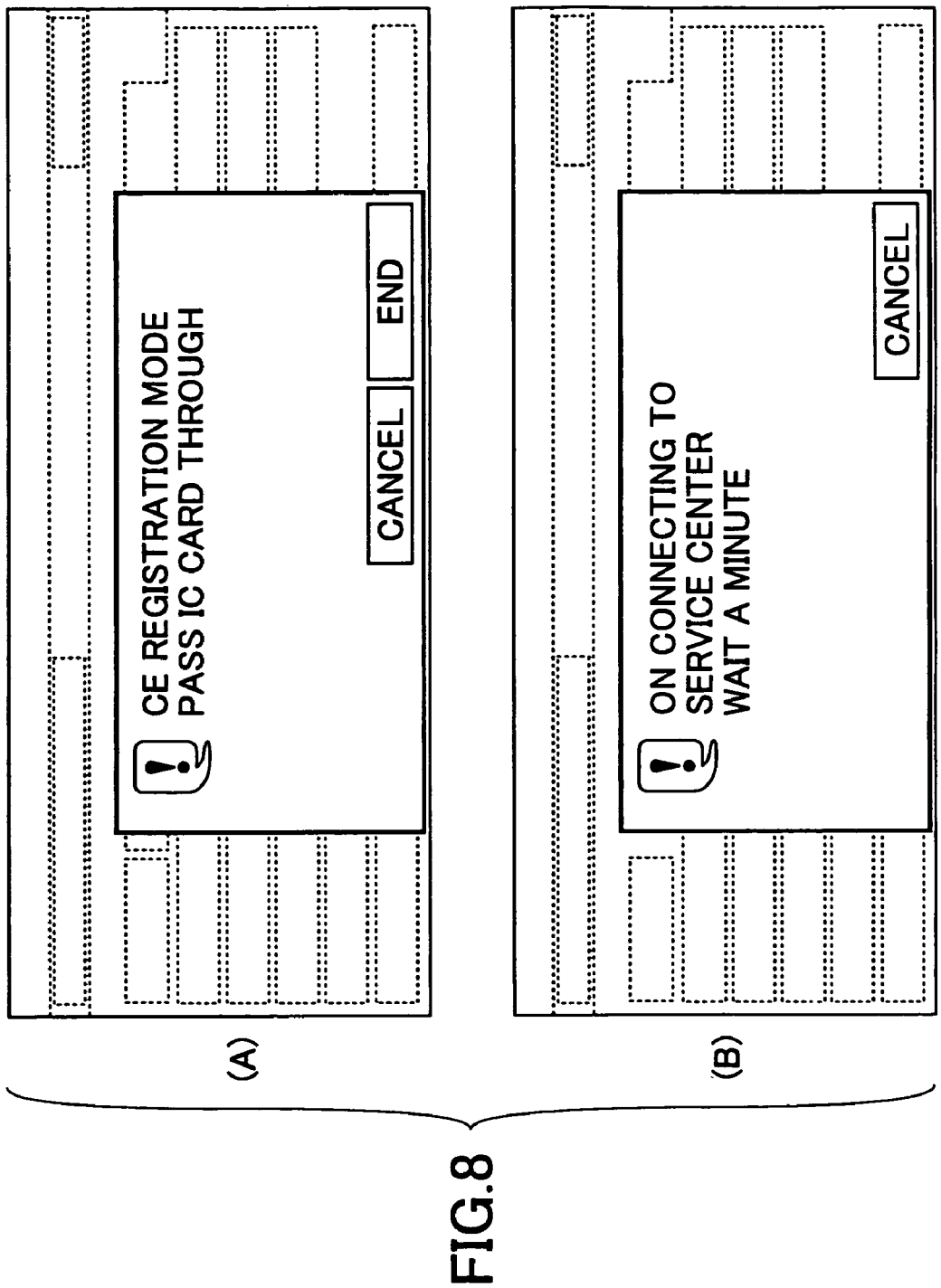
FIG. 8 shows page transition in a second embodiment of CE registration.

FIG. 8 shows page transition in a second embodiment of CE registration in the fusion machine 101 of FIG. 1.

FIG. 8, (A) shows a registration page to register a CE as a CE carrying out maintenance service of the fusion machine 101. In the page of FIG. 8, (A), registration operation to register a CE as a CE carrying out maintenance service of the fusion machine 101 can be performed. In response to registration operation made on the registration page of FIG. 8, (A), a CE of a registration target is registered in a service center 401 in this embodiment. Also in this embodiment, the registration operation made on the registration page of FIG. 8, (A) is carried out by the manager of the fusion machine 101.

Setting can be made such that, on the registration page of FIG. 8, (A), operation to set the IC card 246 (cf. FIG. 2) in which authentication information (for example, a name and a password) of a CE of a registration target is recorded to the IC card reader 245 (cf. FIG. 2) may have an effect as registration operation to register the CE. Thus, the registration operation on the registration page of FIG. 8, (A) is carried out under the attendance of the CE who has brought the IC card 246 in which his or her own authentication information is recorded. When the IC card 246 is set to the IC card reader 245 while the registration page of FIG. 8, (A) is displayed, the page changes into a registration wait page of FIG. 8, (B) while actual registration processing starts in the machine. Then, the registration page of FIG. 8, (A) is again displayed when the registration processing ends. Thus, the CE of the registration target is registered in the service center 401.

Figure 9:
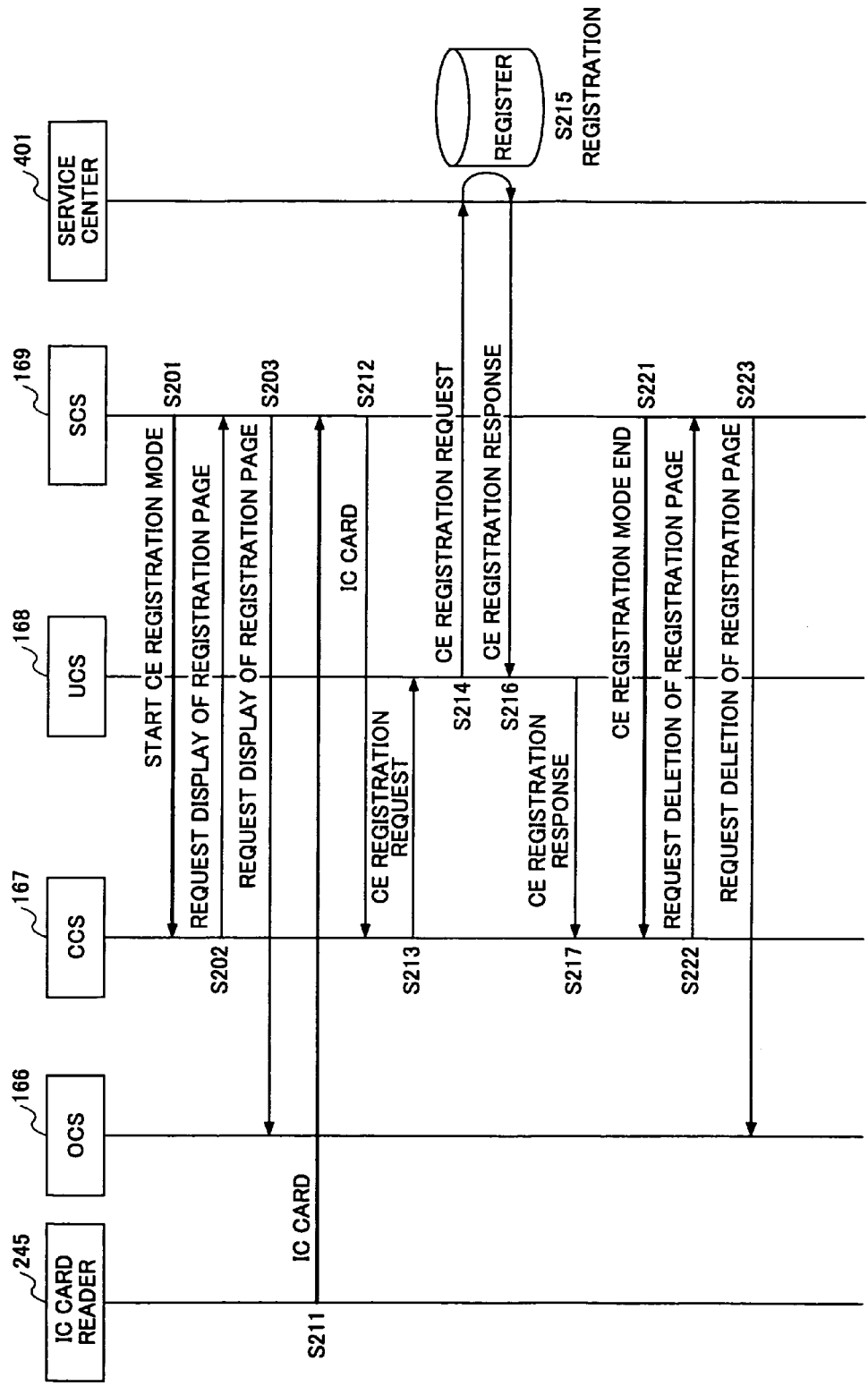
FIG. 9 shows an operation sequence of the second embodiment of CE registration.

FIG. 9 shows an operation sequence of the second embodiment of CE registration in the fusion machine 101 of FIG. 1.

When the manager of the fusion machine 101 operates the machine to cause it to enter the CE registration mode, the matter that the CE registration mode has began is notified of to the CCS167 from the SCS169 (S201). A display request for the registration page of FIG. 8, (A) is transmitted to the SCS169 in response thereto, from the CCS167 (S202). The display request for the registration page of FIG. 8, (A) is transmitted to the OCS166 in response thereto, from SCS169 (S203). When this is thus received by the OCS166, the registration page of FIG. 8, (A) is displayed on the touch panel 311.

Then, when the IC card 246 is set to the IC card reader 245 with the registration page of FIG. 8, (A) being displayed, the mater that the IC card 246 is set is notified of by the IC card reader 245 to the SCS169 (S211). The matter that the IC card 246 has been set is then notified of to the CCS167 in response thereto, from the SCS169 (S212). A registration request for the CE is then transmitted to the UCS168 with the authentication information of the CE of the registration target (read out from the IC card 246) in response thereto, from the CCS167 (S213). The registration request for the CE is then transmitted to the service center 401 with the authentication information of the CE of the registration target and an ID of the fusion machine 101 in response thereto, from the UCS168 (S214). In response thereto, the service center 401 which has received the information holds the authentication information of the CE of the registration target in the service center 401, and registration of the CE in the service center 401 is achieved there (S215). Subsequent thereto, a registration response for the CE is transmitted to the UCS168 from the service center 401 (S216). The registration response for the CE is then transmitted to the CCS167 in response thereto, from the UCS168 (S217). Furthermore, registration processing of Steps S211 through S217 is executed with the registration page of FIG. 8, (A) being displayed, again to register another CE, if any, in the service center 401 when the IC card 246 of the other CE is set to the IC card reader 245 again.

When the manager of the fusion machine 101 operates the machine so as to cause the same to exit the CE registration mode, the matter that the CE registration mode has finished is notified of to the CCS167 from the SCS169 (S221). A deletion request for the registration page of FIG. 8, (A) is then transmitted to the SCS169 in response thereto, by the CCS167 (S222). The deletion request for the registration page of FIG. 8, (A) is then transmitted to the OCS166 in response thereto, from the SCS169 (S223). When this is thus received by the OCS166, the registration page of FIG. 8, (A) is deleted from the touch panel 311.

Figure 10:
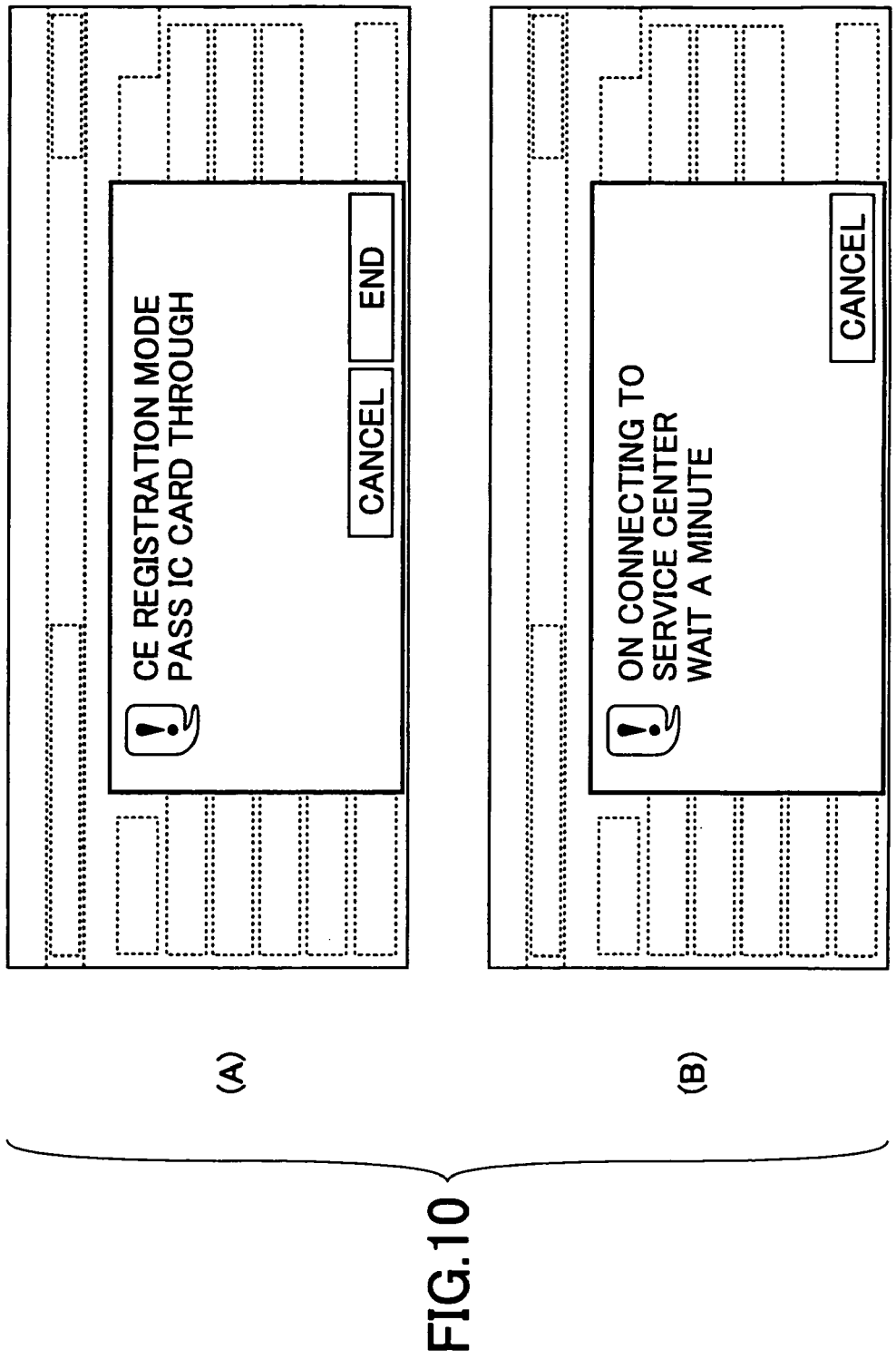
FIG. 10 shows page transition in a third embodiment of CE registration.

FIG. 10 shows page transition in a third embodiment of CE registration in the fusion machine 101 of FIG. 1.

FIG. 10, (A), shows a registration page to register a CE as a CE carrying out maintenance service of the fusion machine 101. On the page of FIG. 10, (A), registration operation to register a CE as a CE carrying out maintenance service of the fusion machine 101 can be performed. In response to registration operation made on the registration page of FIG. 10, (A), a CE of a registration target is referred to the service center 401 by the fusion machine 101, and after that, the CE is registered in the fusion machine 101. Registration operation on the registration page of FIG. 10, (A) is actually carried out by the manager of the fusion machine 101 also in this embodiment.

Setting can be made such that, with the registration page of FIG. 10, (A), being displayed, operation to set the IC card 246 (cf. FIG. 2) in which authentication information (for example, a name and a password) of the CE of the registration target is recorded to the IC card reader 245 (cf. FIG. 2) may have an effect as registration operation to register the CE. Thus, the registration operation on the registration page of FIG. 10, (A) is carried out under the attendance of the CE who has brought the IC card 246 in which his or her own authentication information is recorded. When the IC card 246 is set to the IC card reader 245 with the registration page of FIG. 10, (A), being displayed, the page changes into a registration wait page of FIG. 10, (B) while registration processing starts in the machine. The registration page of FIG. 10, (A) is again displayed when the registration processing ends. Then, after the CE of the registration target is referred to the service center 401, the CE is actually registered in the fusion machine 101.

Figure 11:
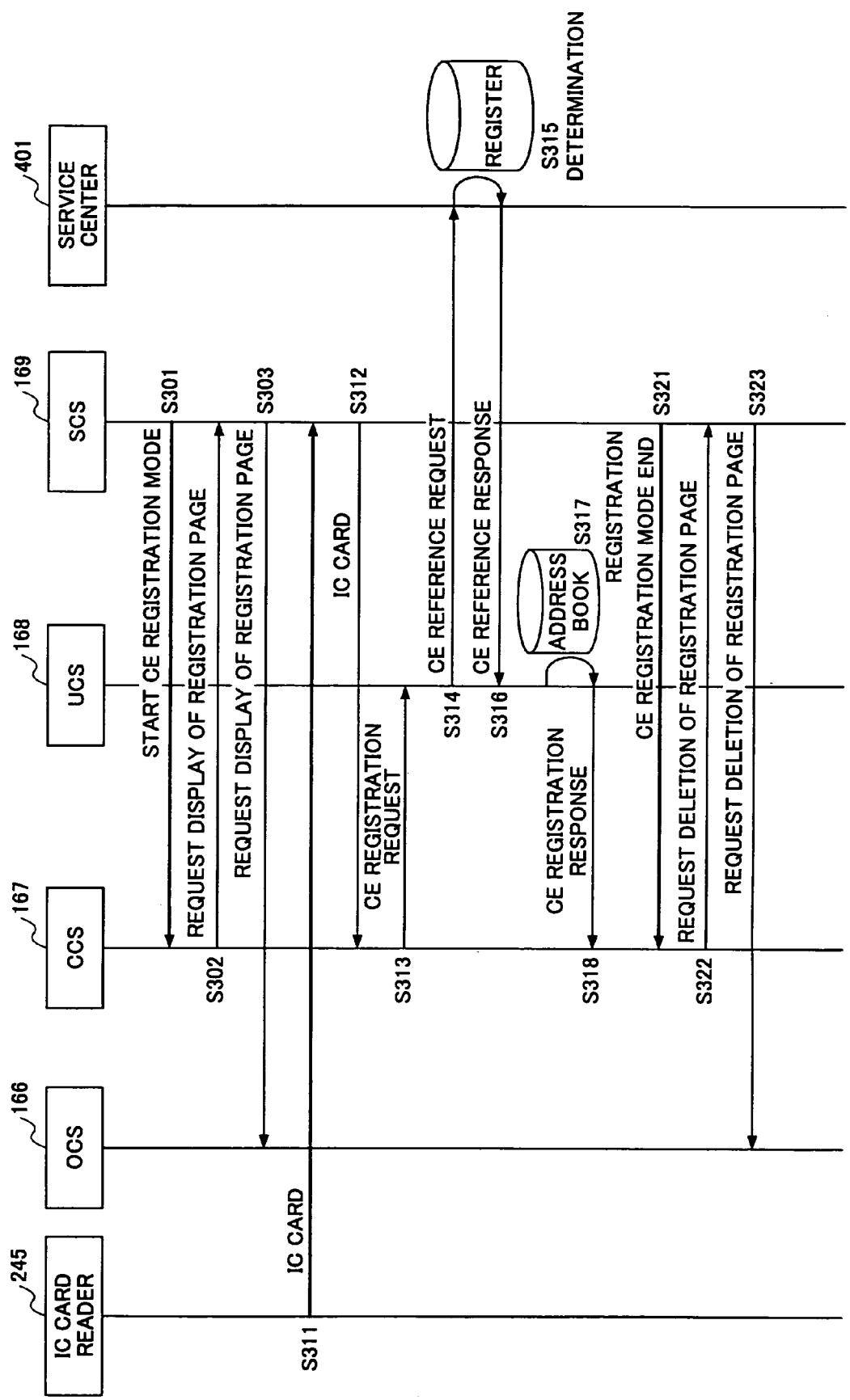
FIG. 11 shows an operation sequence of the third embodiment of CE registration.

FIG. 11 shows an operation sequence of the third embodiment of CE registration in the fusion machine 101 of FIG. 1.

When the manager of the fusion machine 101 operates the machine so as to cause it to enter the CE registration mode, the matter that the CE registration mode has began is notified of to the CCS167 from the SCS169 (S301). A display request for the registration page of FIG. 10, (A) is then transmitted to the SCS169 in response thereto, from the CCS167 (S302). The display request for the registration page of FIG. 10, (A) is then transmitted to the OCS166 in response thereto, from the SCS169 (S303). When this is thus received, the registration page of FIG. 10, (A) is displayed on the touch panel 311 by the OCS166.

Then, when the IC card 246 is set to the IC card reader 245 with the registration page of FIG. 10, (A) being displayed, the matter that the IC card 246 is set is notified of from the IC card reader 245 to the SCS169 (S311). The matter that the IC card 246 has been thus set is notified of to the CCS167 of in response thereto, from the SCS169 (S312). A registration request for the CE is then transmitted to the UCS168 with the authentication information of the CE of the registration target (read out from the IC card 246) in response thereto, from the CCS167 (S313). A reference request for the CE is then transmitted to the service center 401 with the authentication information of the CE of the registration target in response thereto, from the UCS168 (S314). In response thereto, the service center 401 makes a search for the authentication information of the CE of the registration target held in the service center 401 itself, and thus, has determined (S315) whether or not the CE has been registered in the service center 401. Subsequent thereto, a reference response for the CE is transmitted to the UCS168 from the service center 401 (S316). In response thereto, the UCS168 stores the authentication information of the CE of the registration target in the fusion machine 101, and registration (S317) of the CE in the fusion machine 101 is achieved. Subsequent thereto, a registration response for the CE is transmitted to the CCS167 by th UCS168 (S318). Furthermore, when the IC cared 246 is set to the IC card reader 246 for the purpose of registration of another CE, if any, after referring to the service center 401 therefor, registration processing from Steps S311 through S318 is executed with the registration page of FIG. 10, (A) being displayed, again.

When the manager of the fusion machine 101 operates the machine to cause it to exit the CE registration mode, the matter that the CE registration mode has finished is notified of to the CCS167 of by the SCS169 (S321). A deletion request for the registration page of FIG. 10, (A) is transmitted to the SCS169 in response thereto, by the CCS167 (S322). The deletion request for the registration page of FIG. 10, (A) is transmitted to the OCS166 in response thereto, by the SCS169 (S323). When this is thus received, the registration page of FIG. 10, (A) is deleted from the touch panel 311.

Description will now be made, with reference to FIGS. 12 and 13, with the above-mentioned third embodiment as a specific example, for registration processing (registration refusal processing) carried out when an illegal CE is being registered with the registration page of FIG. 6, (A), FIG. 8, (A) or FIG. 10, (A).

Figure 12:
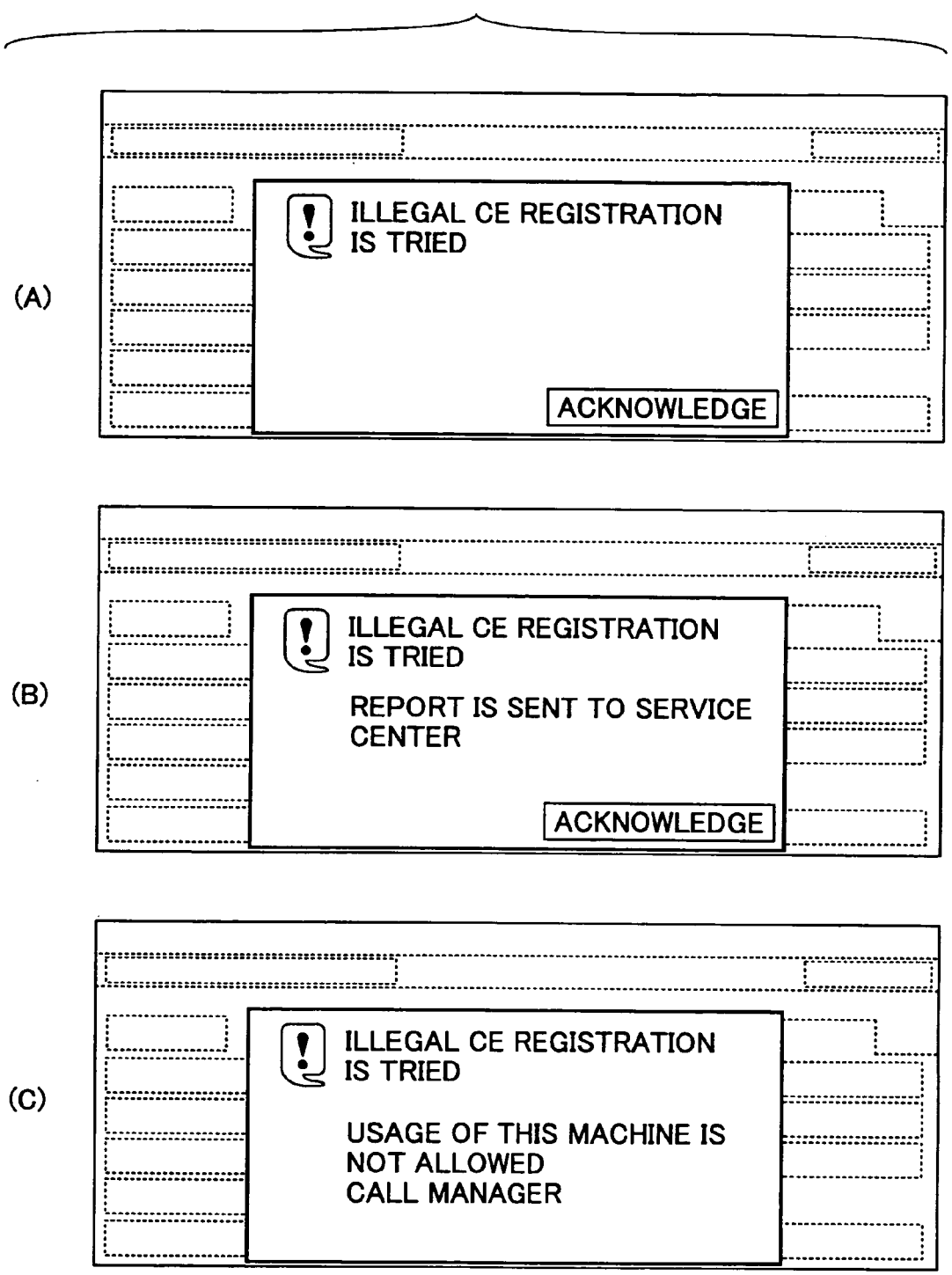
FIG. 12 shows pages concerning illegal CE registration.

FIG. 12 shows pages concerning illegal CE registration in the fusion machine 101 of FIG. 1.

When it is determined that a CE who is to be registered with the registration page is an illegal CE, the matter that the illegal CE is to be registered may be displayed on the touch panel 311 as shown in FIG. 12, (A).

When it is determined that the CE who is to be registered with the registration page is an illegal CE, the matter that the illegal CE is to be registered may be displayed on the touch panel 311 as shown in FIG. 12, (B), and the matter that the illegal CE is to be registered may be reported to the service center 401. In such a manner, the matter that the illegal CE is to be registered may be reported to the manager of the fusion machine 101 with an electronic mail and/or may be printed out.

When it is determined that a CE who is to be registered with the registration page is an illegal CE, the matter that the illegal CE is to be registered may be displayed on the touch panel 311 as shown in FIG. 12, (C), and also, the fusion machine 101 may be shut down forcibly. As an advantage of the scheme of FIG. 12 (C) as compared to that of FIG. 12. (B), this scheme is effective even when a network connector of the fusion machine 101 is removed by some cause.

Figure 13:
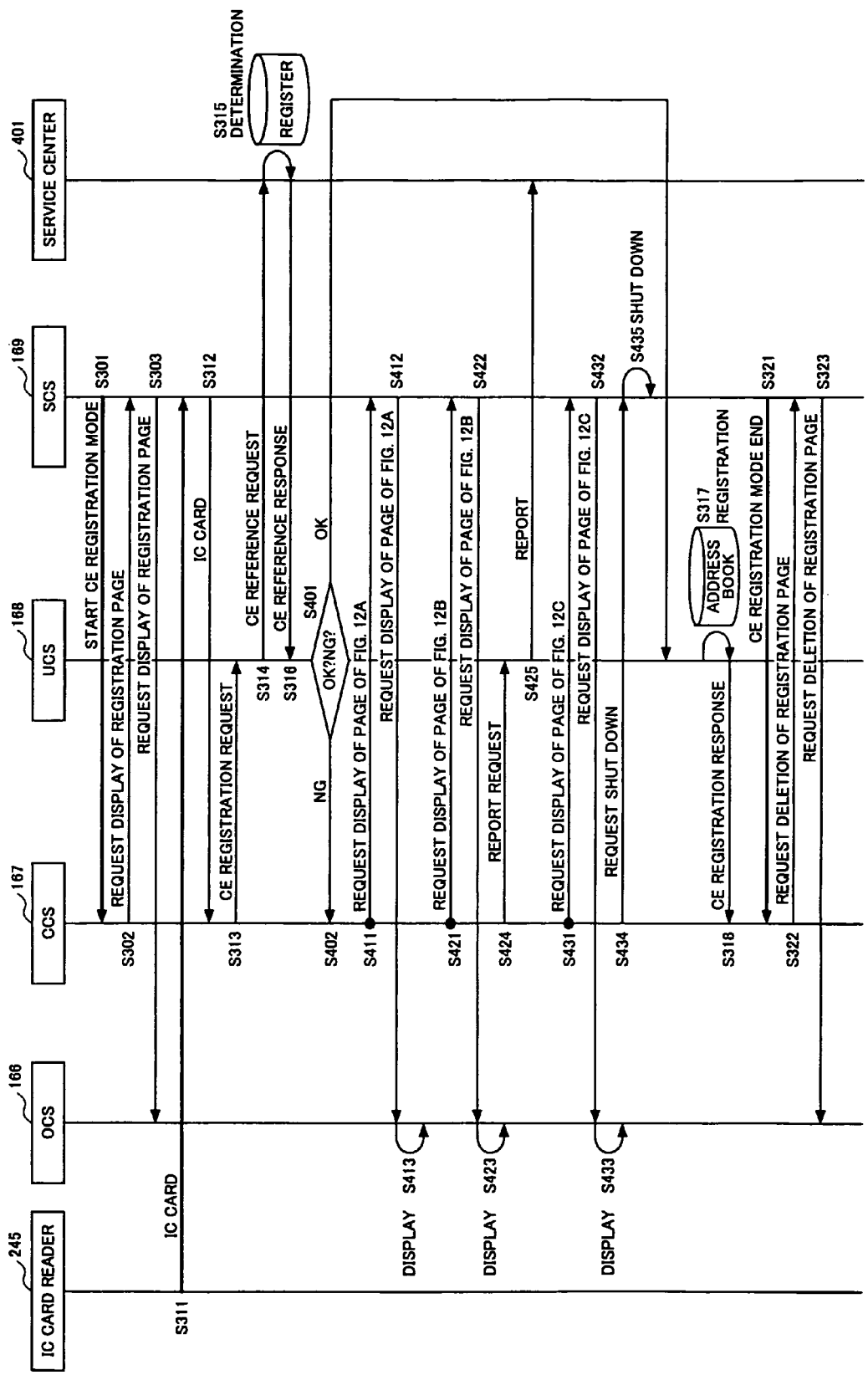
FIG. 13 shows an operation sequence concerning illegal CE registration.

FIG. 13 shows an operation sequence against illegal CE registration in the fusion machine 101 of FIG. 1.

It is noted that steps having the same reference numerals such as S301, S302, . . . , for example, have substantially the same processing contents throughout the operation sequences attached to the present application, and duplicated description thereof may be omitted.

As mentioned above, the matter that the IC card 246 is set is notified of from the IC card reader 245 to the SCS169 when the IC card 246 is set in the IC card reader 245 with the registration page being displayed (S311). The matter that IC card 246 has been set is notified of to the CCS167 of in response thereto, from the SCS169 (S312). A registration request for the CE is transmitted to the UCS168 with the authentication information of the CE of the registration target in response thereto, from the CCS167 (S313). A reference request for the CE is then transmitted to the service center 401 with the authentication information of the CE of the registration target in response thereto, from the UCS168 (S314). In response thereto, the service center 401 makes a search for the authentication information of the CE of the registration target held in the service center 401, and makes a determination (S315) whether or not the CE has been registered in the service center 401. Subsequent thereto, a reference response for the CE is transmitted to the UCS168 from the service center 401 (S316).

In response thereto, the UCS 168 determines whether or not a reference result for the CE is "OK" or "NG" (S401). By this, it can be determined whether the CE is a "proper CE" or an "illegal CE".

When it is determined that a CE who is to be registered with the registration page is a proper CE (S401), the UCS168 stores the authentication information of the CE in the fusion machine 101, and registration (S317) of the CE in the fusion machine 101 is thus achieved. Subsequent thereto, a registration response for the CE is transmitted to the CCS167 by the UCS168 (S318).

On the other hand, when it is determined that a CE who is to be registered with the registration page is an illegal CE (S401), the matter that the CE illegal is to be registered is notified of to the CCS167, in the case of FIG. 12. (A), by the UCS168 (S402). A display request for the page of FIG. 12, (A) is transmitted to the SCS169 in response thereto, by the CCS167 (S411). The display request for the page of FIG. 12, (A) is transmitted to the OCS166 in response thereto, by the SCS169 (S412). When this is thus received, the matter that an illegal CE is to be registered is displayed on the touch panel 311 (S413).

When it is determined that a CE who is to be registered with the registration page is an illegal CE (S401), the matter that a CE is illegal is notified of to the CCS167 in the case of FIG. 12, (B) by the UCS168 (S402). A display request for the page of FIG. 12, (B) is transmitted to the SCS169 in response thereto, by the CCS167 (S421). The display request for the page of FIG. 12, (B) is transmitted to the OCS166 in response thereto, by the SCS169 (S422). When this is thus received, the matter that an illegal CE is to be registered is displayed on the touch panel 311 (S423). A report request for the matter that an illegal CE is to be registered is then transmitted to the UCS168 by the CCS167 (S424). When this is thus received, the matter that illegal a CE is to be registered is reported to the service center 401 (S425).

When it is determined that a CE who is to be registered with the registration page is an illegal CE (S401), the matter that a CE is illegal is notified of to the CCS167 of in the case of FIG. 12, (C), by the UCS168 (S402). A display request for the page of FIG. 12, (C) is transmitted to the SCS169 in response thereto, by the CCS167 (S431). The display request for the page of FIG. 12, (C) is transmitted to the OCS166 in response thereto, by the SCS169 (S432). When this is thus received, the matter that an illegal CE is to be registered is displayed on the touch panel 311 (S433). A shut down request to shut down the fusion machine 101 is then transmitted to the SCS169 by the CCS167 (S434). When this is thus received, the fusion machine 101 is actually shut down (S435) forcibly.

Figure 14:
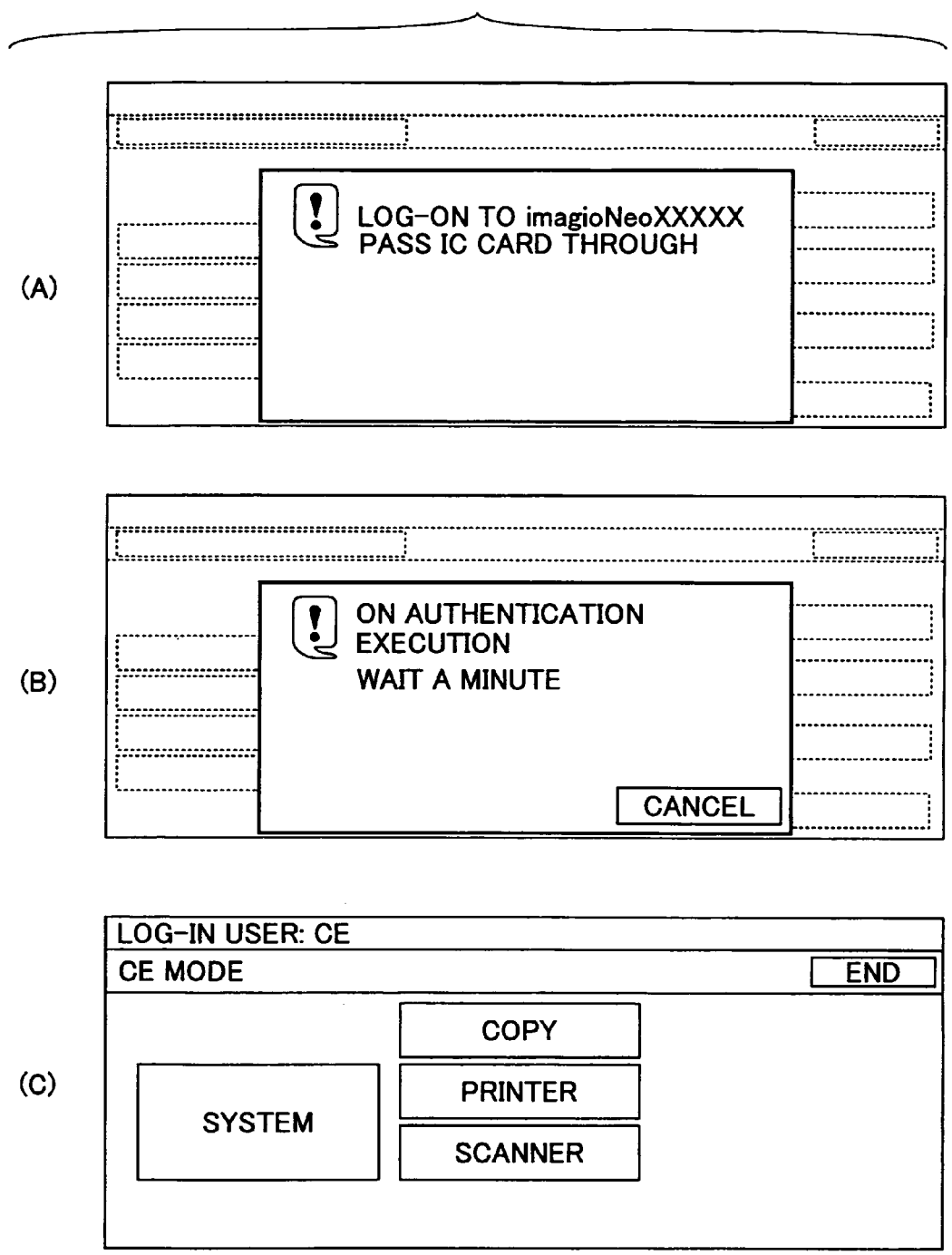
FIG. 14 shows page transition in a first embodiment of CE authentication.

FIG. 14 shows page transition in a first embodiment of CE authentication in the fusion machine 101 of FIG. 1.

FIG. 14, (A) shows an input page to input authentication information to prove a CE who is registered to carry out maintenance service of the fusion machine 101 with the page of FIG. 6, (A), so that the CE can log in as a CE performing maintenance service of the fusion machine 101, and to cause the machine to enter a CE mode. Input operation can be carried out with the page of FIG. 14, (A), to input the authentication information necessary for the CE registered for maintenance service of the fusion machine 101 with the page of FIG. 6, (A) as a CE carrying out logging-in as a CE performing maintenance service of the fusion machine 101, and to cause the machine to enter the CE mode. A CE registered with the registration page of FIG. 6, (A) logs in to the fusion machine 101 as a CE performing maintenance service of the fusion machine 101 by the input operation made with the input page of FIG. 14, (A), and the machine thus enters the CE mode.

Setting can be made such that, with the input page of FIG. 14, (A), operation to set the IC card 246 in which CE's authentication information (for example, name and password) is recorded to the IC card reader 245 may have an effect as the input operation of inputting the authentication information necessary to be input to the fusion machine 101 after logging in thereto as a CE performing maintenance service of the fusion machine 101, and causing the machine to enter the CE mode. When the IC card 246 is set to the IC card reader 245 with the input page of FIG. 14, (A) being displayed, the page changes to an authentication wait page of FIG. 14, (B) while authentication processing starts in the machine. Then, a CE mode initial page of FIG. 14, (C) is displayed when the authentication processing ends. The CE once registered with the registration page of FIG. 6, (A) can thus logs in to the fusion machine 101 as a CE performing maintenance service of the fusion machine 101, and cause the machine to enter the CE mode.

Figure 15:
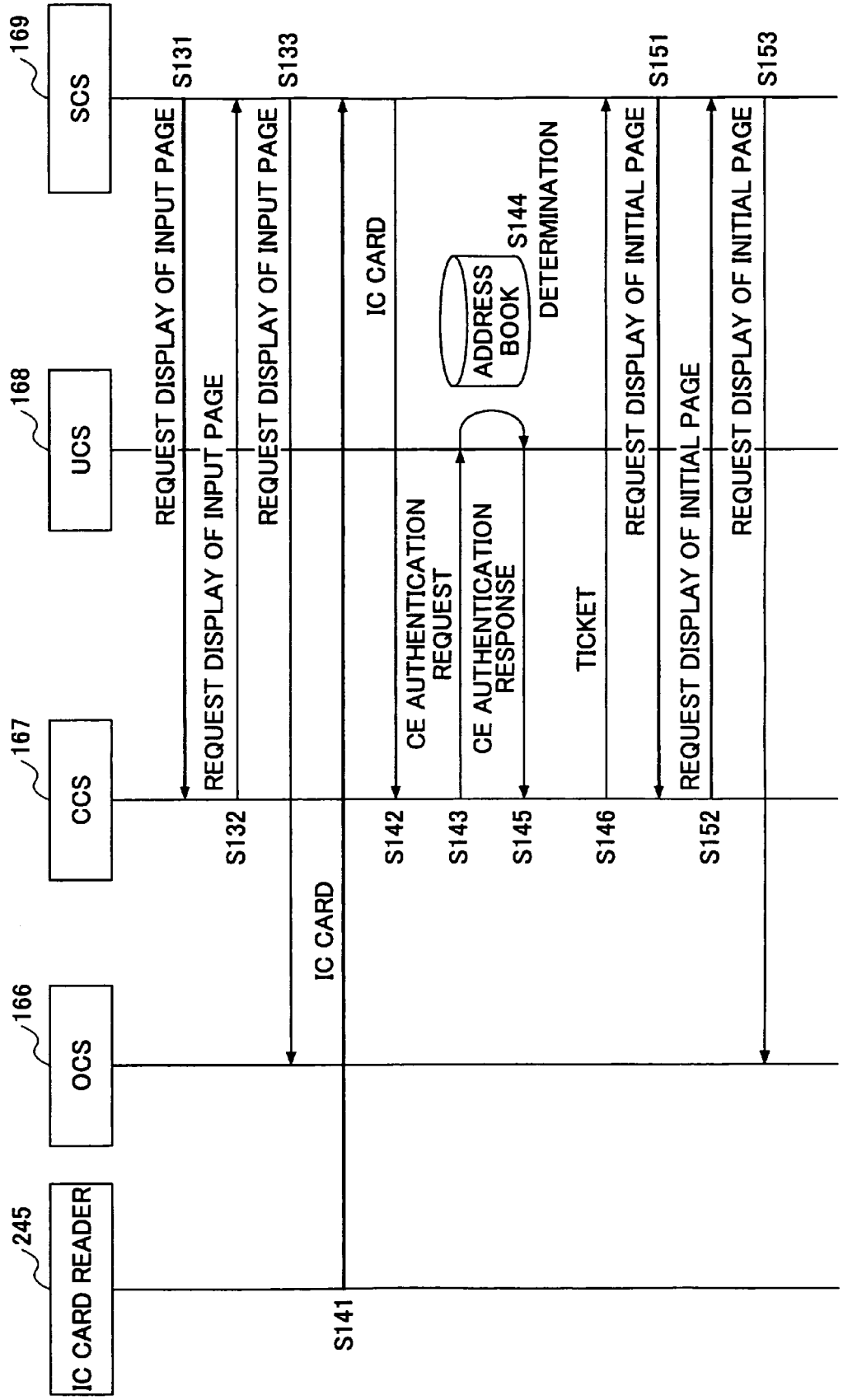
FIG. 15 shows an operation sequence of the first embodiment of CE authentication.

FIG. 15 shows an operation sequence of the first embodiment of CE authentication in the fusion machine 101 of FIG. 1.

At first, a display request for the input page of FIG. 14, (A) is transmitted to the CCS167 by the SCS169 (S131). The display request for the input page of FIG. 14, (A) is transmitted to the SCS169 in response thereto, by the CCS167 (S132). The display request for the input page of FIG. 14, (A) is transmitted to the OCS166 in response thereto, by the SCS169 (S133). When this is thus received, the input page of FIG. 14, (A) is displayed on the touch panel 311.

When the IC card 246 is then set in the IC card reader 245 with the input page of FIG. 14, (A) being displayed, the matter that the IC card 246 is set is notified of from the IC card reader 245 to the SCS169 (S141). The matter that the IC card 246 has been set is notified of to the CCS167 of in response thereto, from the SCS169 (S142). An authentication request for the CE is transmitted to the UCS168 with the authentication information of a CE of an authentication target (read out from the IC card 246) in response thereto, by the CCS167 (S143). In response thereto, the UCS168 makes a search as to whether or not the authentication information of the CE of the authentication target is stored in the fusion machine 101, and thus makes a determination (S144) whether or not the CE is registered in the fusion machine 101. Subsequent thereto, an authentication response for the CE is transmitted to the CCS167 by the UCS168 (S145). A ticket for the CE is dispatched to the SCS169 or such by the CCS167 (S146) in response thereto in a condition that an authentication result for the CE indicates "OK". A display request for the initial page of FIG. 14, (C) is then transmitted to the CCS167 by the SCS169 (S151). The display request for the initial page of FIG. 14, (C) is transmitted to the SCS169 in response thereto, by the CCS167 (S152). The display request for the initial page of FIG. 14, (C) is transmitted to the OCS166 in response thereto, by the SCS169. When this is thus received, the initial page of FIG. 14, (C) is displayed on the touch panel 311.

Figure 16:
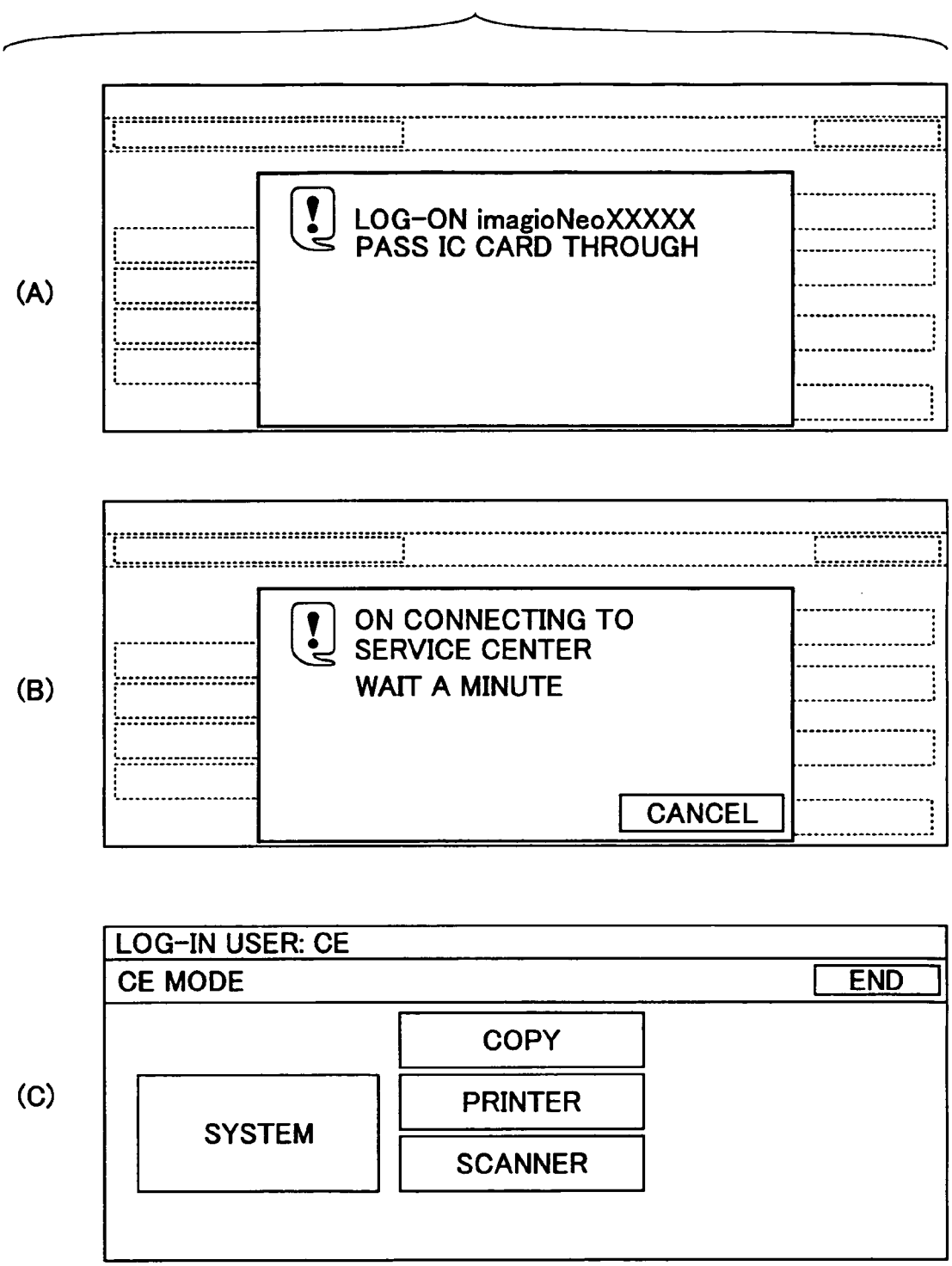
FIG. 16 shows page transition in a second embodiment of CE authentication.

FIG. 16 shows page transition in a second embodiment of CE authentication in the fusion machine 101 of FIG. 1.

A page of FIG. 16, (A) shown is an input page to input authentication information necessary for a CE once registered for maintenance service of the fusion machine 101 with the page of FIG. 8, (A) to actually log in as a CE performing maintenance service of the fusion machine 101, and to cause the machine to enter a CE mode.

Input operation can be carried out with the page of FIG. 16, (A), to input the authentication information necessary for a CE once registered for maintenance service of th fusion machine 101 with the page of FIG. 8, (A) as CE to actually log in as a CE performing maintenance service of the fusion machine 101, and to cause the machine to enter the CE mode. A CE once registered with the registration page of FIG. 8, (A) thus logs in to the fusion machine 101 as a CE performing maintenance service of the fusion machine 101 by carrying out the inputting operation with the input page of FIG. 16, (A), and thus, the CE mode can be entered.

Setting may be made such that, with the input page of FIG. 16, (A), operation to set the IC card 246 in which one's authentication information (for example, a name and a password) is recorded to the IC card reader 245 may have an effect as operation of inputting the authentication information necessary for the CE to log in to the fusion machine 101 as a CE performing maintenance service of the fusion machine 101, and causing the machine to enter the CE mode. When the IC card 246 is set in the IC card reader 245 while the input page of FIG. 16, (A) is displayed, the page changes to an authentication wait page of FIG. 16, (B) while authentication processing starts in the machine. The page changes to a CE mode initial page of FIG. 16, (C) when the authentication processing ends. The CE once registered with the registration page of FIG. 8, (A) thus logs in to the fusion machine 101 as a CE performing maintenance service of the fusion machine 101, and the CE mode can be entered.

Figure 17:
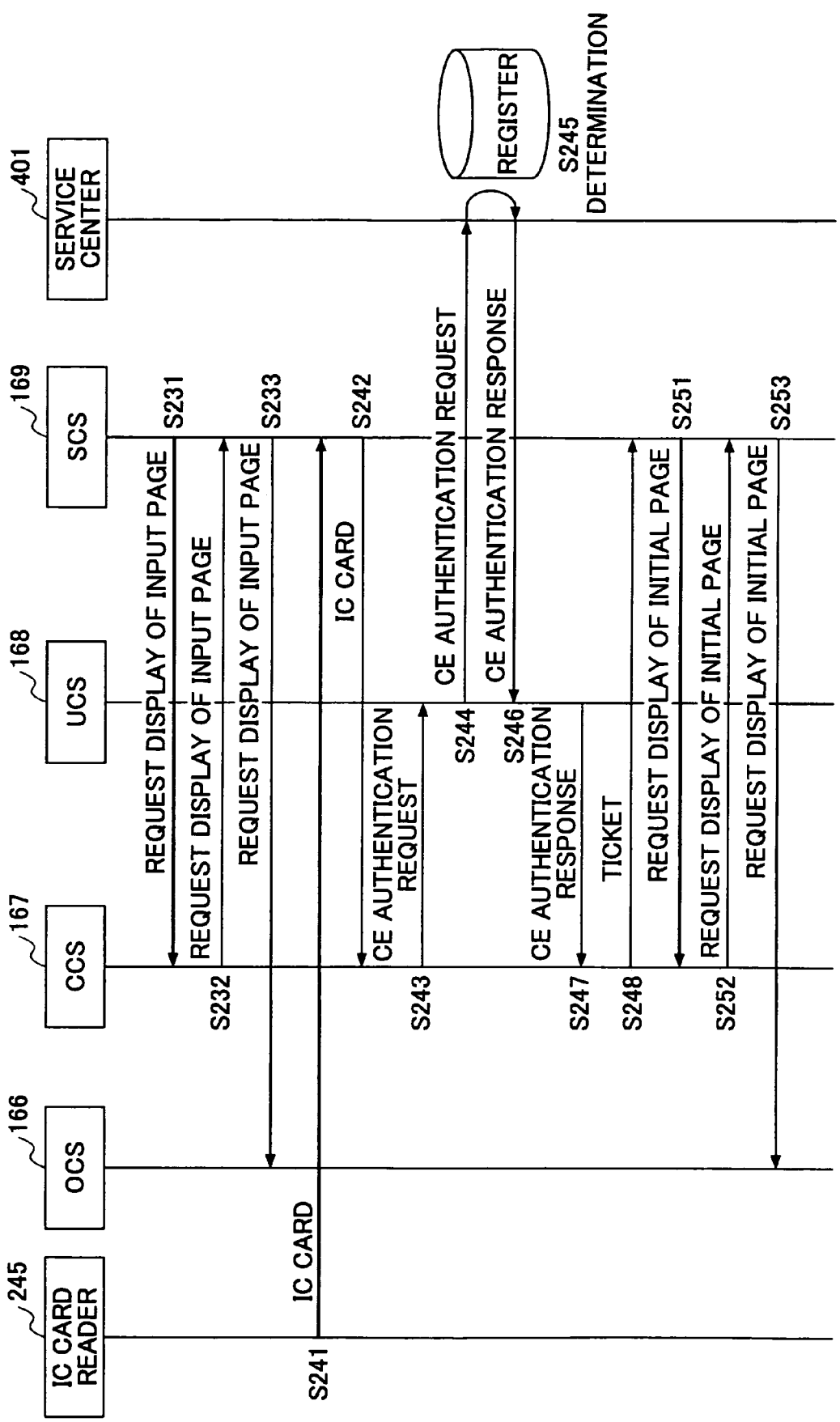
FIG. 17 shows an operation sequence of the second embodiment of CE authentication.

FIG. 17 shows an operation sequence of the second embodiment of CE authentication in the fusion machine 101 of FIG. 1.

At first, a display request for the input page of FIG. 16, (A) is transmitted to the CCS167 by SCS169 (S231). The display request for the input page of FIG. 16, (A) is transmitted to the SCS169 in response thereto, CCS167 (S232). The display request for the input page of FIG. 16, (A) is transmitted to the OCS166 in response thereto, SCS169 (S233). When this is thus received, the input page of FIG. 16, (A) is displayed on the touch panel 311.

Then when the IC card 246 is set in the IC card reader 245 while the input page of FIG. 16, (A) is displayed, the matter that the IC card 246 is thus set is notified of from the IC card reader 245 to the SCS169 (S241). The matter that the IC card 246 has been set is notified of to the CCS167 of in response thereto, from the SCS169 (S242). An authentication request for the CE is transmitted to the UCS168 with the authentication information of the CE of an authentication target (read out from the IC card 246) in response thereto, by the CCS167 (S243). The authentication request for the CE is transmitted to the service center 401 with the authentication information of the CE of the authentication target and an ID of the fusion machine 101 in response thereto, from the UCS168 (S244). In response thereto, the service center 401 makes a search as to whether the authentication information of the CE of the authentication target is held in the service center 401 and determines (S245) whether the CE is registered in service center 401. Subsequent thereto, an authentication response for the CE thus obtained is transmitted to the UCS168 from the service center 401 (S246). The authentication response for the CE is transmitted to the CCS167 from the CCS167 (S248) in response thereto, from the UCS168 (S247). A ticket for the CE is dispatched to the SCS169 or such in response thereto in a condition that an authentication result for the CE indicates "OK".

A display request for the initial page of FIG. 16, (C) is transmitted to the CCS167 next by SCS169 (S251). The display request for the initial page of FIG. 16. (C) is transmitted to the SCS169 in response thereto, by the CCS167 (S252). The display request for the initial page of FIG. 16, (C) is transmitted to the OCS166 in response thereto, from the SCS169 (S253). When this is thus received, the initial page of FIG. 16, (C) is displayed on the touch panel 311.

Figure 18:
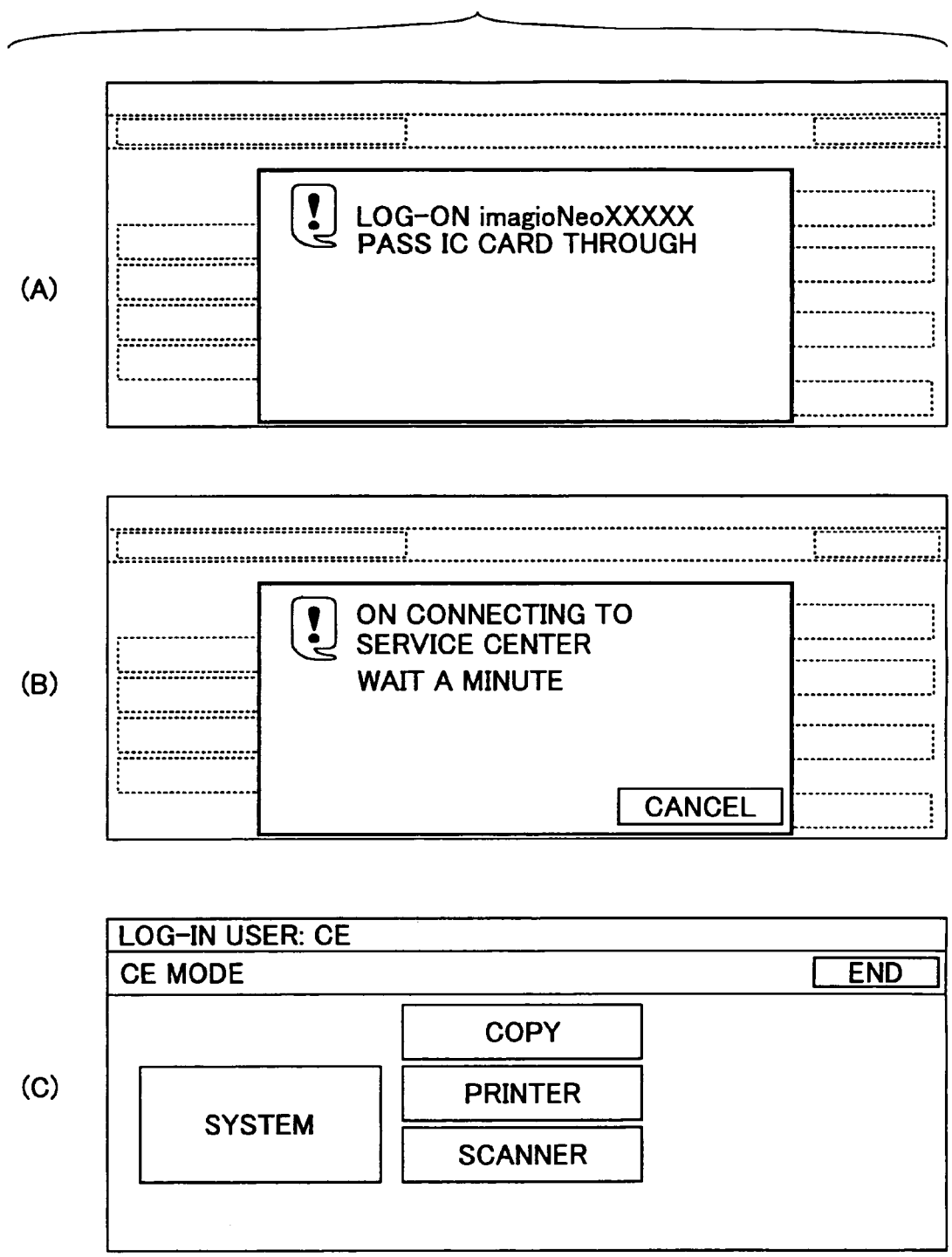
FIG. 18 shows page transition in a third embodiment of CE authentication.

FIG. 18 shows page transition concerning a third embodiment of CE authentication in the fusion machine 101 of FIG. 1.

A page of FIG. 18, (A) shows an input page to input authentication information necessary for a CE registered for maintenance service of the fusion machine 101 with the page of FIG. 10, (A) to actually log in to the fusion machine 101 as a CE performing maintenance service of the fusion machine 101, and to cause the machine to enter the CE mode. With the page of FIG. 18, (A), an input operation can be carried out to input the authentication information necessary for a CE registered for maintenance service of the fusion machine 101 with the page of FIG. 10, (A) to log in as a CE performing maintenance service of the fusion machine 101, and to cause the machine to enter the CE mode. A CE registered with the registration page of FIG. 10, (A) thus logs in to the fusion machine 101 as a CE performing maintenance service of the fusion machine 101 by the input operation with the input page of FIG. 18, (A), and the CE mode can be thus entered.

Setting may be made such that, with the input page of FIG. 18, (A), operation to set the IC card 246 in which one's authentication information (for example, a name and a password) is recorded in the IC card reader 245 may have an effect as operation of inputting the authentication information necessary for the CE to log in to the fusion machine 101 as a CE performing maintenance service of the fusion machine 101, and causing the machine to enter the CE mode. When the IC card 246 is set to the IC card reader 245 while the input page of FIG. 18, (A) is displayed, the page changes into an authentication wait page of FIG. 18, (B) while authentication processing starts, and the page changes into a CE mode initial page of FIG. 18, (C) when the authentication processing ends. The CE registered with the registration page of FIG. 10, (A) thus logs in to the fusion machine 101 as a CE performing maintenance service of the fusion machine 101, and the CE mode can be entered.

Figure 19:
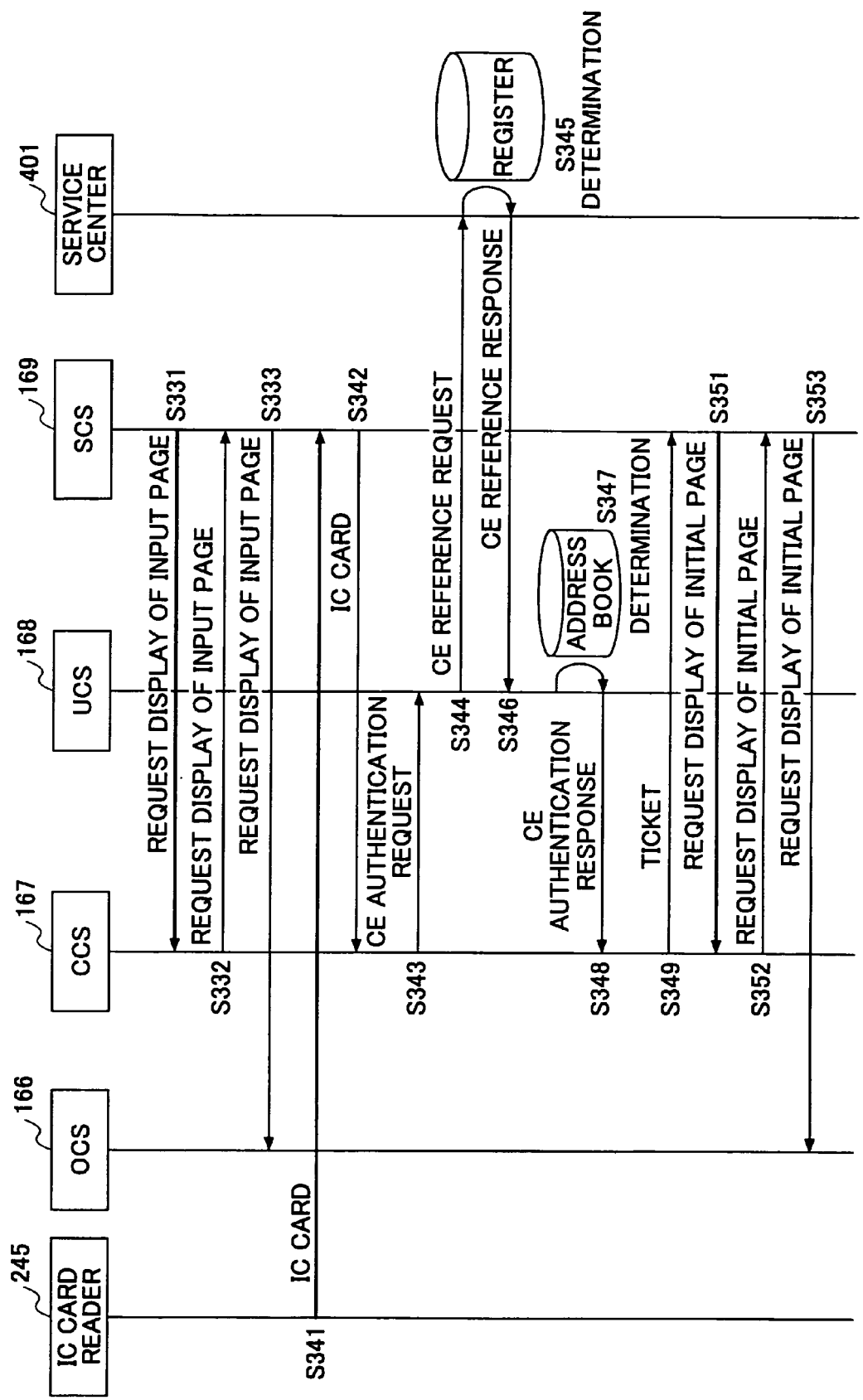
FIG. 19 shows an operation sequence concerning the third embodiment of CE authentication.

FIG. 19 shows an operation sequence of the third embodiment of CE authentication in the fusion machine 101 of FIG. 1.

At first, a display request for the input page of FIG. 18, (A) is transmitted to the CCS167 by the SCS169 (S331). The display request for the input page of FIG. 18, (A) is transmitted to the SCS169 in response thereto, from the CCS167 (S332). The display request for the input page of FIG. 18, (A) is transmitted to the OCS166 in response thereto, from the SCS169 (S333). When the request is thus received, the input page of FIG. 18, (A) is displayed on the touch panel 311.

Then when the IC card 246 is set in the IC card reader 245 while the input page of FIG. 18, (A) is displayed, the matter that the IC card 246 is set is notified of from the IC card reader 245 to the SCS169 (S341). The matter that IC card 246 has been set is notified of to the CCS167 in response thereto, from the SCS169 (S342). An authentication request for the CE is transmitted to the UCS168 with the authentication information of the CE of an authentication target (read out from the IC card 246) in response thereto, from the CCS167 (S343). A reference request for the CE is transmitted to the service center 401 with the authentication information of the CE of the authentication target in response thereto, from the UCS168 (S344). In response thereto, the service center 401 makes a search as to whether the authentication information of the CE of the authentication target is held in the service center 401, and thus, determines (S345) whether the CE is registered in the service center 401. Subsequent thereto, a reference response for the CE is transmitted to the UCS168 from the service center 401 (S346). In response thereto, the UCS168 makes a search as to whether the authentication information of the CE of the authentication target is stored in the fusion machine 101, and thus determines (S347) whether the CE is registered in the fusion machine 101. Subsequent thereto, an authentication response for the CE is transmitted to the CCS167 by the UCS168 (S348). A ticket for the CE is dispatched to the SCS169 under the condition that an authentication result for the CE thus obtained indicates "OK", in response thereto, from the CCS167 (S349).

A display request for the initial page of FIG. 18, (C) is then transmitted to the CCS167 by the SCS169 (S351). The display request for the initial page of FIG. 18, (C) is transmitted to the SCS169 in response thereto, from the CCS167 (S352). The display request for the initial page of FIG. 18, (C) is transmitted to the OCS166 in response thereto, from the SCS169 (S353). When this is thus received, the initial page of FIG. 18, (C) is displayed on the touch panel 311.

Figure 20:
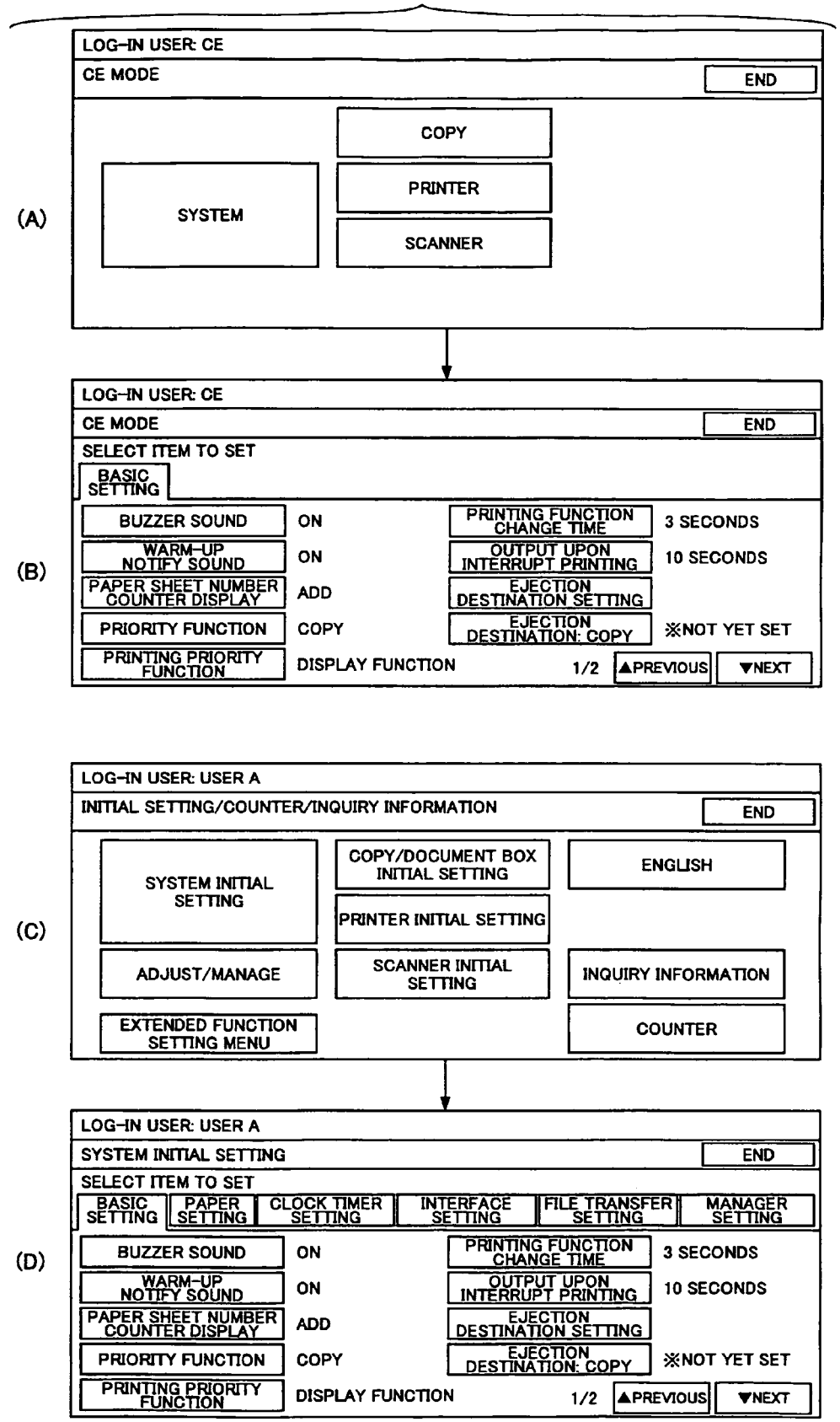
FIG. 20 shows pages in the CE mode in comparison to a general mode.

FIG. 20 shows pages in the CE mode for CE to compare with a general mode for a general user.

FIG. 20, (A) and FIG. 20, (B) are examples of pages for the CE mode. When a system button on the initial setting page of FIG. 20, (A) is touched, the page changes into a system initial setting page of FIG. 20, (B). FIG. 20, (C) and FIG. 20, (D) are examples of pages for the general mode. When the system button of the initial setting page of FIG. 20, (C) is touched, the page changes into a system initial setting page of FIG. 20, (D). In FIG. 20, it is seen that executable operation with the initial setting pages of FIG. 20, (A) and FIG. 20, (B) is limited to merely part of executable operation with the initial setting pages of FIG. 20, (C) and FIG. 20, (D). That is, types of operation which a CE is allowed to perform in the CE mode is limited to those which are merely part of those which a general user is allowed to perform.

In the first, second and third embodiments described above, a general mode for general users is distinguished from a CE mode for a CE, and CEs who can cause the machine to enter the CE mode are limited by the CE registration and CE authentication. By this, information leakage or illegal usage concerning CEs carrying out maintenance of the fusion machine 101 can be avoided in the first, second and third embodiments, and security of the fusion machine 101 can be improved.

Next, with the first embodiment applied as a specific example, input operation for the authentication information with the input page of FIG. 14, (A), FIG. 16, (A) or FIG. 18, (A) is described in further detail.

In the input page of FIG. 14, (A), card set operation to set the IC card may be set as having an effect as the input operation of inputting authentication information, and also, character input operation to input characters may also be set as having an effect as the input operation of inputting the authentication information. Then, CE's executable operation in the CE mode may depend on an actual manner in which the authentication information is input in the input operation with the input page of FIG. 14, (A). For example, a CE whose authentication information is input by the card set operation so that the machine enters the CE mode, the CE is allowed to refer to an address book. On the other hand, a CE whose authentication information is input by the character input operation so that the machine enters the CE mode, the CE is not allowed to refer to the address book. With reference to FIG. 21 and FIG. 22, actual processing carried out in the fusion machine 101 according to this example of setting is described next.

FIG. 21 shows an operation sequence of the CE authentication when the card set operation is applied to have an effect as the input operation of inputting the authentication information.

For example, the card set operation made while the input page of FIG. 14, (A) is displayed is applied as having an effect as the input operation of inputting the authentication information. In this case, authentication processing from Steps S141 through S145 of FIG. 21 is executed, and a ticket for the CE of an authentication target is dispatched to the SCS169 by the CCS167 (S146). This ticket is a ticket for the CE for whom input of the authentication information is achieved by the card set operation with the input page of FIG. 14, (A).

Processing from Steps S151 through S153 of FIG. 21 is executed successively, and the initial page of FIG. 14, (C) is displayed on the touch panel 311. When the CE whose authentication information is input by the card set operation as mentioned above, thereby the CE mode being entered, attempts to refer to the address book by predetermined operation, a reference request is transmitted to the UCS168 by the SCS169 (S501). A reference response of "OK" for referring to the address book is transmitted to the SCS169 in response, by the UCS168 (S502). As a result, the CE can actually refer to the address book.

FIG. 22 shows an operation sequence of CE authentication when the character input operation is applied to have an effect as the input operation of inputting the authentication information.

When the character input operation made with the input page of FIG. 14, (A) is applied to have an effect as the input operation of inputting the authentication information, authentication processing from Steps S141 through S145 of FIG. 22 is executed, and a ticket for the CE of an authentication target is dispatched to the SCS169 by the CCS167 (S146). This ticket is a ticket for the CE whose authentication information is input by the character input operation with the input page of FIG. 14, (A).

Processing of Steps S151 through S153 of FIG. 22 is executed successively, and the initial page of FIG. 14, (C) is displayed on the touch panel 311. When the CE whose authentication information is input by the character input operation, thereby the CE mode being entered, attempts to refer to the address book by predetermined operation, a reference request is transmitted to the UCS168 by the SCS169 (S501), and a reference response of "NG" for referring to the address book is transmitted to the SCS169 by the UCS168 (S502) in this case. As a result, the CE cannot actually refer to the address book.

Specific application examples of the above-described first, second and third embodiments of the CE resignation and CE authentication in the fusion machine 101 of FIG. 1 are described next.

A first application example is described.

FIG. 23 shows pages according to the first application example.

FIG. 23, (A) shows a setting page to set a log-in duration limitation for limiting am allowable duration actually taken for log-in operation with inputting the authentication information with the input page of FIG. 14, (A). When "90 seconds" are set with the setting page of FIG. 23, (A) as a set time, and a set button is touched, a limitation of "90 seconds" is set as the log-in duration for log-in operation with inputting the authentication information with the input page of FIG. 14, (A). In this case, the authentication information is input (FIG. 23, (B) corresponding to FIG. 14, (A)), and a CE logs in to the fusion machine 101 (FIG. 23, (C) corresponding to FIG. 14, (C). After that, the CE should input the authenticate information during "90 seconds" to the fusion machine 101) (FIG. 23, (D) corresponding to FIG. 14, (A)). The setting operation with the setting page of FIG. 23, (A) should be carried out by the manager of the fusion machine 101.

A circumstance for which the above-described first application example is actually applied is that, for example, a CE well knowing the machine may seek a security hole of the machine for an illegal purpose. According to the first application example, for such a circumstance, requirements which are harder than those applied to general users are applied to CEs for the authentication. By setting the log-in duration limitation as mentioned above, it is possible to cope with possible occurrence of log-out failure, spoofing or such. Instead of applying such a log-in duration limitation, a limitation for the allowable number of times of log-in operation may be applied. This first application example may be applied to any one of the above-mentioned first, second and third embodiments.

FIG. 24 shows an operation sequence of this first application example.

When a CE inputs authentication information with the input page of FIG. 23, (B) in the case that the manager sets a limitation with the setting page of FIG. 23, (A) for the log-in duration, the authentication processing of Steps S141 through S145 of FIG. 24 is executed. Thus, in Step S601, measurement for the log-in duration for the CE is started by the CCS167, and then, in Step S602, a ticket for the CE is dispatched. Subsequent thereto, processing from S151 to S153 of FIG. 24 is executed, and an initial page of FIG. 23, (C) is displayed on the touch panel 311. Then, if the measurement of the log-in duration for the CE reaches the set limitation (S611), the CCS167 discards the once dispatched ticket for the CE (S612). Subsequent thereto, processing from S131 to S133 of FIG. 23 is executed again, and an input page of FIG. 23, (B) (FIG. 23, (D)) is displayed on the touch panel 311 again.

A second application example is described next.

Figure 25:
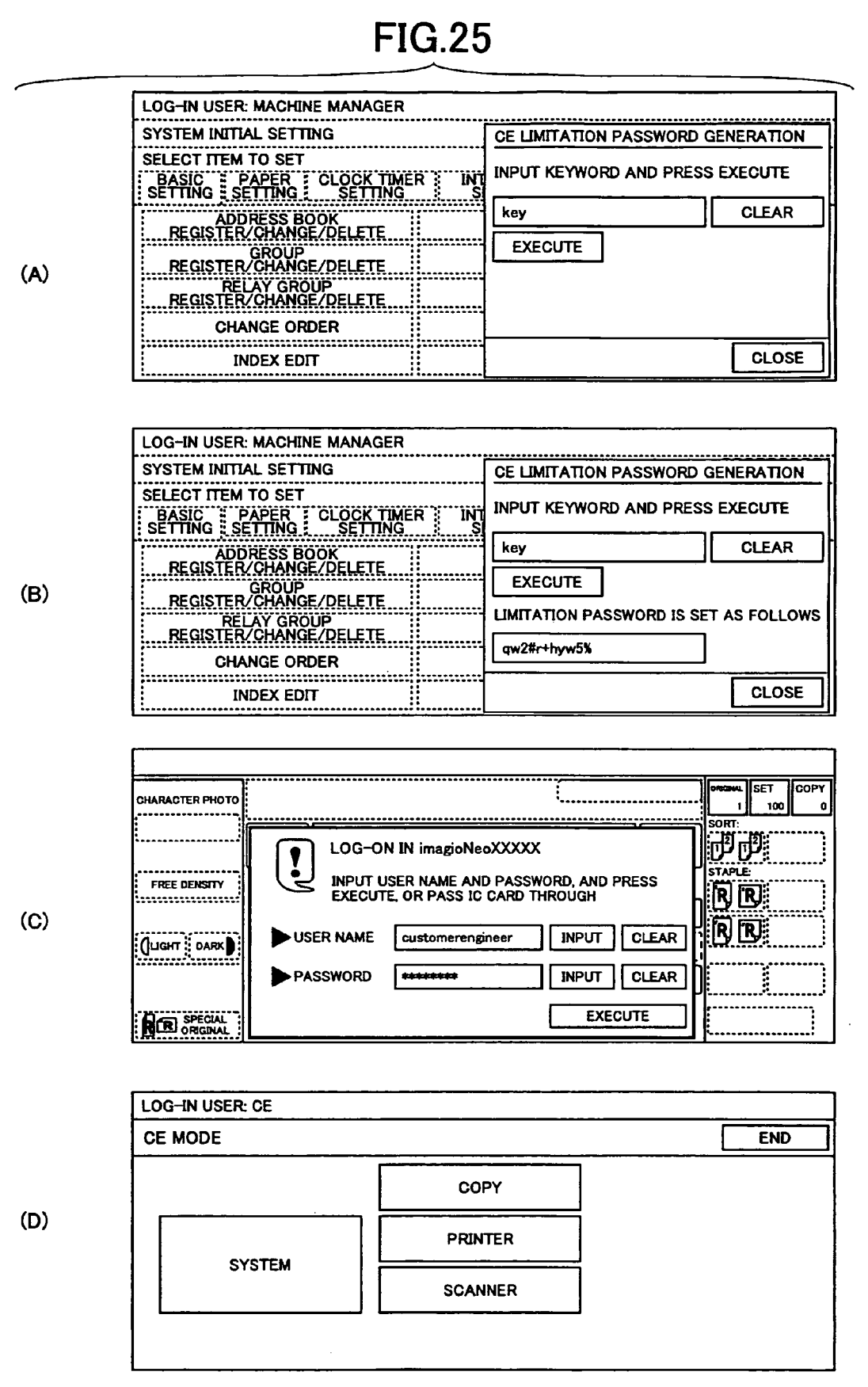

FIG. 25 shows pages concerning the second application example.

FIG. 25, (A) shows a generating page to produce a password to be input with the input page of FIG. 14, (A), automatically. When a keyword "key" is set with the generating page of FIG. 25, (A), and an execution button is touched, "qw2#r+hyw5%" is automatically generated from the above-mentioned keyword "key", used as a password to be input with the input page of FIG. 14, (A), as shown in FIG. 25B, automatically. A CE registered with the registration page of FIG. 6, (A) may input, with the input page of FIG. 14, (A), a name and the above-mentioned password "qw2#r+hyw5%" (FIG. 25, (C) corresponding to FIG. 14, (A)). The fusion machine 101 is thus logged in (FIG. 25, (D) corresponding to FIG. 14, (C)), and the CE mode is entered. The above-described generating operation with the generating page of FIG. 25, (A) should be carried out by the manager of the fusion machine 101.

A circumstance for which this second application example is applied is, for example, that the manager or such is allowed to monitor an action of a CE in the CE mode. The above-mentioned password may have a limitation (password with limitation). That is, the password may be valid only for a limited duration 90 seconds, for example, only for one time, only a limited operation is allowed even when the password is applied to activate the CE mode, or such. Also the second application example may be applied to any one of the above-mentioned first, second and third embodiments.

Figure 26:
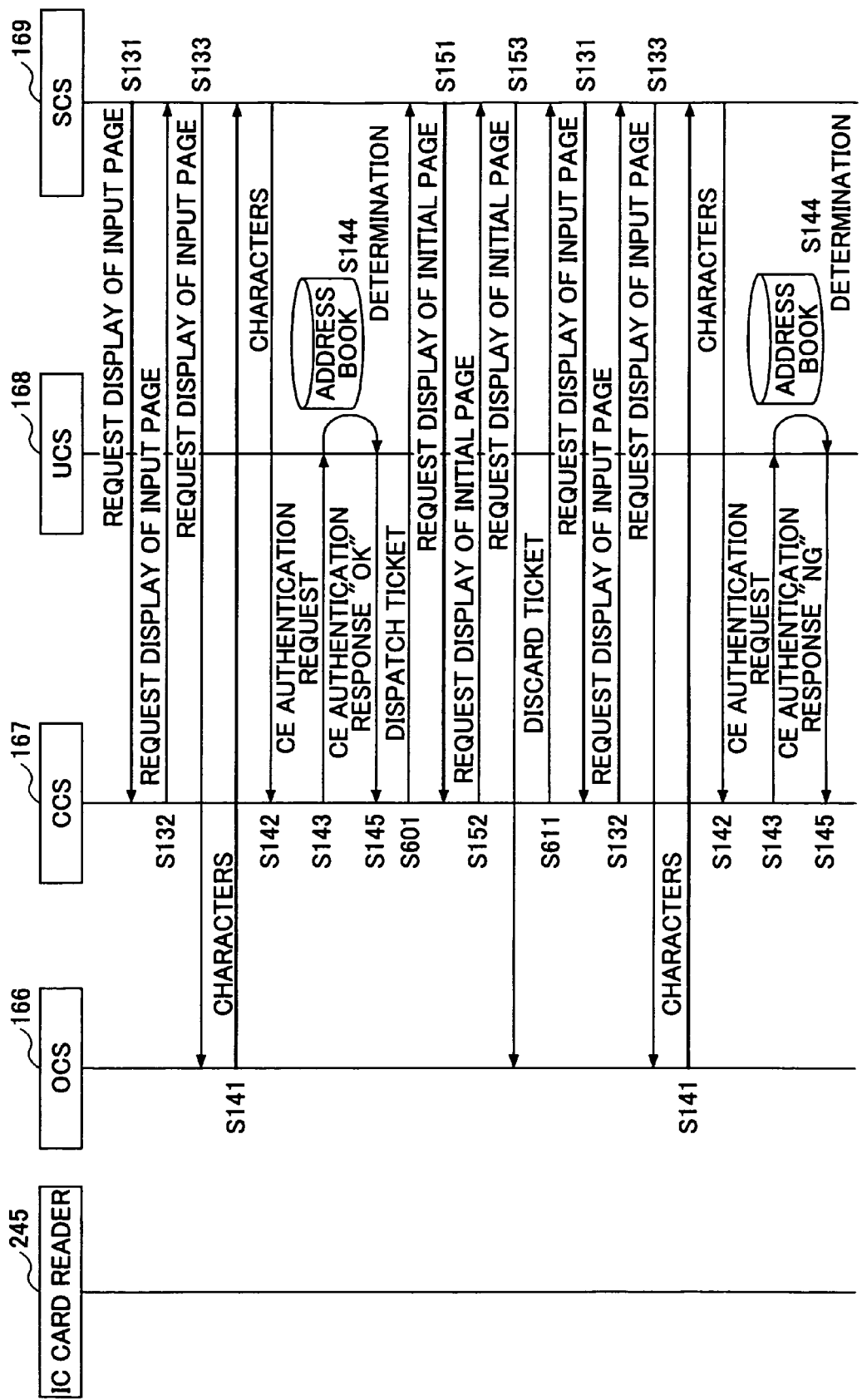
FIG. 26 shows an operation sequence of the second application example.

FIG. 26 shows an operation sequence of this second application example.

When a CE inputs a name and a one-time password with the input page of FIG. 25C, in the case that the manager has produced the one-time password with the generating page of FIG. 25, (A), authentication processing of Steps S141 through S145 of FIG. 26 is executed. And, the CCS167 dispatches a ticket for the CE (S601). Subsequent thereto, processing of Steps S151 to S153 of FIG. 26 is executed, and an initial page of FIG. 25, (D) is displayed on the touch panel 311. And when the CE logs out of the fusion machine 101, the CCS167 discards the ticket for the CE (S611). Subsequent thereto, processing of Steps S131 to S133 of FIG. 26 is executed again, and the input page of FIG. 25, (C) is displayed on the touch panel 311 again. Subsequent thereto, authentication processing of Steps S141 through S145 of FIG. 26 is executed again, when, with input page of FIG. 25, (C), the CE inputs the name and the one-time password again. However, since the password applied in this case is the one-time password (i.e., the password which is valid only one-time usage) as mentioned above, an authentication result for the CE in this case becomes "NG" rather than "OK".

A third application example is described next.

In the third application example, operation that a CE can perform in the CE mode is limited according to a "policy" to limit operation that CE is allowed to perform in the CE mode. As a specific example of the "policy" to limit operation that a CE can perform in the CE mode, the following examples may be cited: That is, a policy concerning maintenance operation (a right to carry out maintenance operation is given or not given to a CE in the CE mode); a policy concerning address book operation (a right for carrying out address book operation is given to a CE in the CE mode); a policy concerning initial setting operation (a right is given for initial setting operation to a CE in the CE mode); or a policy concerning general operation (a right is given to a CE in the CE mode for general operation).

Figure 27:
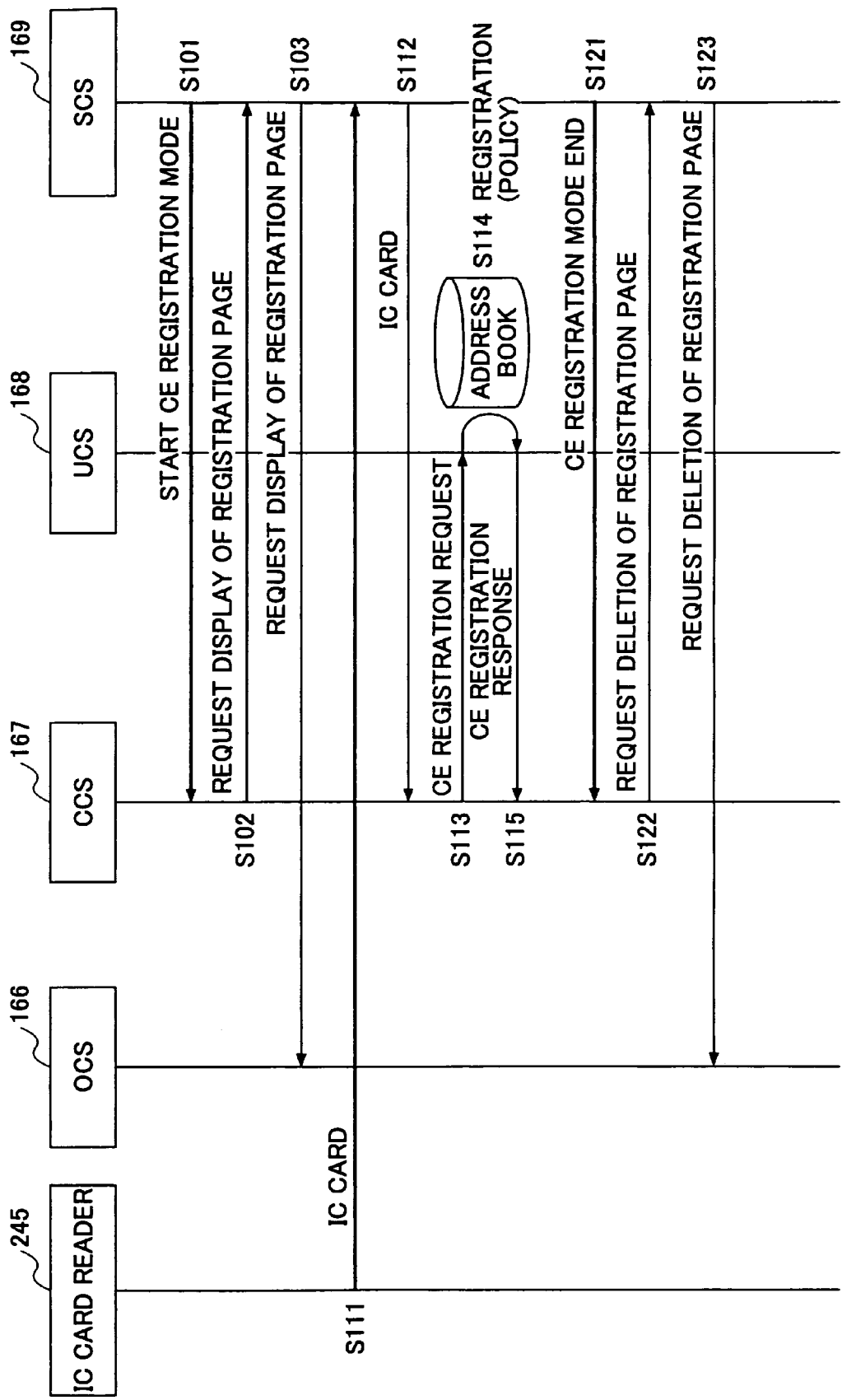
FIG. 27 shows an operation sequence of the first embodiment (the third application example) of CE registration.

Description is made below for a case where operation executable by a CE in the CE mode is limited by a policy that 'only a right for carrying out maintenance operation is given to a CE in the CE mode' for the above-mentioned first, second and third embodiments as specific examples:

FIG. 27 is an operation sequence concerning the first embodiment (the third application example) of CE registration.

When the manager performs registration operation with the registration page of FIG. 6, (A), registration processing of Steps S111 through S115 of FIG. 27 is executed. Thereby, the policy that "only a right of executing maintenance operation in the CE mode is given to the CE" is held in the fusion machine 101 when the CE of a registration target is registered in the fusion machine 101 (S114).

Figure 28:
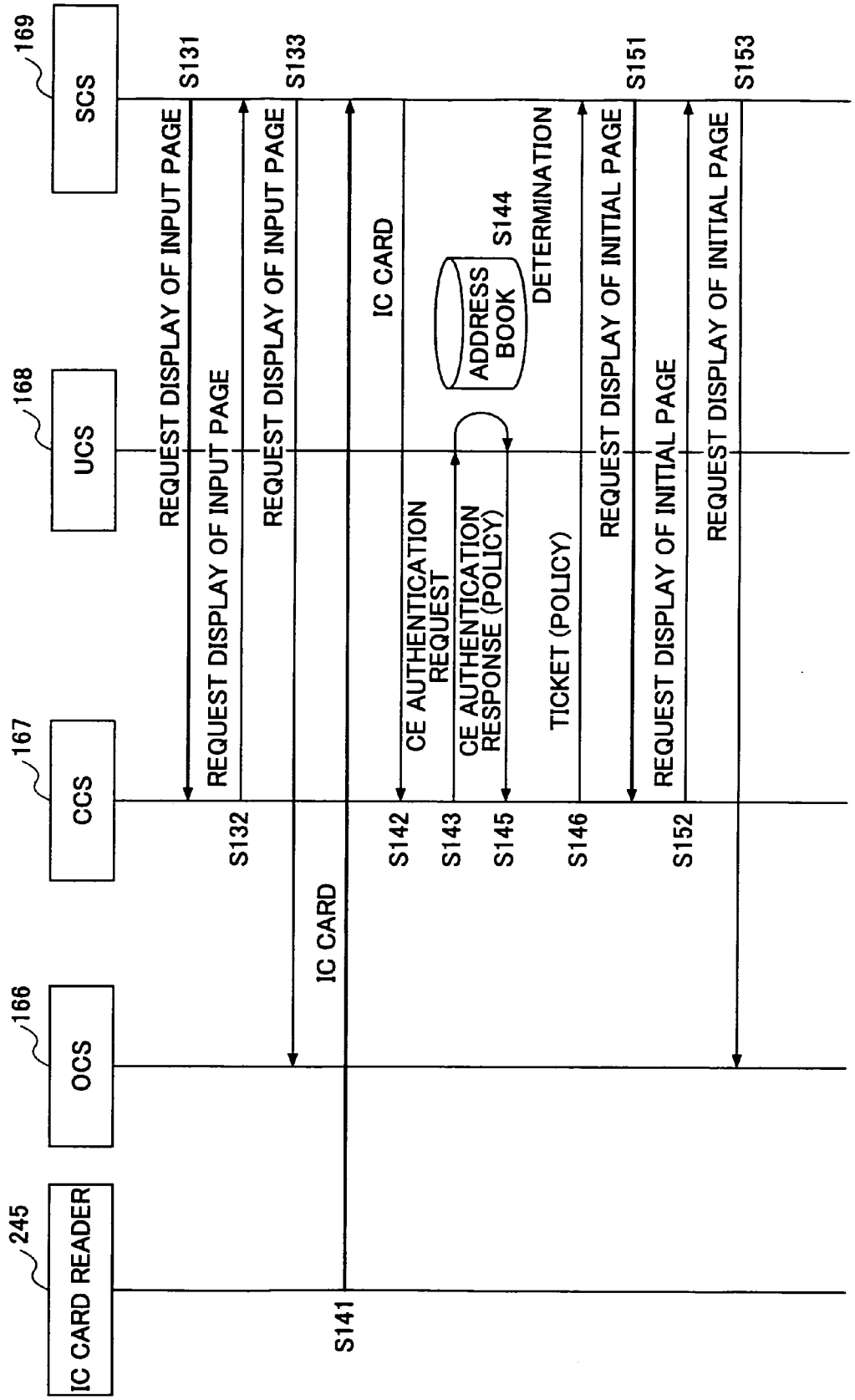
FIG. 28 shows an operation sequence of the first embodiment (the third application example) of CE authentication.

FIG. 28 shows an operation sequence of the first embodiment (the third application example) of CE authentication.

When a CE carries out the input operation with the input page of FIG. 14, (A), authentication processing of Steps S141 through S146 of FIG. 28 is executed. In an authentication response (S145) for the CE, the above-mentioned policy, which is the policy "only a right of performing maintenance operation in the CE mode is given to a CE" is included. In response thereto, a ticket which only allows the right of performing maintenance operation to the CE according to the above-mentioned policy is dispatched for the CE (S146). According to the policy "only a right of executing maintenance operation in the CE mode is given to a CE", operation that the CE can perform in the CE mode is limited accordingly.

Figure 29:
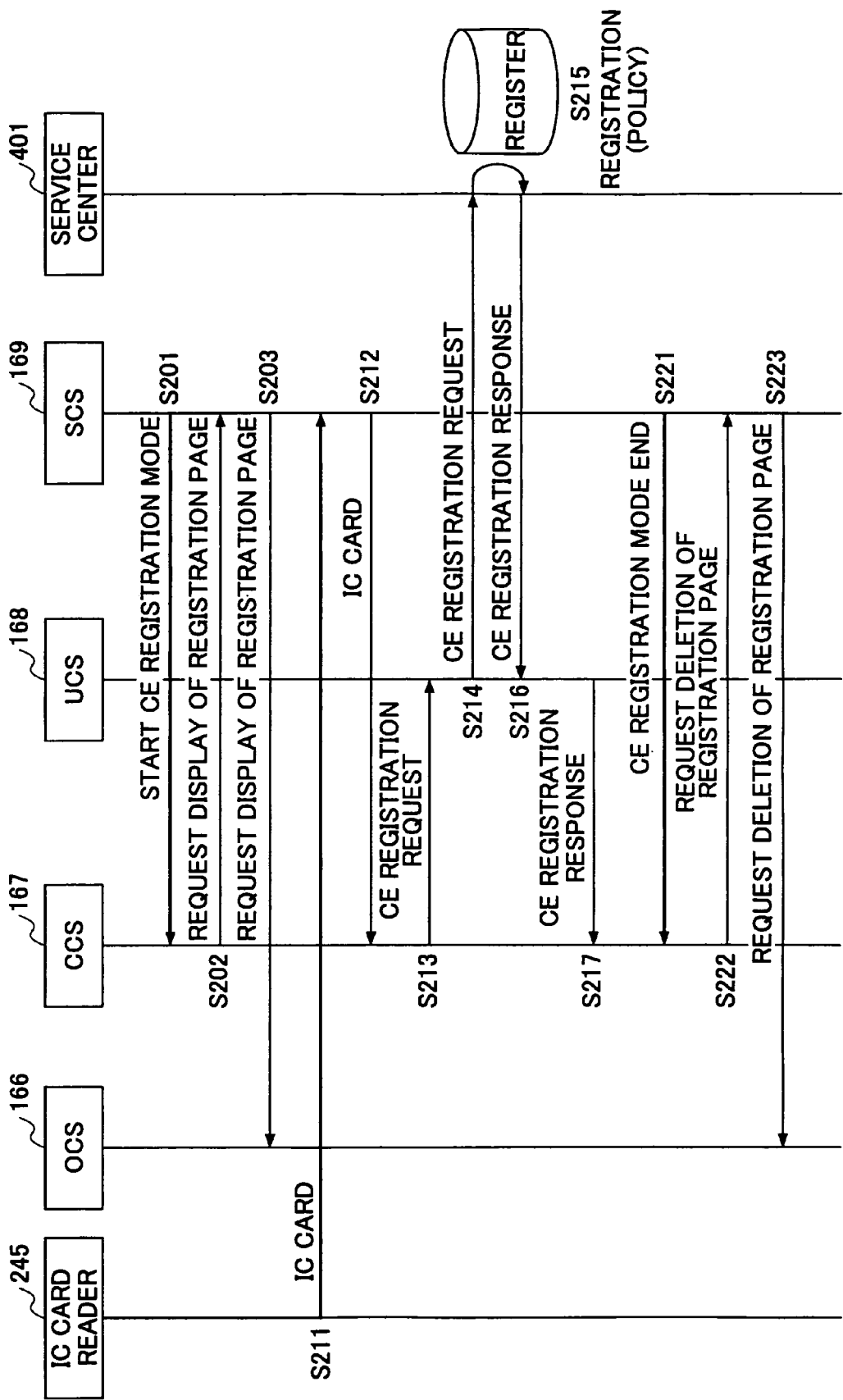
FIG. 29 shows an operation sequence of the second embodiment (the third application example) of CE registration.

FIG. 29 shows an operation sequence according to the second embodiment (the third application example) of CE registration.

When the manager performs registration operation with the registration page of FIG. 8, (A), registration processing of Steps S211 through S217 of FIG. 29 is executed. In the case when a CE of a registration target is registered in the service center 401 (S215), limitation contents that "only a right of executing maintenance operation in the CE mode is given to a CE' according to the above-mentioned policy are held in the service center 401.

Figure 30:
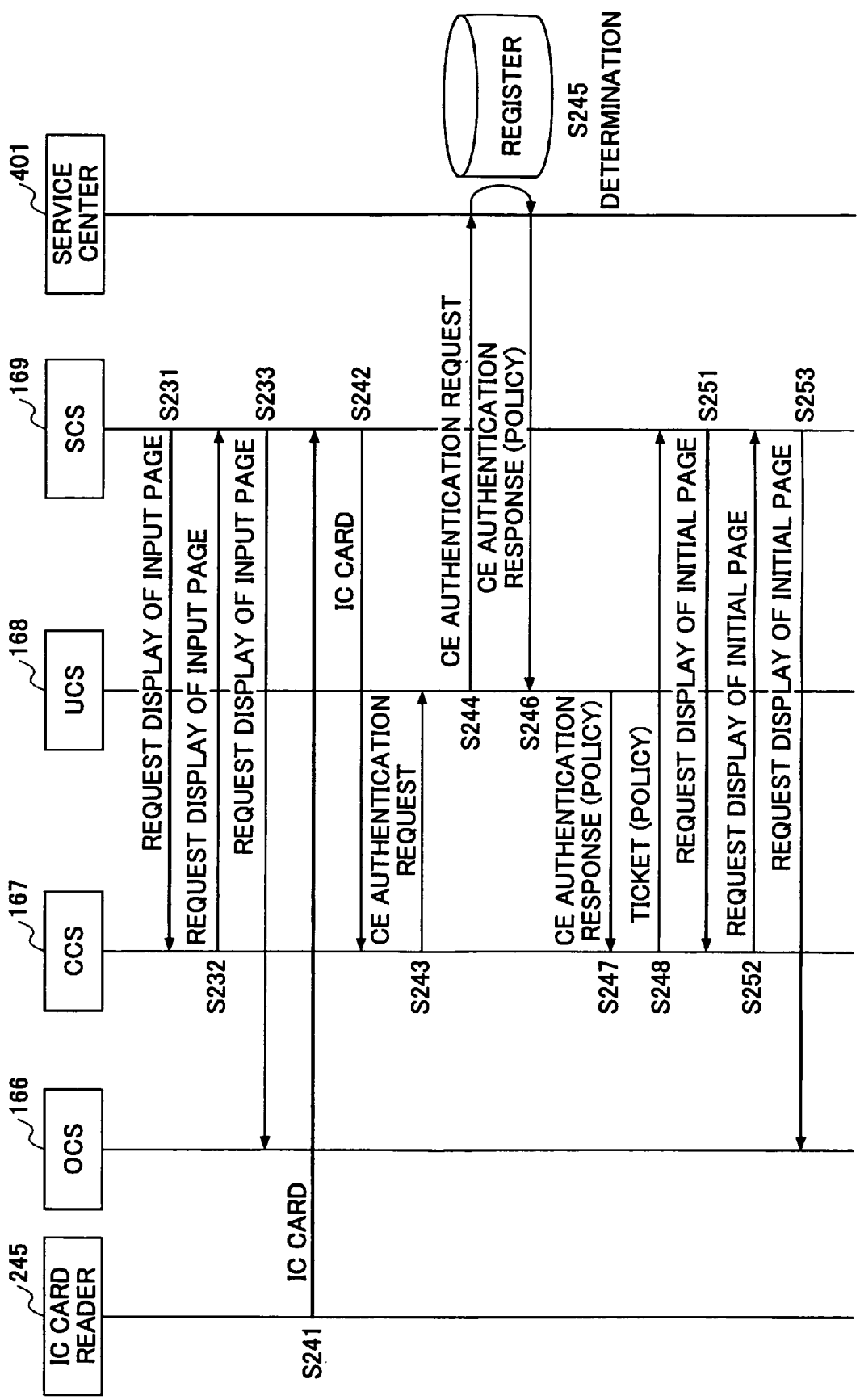
FIG. 30 shows an operation sequence of the second embodiment (the third application example) of CE authentication.

FIG. 30 shows an operation sequence according to the second embodiment (the third application example) of CE authentication.

When a CE carries out the input operation with the input page of FIG. 16, (A), authentication processing of Steps S241 through S248 of FIG. 30 is executed. In a series of authentication response for the CE (S246, S247), information of the policy that "only a right of performing maintenance operation in the CE mode is given to a CE" is included to limit operation executable by the CE in the CE mode accordingly. In response thereto, a ticket which only allows the right of performing maintenance operation for the CE is dispatched for the CE (S248). According to the policy "only a right executing maintenance operation in the CE mode is given to CE", operation that the CE can perform in the CE mode is limited accordingly.

Figure 31:
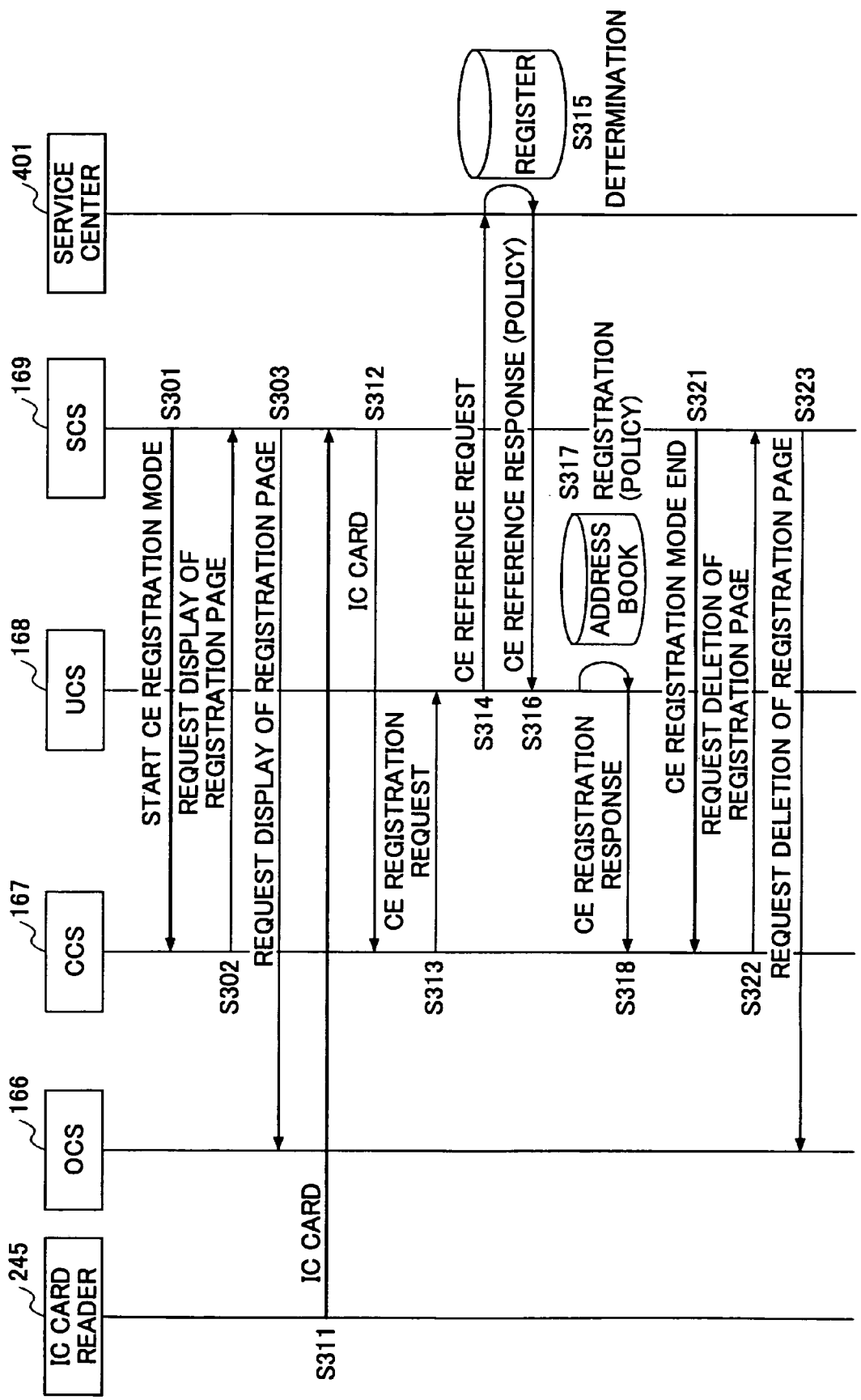
FIG. 31 shows an operation sequence of the third embodiment (the third application example) of CE registration.

FIG. 31 shows an operation sequence of the third embodiment (the third application example) of CE registration.

When the manager performs registration operation with the registration page of FIG. 10, (A), registration processing of Steps S311 through to S318 of FIG. 31 is executed. In a reference response (S316) for the CE of the registration target, information of the policy "only a right of carrying out maintenance operation in the CE mode is given to a CE" is included. Then, when the CE is registered in the fusion machine 101 (S317) after the CE of the registration target is referred to the service center 401, the limitation contents that operation which is allowed for the CE in the CE mode is limited according to the policy "only a right of carrying out maintenance operation in the CE mode is given to the CE" are held in the fusion machine 101.

FIG. 32 shows an operation sequence of the third embodiment (the third application example) of CE authentication.

When a CE carries out input operation with the input page of FIG. 18, (A), authentication processing of Steps S341 through S349 of FIG. 32 is executed. In a reference for the CE and an authentication response (S346, S348), information that operation allowed for the CE is limited according to the policy "only a right carrying out maintenance operation in the CE mode is given to a CE" is included. In response thereto, a ticket which allows only the right carrying out maintenance operation for the CE is dispatched (S349). According to the policy "only a right carrying out maintenance operation in the CE mode is given to a CE", operation the CE can perform in the CE mode is limited accordingly.

FIG. 33 shows pages concerning the third application example.

FIG. 33, (A) shows a designating page to designate as to what type of policy is set. When "only maintenance operation" is designated with the designating page of FIG. 33, (A), and a set button is touched, the policy of "only a right carrying out maintenance operation in the CE mode is given to CE" is set as the policy. The designating operation with the designating page of FIG. 33, (A) should be carried out by the manager of the fusion machine 101.

Thus, according to the third application example, operation that a CE can perform in the CE mode is limited according to a policy limiting operation that a CE can perform in the CE mode. According to the third application example, information leakage or illegal usage concerning a CE carrying out maintenance of the fusion machine 101 can be avoided, and security of the fusion machine 101 can be improved thereby.

In addition, according to an operation sequence of the third application (FIG. 27 through FIG. 32), processing for reflecting the policy is performed at the CE registration occasion (S114, S215 and, S317). However, the processing for reflecting the policy may be carried out at the occasion of CE authentication instead of being carried out at the time of CE registration. In addition, setting of the policy may be carried out either in the service center 401 or in the fusion machine 101.

A fourth application example is described next. According to the fourth application example, operation that the CE can perform in the CE mode is limited according to "a rank" of each CE.

FIG. 34 shows a table concerning the fourth application example.

FIG. 34, (A) shows a table holding CEs' ranks "A, B, C". According to FIG. 34, (A), the ranks of the respective CEs "A, B, C" are "2, 3, and 1". FIG. 34, (B), (C) and (C) shows first, second and third specific examples of the tables to limit operation that the CE of each rank can execute in the CE mode. According to FIG. 34, (B), operation that the CE of rank 3 can perform in the CE mode is all of "maintenance operation, address book operation, initial setting operation, copy operation, facsimile operation and stored document operation", while operation that each of the CEs of the ranks 1 and 2 can perform in the CE mode is merely part thereof. According to FIG. 34, (C), operation that the CE of rank 3 can perform in the CE mode is all of those of "security high, security medium and security low", while operation that each of the CEs of the ranks 1 and 2 can perform in the CE mode is merely part thereof. According to FIG. 34, (D), operation that the CE of rank 3 can perform in the CE mode is all of "one concerning an educational institution, one concerning a public agency, one concerning a private enterprise, and one concerning a shop", while operation that each of the CEs of the ranks 1 and 2 can perform in the CE mode is merely part thereof.

According to FIG. 34, (A), the CE "A" can perform only part of the operation of each of those shown in FIG. 34, (B), (C) and (D) since the CE's rank is "2". According to FIG. 34, (A), the CE "B" can perform all of the operation of each of those shown in FIG. 34, (B), (C) and (D) since the CE's rank is "3". According to FIG. 34, (A), the CE "C" can perform only part of the operation of each of those shown in FIG. 34, (B), (C) and (D) since the CE's rank is "1".

According to the fourth application example, operation that a CE can perform in the CE mode is limited according to the rank of each CE. In the fourth application example, information leakage or illegal usage concerning a CE carrying out maintenance of the fusion machine 101 can be avoided, and security of fusion the machine 101 can be improved accordingly.

In addition, an operation sequence of the fourth application example is the same as the operation sequence of the third application example (FIG. 27 through FIG. 32).

Figure 35:
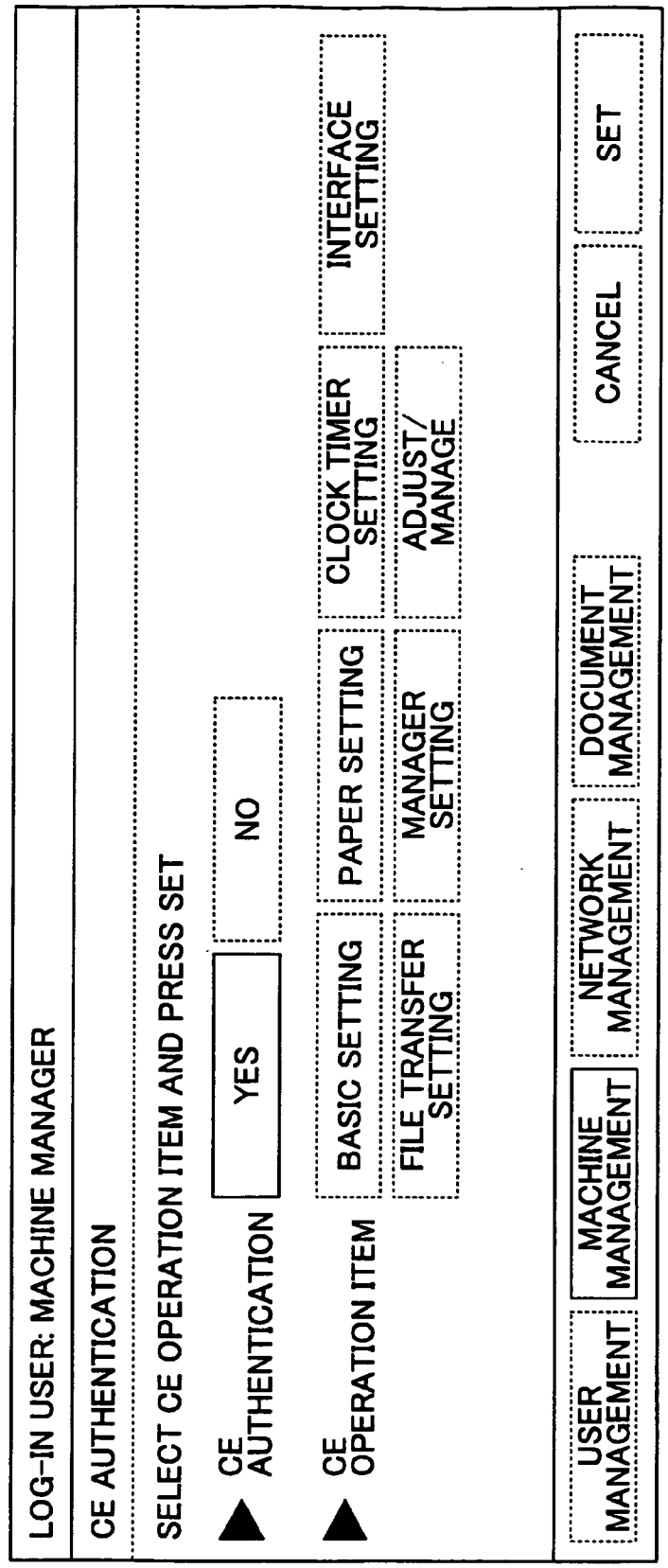
FIG. 35 shows a page in a fifth application example.

A fifth application example is described next. FIG. 35 shows pages according to the fifth application example.

FIG. 35, (A) shows a selecting page to select which type of operation is set as operation that a CE can perform in the CE mode from among those executable by a general user in a general mode. When "only basic operation" is selected with the selecting page of FIG. 35, (A), and a set button is touched, operation that is allowed for a CE in the CE mode CE is set as shown in FIG. 20, (B). On the other hand, operation that is allowed for a CE in the CE mode is set as shown in FIG. 20, (D) when six items of operation such as "basic operation" are selected in the selecting page of FIG. 35, (A), and a set button is touched. The selecting operation with the selecting page of FIG. 35, (A) is carried out by the manager of the fusion machine 101.

According to the fifth application example, operation that a CE can perform in the CE mode can be limited to part of all the items of operation executable by a general user in a general mode. By this, information leakage or illegal use concerning a CE carrying out maintenance of the fusion machine 101 can be avoided, and security of fusion machine 101 can be improved accordingly.

A spool function of printing job in the fusion machine 101 of FIG. 1 is described next. The spool function of printing job in the fusion machine 101 is activated when the fusion machine enters the general mode different from the CE mode mentioned above. The general mode is entered by the fusion machine 101 when a specified user is recognized by the fusion machine 101 by means of his or her IC card being set in the machine, or so, as mentioned below.

Figure 37:
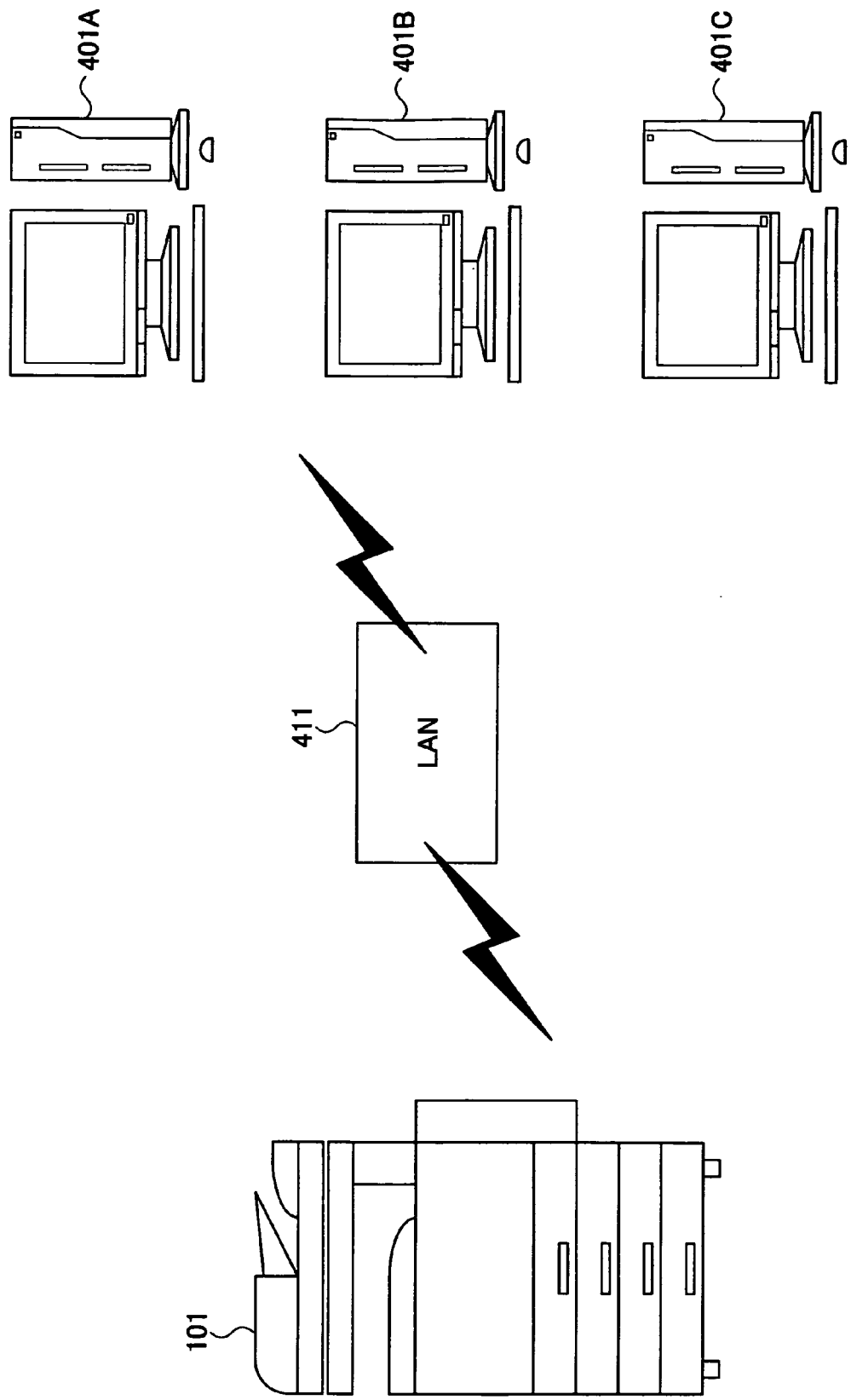
FIG. 37 shows another network configuration concerning the fusion machine of FIG. 1.

The fusion machine 101 of FIG. 1 can spool printing jobs given from a client terminal of the fusion machine 101. The fusion machine 101 of FIG. 1 is connected with three PCs 401 via a LAN 411 as shown in FIG. FIG. 37, for example. A printer driver of the fusion machine 101 is installed in each PC 401, and each PC 401 can function as a client terminal of the fusion machine 101.

The PC 401A, PC 401B and PC 401C are used by a user A, a user B and a user C, respectively. The IDs of the user A, user B and user C, "11111111, 22222222 and 33333333" are attached to printing jobs give from the PC 401A, PC 401B and PC 401C, respectively.

Figure 38:
FIG. 38 shows page transition in a first embodiment of the printing job spool function according to the present invention.

A first embodiment of the printing job spool function according to the present invention is described next. FIG. 38 shows page transition according to the first embodiment of the printing job spool function in the fusion machine 101 of FIG. 1.

A page of FIG. 38, (A) shows a "printing job selecting page" to select a printing job to be carried out by the fusion machine 101, from printing jobs spooled in the fusion machine 101, which page is displayed on the touch panel 311 of the fusion machine. 101. In the page of FIG. 38, (A), "a print button" to make the fusion machine 101 perform the printing job thus selected from the page of FIG. 38, (A), is displayed. In the page of FIG. 38, (A), a list of printing jobs spooled in the fusion machine 101 is displayed. It is seen that there are respective printing jobs of the user IDs, "11111111, 22222222 and 33333333". When a printing job is selected from the page of FIG. 38, (A), and a print button is touched, the page changes into a page of FIG. 38, (B). This is an "authentication page" to input authentication information that is necessary to make the fusion machine 101 actually perform the selected printing job selected from the page of FIG. 38, (A), on the touch panel 311 of the fusion machine 101. The SCS 169 carries out a function to provide the printing job selecting page of FIG. 38, (A), while the printer application 142 provides the authentication page of FIG. 38, (B).

The authentication information of the user should be input while the authentication page of FIG. 38, (B) is displayed to make the fusion machine 101 actually perform the printing job selected by the user from the printing job selecting page of FIG. 38, (A) in the first embodiment of the printing job spool function. The authentication information of the user A should be input with the authentication page of FIG. 38, (B) to make the fusion machine 101 perform the printing job of the user ID of "11111111" selected from the printing job selecting page of FIG. 38, (A). Thereby, security of the printing job is secured.

According to the first embodiment of the printing job spool function, with the authentication page of FIG. 38, (B), operation of setting the IC card 246 (FIG. 2) into the IC card reader 245 (FIG. 2) of the fusion machine 101 may have an effect as operation of inputting the authentication information of a certain user. Operation to set the IC card 246 in which the authentication information of the user A is recorded to the IC card reader 245 of the fusion machine 101 may thus effect as operation to input the authentication information of the user A. The input operation of the authentication information may be thus simplified in the first embodiment of the printing job spool function.

FIG. 39 shows an operation sequence of the first embodiment of the printing job spool function of the fusion machine 101 of FIG. 1.

When operation for printing a document with the fusion machine 101 is performed on the PC 401A, a printing job having the user ID "11111111" of the user A using the PC 401A attached thereto is transmitted to (S1101) and is spooled in the fusion machine 101 (S1102). The printer driver is charge in processing of S1101 and S1102 in the PC 401A while the printer application 142 is in charge of the same in the fusion machine 101.

When operation for displaying the page of FIG. 38, (A) on the fusion machine 101 is performed, this matter is notified of to the SCS169 by the OCS166 (S1111). The matter that operation for displaying the page of FIG. 38, (A) is performed is notified of to the printer application 142 in response thereto, by the SCS169 (S1112). A display request for the page of FIG. 38, (A) is transmitted to the OCS166 in response thereto, by the printer application 142 (S1113). When this is thus received, the page of FIG. 38, (A) is then actually displayed.

When the printing job of the user ID "11111111" is selected from the page of FIG. 38, (A) after that, this selection of a printing job of the user ID "11111111" from the page of FIG. 38, (A) is notified of to the SCS169 by the OCS166 (S1121). The matter that the printing job of user ID "11111111" is thus selected from the page of FIG. 38, (A) is then notified of to the printer application 142 in response thereto, by SCS169 (S1122). Inverse display request for the printing job of the selected user ID "11111111" from the page of FIG. 38, (A) is transmitted to the OCS166 in response thereto, from the printer application 142 (S123). When this is thus received, the display of the printing job of the selected user ID "11111111" is inversed (in other words, is highlighted) on the page of FIG. 38, (A). When a print button is pressed on the page of FIG. 38, (A) after that, this operation is notified of to the SCS169 of by the OCS166 (S1131). This operation of the print button being pressed on the page of FIG. 38, (A) is then notified of to the printer application 142 in response thereto, from the SCS169 (S1132). A display request for the page of FIG. 38, (B) is then transmitted to the CCS167 in response thereto, from the printer application 142 (S1133). The display request for the page of FIG. 38, (B) is transmitted to the SCS169 in response thereto, from the CCS167 (S1134). The display request for the page of FIG. 38, (B) is transmitted to the OCS166 in response thereto, from the SCS169 (S135). When this is thus received, the page of FIG. 38, (B) is actually displayed.

Then, when the IC card 246 in which the authentication information of the user A is recorded is made to pass through the IC card reader 245 while the page of FIG. 38, (B) is displayed, the matter that the IC card 246 is made to pass through is notified of to the SCS169 from the IC card reader 245 (S141). The matter that IC card 246 is made to pass is notified of to the CCS167 in response thereto, from the SCS169 (S1142). An authentication request for the user A is transmitted to the UCS168 by the CCS167 (S1143). In response thereto, the CCS167 actually carries out (S1144) authentication processing for the user A. An authentication response for the user A is then transmitted to the CCS167 from the UCS168 (S1145). In response thereto, the CCS167 actually caries out (S1146) ticket dispatch processing for the user A. In response thereto, the printer application 1142 compares (S1147) the ticket for the user A with the user ID "11111111". Subsequent thereto, an execution request for the printing job of the selected user ID "11111111" from the page of FIG. 38, (A) is transmitted to the ECS164 from the printer application 142 (S1148). When this is thus received, the printing job of the selected user ID "11111111" from the page of FIG. 38, (A) is actually executed there.

A second embodiment of the printing job spool function according to the present invention is described next. FIG. 40 shows page transition according to the second embodiment of the printing job spool function in the fusion machine 101 of FIG. 1.

FIG. 40, (A) shows a "printing job selecting page" to select a printing job to be carried out by the fusion machine 101, from among those spooled in the fusion machine 101, displayed on the touch panel 311 of the fusion machine 101. On the page of FIG. 40, (A), "a print button" to make the fusion machine 101 actually perform the selected printing job from the page of FIG. 40, (A) is displayed. In the page of FIG. 40, (A), a list of printing jobs spooled in the fusion machine 101 is displayed. It is seen that there are printing jobs of respective user IDs "11111111, 22222222 and 33333333". The printer application 142 has a function of providing a series of printing job selecting pages of FIG. 40, (A), FIG. 40, (B) and FIG. 40, (C).

According to the second embodiment of the printing job spool function, all the printing jobs of the specific user spooled in the fusion machine 101 are once selected as printing jobs to be carried out by the fusion machine 101 automatically when the authentication information of the user is input with the printing job selecting page. When the authentication information of the user A is input with the printing job selecting page, all the printing jobs of the user ID "11111111" spooled in the fusion machine 101 are once selected as printing jobs to be carried out by the fusion machine 101, automatically. As a result, selecting operation for printing jobs is simplified.

Further, according to the second embodiment of the printing job spool function, operation of setting the IC card 246 (FIG. 2) in which the authentication information of the user is recorded to the IC card reader 245 (FIG. 2) can have an effect as operation to input the authentication information of the user with the printing job selecting page. That is, operation of setting the IC card 246 in which the authentication information of user A is recorded to the IC card reader 245 has an effect as operation to input the authentication information. Accordingly, it is possible to simplify the operation to input the authentication information and it is possible to simplify operation of selecting a printing job to carry out.

FIG. 40 is described in further detail. When the authentication information of the user A is input with the printing job selecting page of FIG. 40, (A), all the printing jobs of the user ID "11111111" spooled in the fusion machine 101 are selected as printing jobs to be carried out by the fusion machine 101, automatically, and thus, the page changes into the printing job selecting page of FIG. 40, (B). Only by setting the IC cared 246 in which the authentication information of the user A is recorded to the IC card reader 245, operation to input the authentication information of the user A with the printing job selecting page of FIG. 40, (A) is achieved, as mentioned above.

According to the second embodiment of the printing job spool function, all the printing jobs of the plurality of users spooled in the fusion machine 101 may be once selected one by one as printing jobs to be carried out by the fusion machine 101, automatically, when authentication information of each of the plurality of users is input one by one with the printing job selecting page. When the authentication information of the user A and the authentication information of the user B are input with the printing job selecting page sequentially, all the printing jobs of the user ID "11111111" spooled in the fusion machine 101 and all the printing jobs of the user ID "22222222" spooled in the fusion machine 101 are both selected accordingly as printing jobs to be carried out by the fusion machine 101, automatically sequentially. The selecting operation for the printing jobs for the plural users is thus simplified accordingly.

According to the second embodiment of the printing job spool function, operation of setting the plurality IC cards 246 (FIG. 2) of the plurality of users in which authentication information of each user is recorded, respectively, to the IC card reader 245 (FIG. 2) in sequence may have an effect as operation that the authentication information of each user is input in sequence with the printing job selecting page. When the IC card 246 in which the authentication information of the user A is recorded and the IC card 246 in which the authentication information of the user B is recorded are set to the IC card reader 245 sequentially, operation to input the authentication information of the user A and operation to input the authentication information of the user B can be achieved in sequence. Thereby, operation of inputting the authentication information for a plurality of users can be simplified, and also, selection operation for printing jobs for a plurality of users can be simplified.

This operation is described in further detail with reference to FIG. 40. When the authentication information of the user A and the authentication information of the user B are input with the printing job selecting page of FIG. 40, (B) subsequently, all the printing jobs of the user IDs "11111111" and "22222222" are selected from the printing jobs spooled in the fusion machine 101 as printing jobs to be carried out by the fusion machine 101, automatically, and the page changes into the printing job selecting page of FIG. 40, (C). When, the IC card 246 in which the authentication information of the user B is recorded is set to the IC card reader 245 after the IC card 246 in which the authentication information of the user A is recorded is set, while the printing job selecting page of FIG. 40, (B) is displayed, operation to input the authentication information of the user B is achieved in addition operation achievement of operation to input the authentication information of the user A, accordingly.

FIG. 41 shows an operation sequence of the second embodiment of the printing job spool function of the fusion machine 101 of FIG. 1.

When operation for printing a document with the fusion machine 101 is performed on the PC 401A, a printing job having the user ID "11111111" of the user A using PC401A attached thereto is transmitted (S1201) to the fusion machine 101, and is spooled in the fusion machine 101 (S1202). The printer driver is in charge of processing of S1201 and S1202 in the PC401A while the printer application 142 is in charge of the same in the fusion machine 101.

When operation for printing a document with fusion machine 101 is performed on the PC401B, a printing job is transmitted (S1211) to the fusion machine 101 with the user ID "22222222" of the user B using the PC401B attached thereto, and is spooled in the fusion machine 101 (S1212). The printer driver is in charge of processing of S1211 and S1212 in the PC401B while the printer application 142 is in charge of the same in the fusion machine 101.

When operation for displaying the page of FIG. 40, (A) is performed on the fusion machine 101, this matter is notified of to the SCS169 by the OCS166 (S1221). The matter that operation for displaying the page of FIG. 40, (A) is performed is notified of to the printer application 142 in response thereto, from the SCS169 (S1222). A display request for the page of FIG. 40, (A) is transmitted to the OCS166 in response thereto, from the printer application 142 (S1223). When this is thus received, the page of FIG. 40, (A) is actually displayed.

When the IC card 246 in which the authentication information of the user A is recorded is made to pass through the IC card reader 245 with the page of FIG. 40, (A) being displayed, the matter that the IC card 246 is made to pass through is notified of to the SCS169 of from the IC card reader 245 (S1231). The matter that the IC card 246 is thus made to pass through is notified of to the CCS167 in response thereto, from the SCS169 (S232). An authentication request for the user A is transmitted to the UCS168 then, from the CCS167 (S1233). In response thereto, the CCS167 actually carries out (1S234) authentication processing for the user A. An authentication response for the user A is transmitted to the CCS167 then, to the UCS168 (S1235). In response thereto, the CCS167 actually carries out (S1236) ticket dispatch processing for the user A. In response thereto, the printer application 142 compares with the ticket of the user A to select (S1237) all the printing job of the user ID "11111111" automatically. Subsequent thereto, an inverse display request for the all printing jobs of the selected user ID "11111111" from the page of FIG. 40, (A) is transmitted to the OCS166 from the printer application 142 automatically (S1238). When this is thus received, all printing jobs of the selected user ID "11111111" of the page of FIG. 40, (A) are inversed (highlighted) automatically. FIG. 40, (B) shows this state.

Then, when the IC card 246 in which the authentication information of the user B is recorded is made to pass through the IC card reader 245 with the page of FIG. 40, (B) being displayed, the matter that the IC card 246 is made to pass through is notified of to the SCS169 from the IC card reader 245 (S1241). The matter that the IC card 246 is thus made to pass through is notified of to the CCS167 in response thereto, from the SCS169 (S1242). An authentication request for the user B is transmitted to the UCS168 then, from the CCS167 (S1243). In response thereto, the CCS167 actually carries out (S1244) authentication processing for the user B. An authentication response for the user B is transmitted to the CCS167 then, from the UCS168 (S1245). In response thereto, the CCS167 actually carries out (S1246) ticket dispatch processing for the user B. In response thereto, the printer application 142 compares with the ticket of the user B to select (S1247) all the printing jobs of the user ID "22222222" automatically. Subsequent thereto, an inverse display request for the all printing jobs of the selected user ID "22222222" from the page of FIG. 40, (B) is transmitted to the OCS166 from the printer application 142 automatically (S1248). When this is thus received, all printing jobs of the selected user ID "22222222" of the page of FIG. 40, (B) are inversed (highlighted) automatically. FIG. 40, (C) shows this state.

When a print button is pressed on the page of FIG. 40, (C) then, this matter is notified of to the SCS169 by OCS166 (S1251). This matter is then notified of to the printer application 142 in response thereto, from the SCS169 (S1252). An execution request for the all the printing jobs of the user ID "22222222" of and all the printing jobs the user ID "11111111" thus selected automatically until the page of FIG. 40, (C) is displayed are transmitted to the ECS164 in response thereto, from the printer application 142 (S1253). When this is thus received, all the printing jobs of the user ID "11111111" and all the printing jobs of the user ID "22222222" thus selected automatically until the page of FIG. 40, (C) is displayed are actually executed.

A third embodiment of the printing job spool function according to the present invention is described next. The third embodiment of the printing job spool function is a modification of the second embodiment of the printing job spool function. Accordingly, only a difference from the second embodiment of the printing job spool function is described.

FIG. 42 shows page transition according to the third embodiment of the printing job spool function in the fusion machine 101 of FIG. 1.

FIG. 42, (A) shows a printing job selecting page and is a printing job selecting page corresponding to the page of FIG. 40, (A) before printing job selection is actually made. In the third embodiment, a list of printing jobs spooled in the fusion machine 101 is not displayed on the printing job selecting page before printing job selection is actually made. In the present embodiment, which types of printing jobs are spooled in the fusion machine 101 can be thus kept confidential.

When the authentication information of the user A is input with the page of FIG. 42, (A), the page changes into that shown in FIG. 42, (B). This page is a printing job selecting page corresponding to the page of FIG. 40, (B), and the page of FIG. 42, (B) is a printing job selecting page after all printing job selection for the user ID "11111111" has been made. A list of all the printing job of selected user ID "11111111" is displayed in the printing job selecting page as jobs to be carried out by the fusion machine 101 from printing jobs spooled in the fusion machine 101, after all the printing job selection for the user ID "11111111" has been finished with the printing job selecting page.

When the authentication information of the user B is input with the page of FIG. 42, (B), the page changes into that of the page of FIG. 42, (C). This is a printing job selecting page corresponding to the page of FIG. 40, (C), and the page of FIG. 42, (C) is a printing job selecting page displayed after all the printing job selection for the user ID "22222222" is finished. A list of all the printing jobs of selected for the user IDs "11111111" and "22222222" is thus displayed in the printing job selecting page as jobs to be carried out by the fusion machine 101 from printing jobs spooled in the fusion machine 101, after all printing job selection for the user IDs "11111111" and "22222222" is finished with the printing job selecting page.

Thus, according to the third embodiment of the printing job spool function according to the present invention, a list of selected printing jobs is displayed in the printing job selecting page as jobs to be carried out by the fusion machine 101 selected from among printing jobs spooled in the fusion machine 101 from the printing job selecting page. FIG. 43 shows an operation sequence of the third embodiment of the printing job spool function of the fusion machine 101 of FIG. 1.

The operation sequence of FIG. 43 is the generally the same as that of FIG. 41, in which merely the reference numerals are replaced from Steps S1201 through S1253 by those S1301 through S1353, respectively. However, in this embodiment, in Step S1323, display of the printing job selecting page with no printing jobs displayed is requested, and then, in Steps 1338 and 1348, display of relevant printing jobs in the inverse state (highlighted state) is requested. As a result, only the relevant printing jobs are displayed in the inverse (highlighted) state in the printing job selecting page.

Further, the pages of FIG. 42, (A), (B) and (C) correspond to those of FIG. 40, (A), (B) and (C), respectively.

In addition, the authentication information of each user includes identification information and a password of each user actually. For example, a user's name of each user may be applied as the identification information, or, a user ID of each user may be applied for the same purpose. The same manner may be also applied to any one of the first embodiment, the second embodiment and the third embodiment of the printing job spool function according to the present invention described above.

As to the above-described embodiments of the printing job spool function according to the present invention, the present invention can be applied even when printing jobs are replaced by any other types of jobs such as facsimile transmission jobs, facsimile received document printing jobs, reserved copying jobs, or such.

The fusion machine 101 of FIG. 1 corresponds to an embodiment of "information processing apparatus" according to the present invention; information processing to be executed by means of the fusion machine 101 of FIG. 1 corresponds to an embodiment of an "information processing method" according to the present invention. A computer program to cause a computer to perform the information processing corresponds to an embodiment of an "information processing program" according to the present invention; and a CD-ROM in which the computer program to cause a computer to perform the information processing is recorded corresponds to an embodiment of a "computer readable recording medium" according to the present invention.

Further, the present invention is not limited to the above-described embodiments, and variations and modifications may be made without departing from the basic concept of the present invention claimed below.

The present application is based on Japanese Priority Applications Nos. 2004-151534 and 2004-165979, filed on May 21, 2004 and Jun. 3, 2004, respectively, the entire contents of which are hereby incorporated herein by reference.

What is claimed is:

1. An information processing apparatus having a service mode which said apparatus enters for a service person who carries out maintenance of said apparatus for carrying out the maintenance, comprising:
   a registration page providing part providing a registration page for registering the service person as a service person in charge of the maintenance of said apparatus;
   an input page providing part providing an input page for inputting authentication information required for the service person that is registered in said registration page as the service person in charge of the maintenance of said apparatus to cause said apparatus to enter the service mode; and
   a generating page providing part providing a generating page that automatically generates, upon setting a key, the authentication information to be input on said input page by the service person.

2. The information processing apparatus as claimed in claim 1, wherein:
   in response to a registration operation carried out on said registration page, the service person to be registered is registered in said apparatus.

3. The information processing apparatus as claimed in claim 1, wherein:
   in response to a registration operation carried out on said registration page, the service person to be registered is registered in a server which is connected with said apparatus.

4. The information processing apparatus as claimed in claim 1, wherein:
   in response to a registration operation carried out on said registration page, the service person to be registered is registered in said apparatus after reference to a server connected to said apparatus for said service person.

5. The information processing apparatus as claimed in claim 1, wherein:
   an indication is provided that a service person that is being registered is an illegal service person, when it has been determined that the illegal service person is being registered on said registration page.

6. The information processing apparatus as claimed in claim 1, wherein:
   a report is provided that a service person that is being registered is an illegal service person, when it has been determined that the illegal service person is being registered on said registration page.

7. The information processing apparatus as claimed in claim 1, wherein:
   said apparatus is shut down when it has been determined that an illegal service person is being registered on said registration page.

8. The information processing apparatus as claimed in claim 1, wherein:
   registration of a service person on said registration page can be achieved on said registration page by setting a recording medium in which the authentication information is recorded, in said information processing apparatus.

9. The information processing apparatus as claimed in claim 1, wherein:
   inputting of the authentication information on said input page can be achieved on said input page by setting a recording medium in which the authentication information is recorded, in said information processing apparatus.

10. The information processing apparatus as darned in claim 1, wherein:
    a type of operation which the service person can carry out in said service mode depends on a type of input operation in which the authentication information is input on said input page.

11. The information processing apparatus as claimed in claim 1, further providing:
    a setting page for setting a time limit or a limit of the number of times for log-in operation carried out with the use of the authentication information input on said input page.

12. The information processing apparatus as claimed in claim 1, comprising an image forming apparatus.

13. An information processing method executed by an information processing apparatus having a service mode which said apparatus enters for a service person who carries out maintenance of said apparatus for carrying out the maintenance, comprising the steps of:
    a) providing a registration page for registering the service person as a service person in charge of the maintenance of said apparatus;
    b) providing an input page for inputting authentication information required for the service person that is registered in said registration page as the service person in charge of the maintenance of said apparatus to cause said apparatus to enter the service mode; and
    c) providing a generating page that automatically generates, upon setting a key, the authentication information to be input on said input page by the service person.

14. The information processing method as claimed in claim 13, wherein:
    said information processing apparatus comprises an image forming apparatus.

15. A computer-readable medium, storing a computer program comprising instructions for causing a computer acting as an information processing apparatus having a service mode which said apparatus enters a service person who carries out maintenance of said apparatus for carrying out the maintenance to execute the steps of:
    a) providing a registration page for registering the service person as a service person in charge of the maintenance of said apparatus;
    b) providing an input page for inputting authentication information required for the service person that is registered in said registration page as the service person in charge of the maintenance of said apparatus to cause said apparatus to enter the service mode and
    c) providing a generating page that automatically generates, upon setting a key, the authentication information to be input on said input page by the service person.

16. A computer readable recording medium storing therein the program claimed in claim 15.

* * * * *